US012595679B2

(12) United States Patent
Mohammed et al.

(10) Patent No.: US 12,595,679 B2
(45) Date of Patent: Apr. 7, 2026

(54) LOCKSET ASSEMBLY AND INSTALLATION

(71) Applicant: Schlage Lock Company LLC, Carmel, IN (US)

(72) Inventors: Saagar Mohammed, Alappuzha (IN); Aaron P. McKibben, Fishers, IN (US); Nagesh Varadaraju, Bangalore (IN); Aditya Heblikar, Ballari (IN); Mahesha Appaji, Bengaluru (IN); Chad Eagin, Carmel, IN (US); Taukeer Ansari, Bihar (IN)

(73) Assignee: Schlage Lock Company LLC, Carmel, IN (US)

( * ) Notice: Subject to any disclaimer, the term of this patent is extended or adjusted under 35 U.S.C. 154(b) by 135 days.

(21) Appl. No.: 17/574,035

(22) Filed: Jan. 12, 2022

(65) Prior Publication Data

US 2023/0220701 A1 Jul. 13, 2023

(51) Int. Cl.
*E05B 3/06* (2006.01)
*E05B 1/00* (2006.01)
(Continued)

(52) U.S. Cl.
CPC ................ *E05B 3/06* (2013.01); *E05B 1/003* (2013.01); *E05B 3/065* (2013.01); *E05B 3/10* (2013.01); *E05B 9/002* (2013.01); *E05B 47/0012* (2013.01)

(58) Field of Classification Search
CPC ........ E05B 3/06; E05B 3/065; E05B 15/0013; E05B 15/0053; E05B 17/0041; E05B 65/001; E05B 9/002; E05B 9/08; E05B 2009/002; E05B 2009/004; E05B 2009/006; E05B 2009/008; E05B 77/36; E05B 77/38; E05B 77/40; E05B 9/00; E05B 9/02;
(Continued)

(56) References Cited

U.S. PATENT DOCUMENTS

| | | | |
|---|---|---|---|
| 3,881,331 A | 5/1975 | Tranberg et al. | |
| 6,297,725 B1 | 10/2001 | Tischendorf et al. | |

(Continued)

FOREIGN PATENT DOCUMENTS

| | | | | |
|---|---|---|---|---|
| CN | 108150006 A | * | 6/2018 | |
| CN | 110080624 A | * | 8/2019 | ............. E05B 15/00 |

(Continued)

OTHER PUBLICATIONS

Machine translation of CN-108150006-A (Year: 2018).*
(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

A lockset apparatus according to certain embodiments includes one or more features that facilitate the assembly and/or installation of the lockset. By way of example, certain embodiments relate to an outside trim assembly including one or more features that facilitate installation of a spring cage, a lock module, a lock cylinder, a light guide, a battery tamper monitor, and/or a request to exit sensor. In certain forms, an outside trim assembly and/or an inside trim assembly may be utilized across multiple formats of access control device, such as the mortise format, the tubular format, and/or the exit format.

20 Claims, 46 Drawing Sheets

(51) Int. Cl.
*E05B 3/10* (2006.01)
*E05B 9/00* (2006.01)
*E05B 47/00* (2006.01)

(58) Field of Classification Search
CPC .... E05B 17/007; Y10S 292/64; Y10S 292/53; Y10S 292/56
See application file for complete search history.

(56) References Cited

U.S. PATENT DOCUMENTS

| | | | | |
|---|---|---|---|---|
| 6,328,357 | B1 | 12/2001 | Overbey et al. | |
| 6,487,884 | B1 * | 12/2002 | Constantinou | E05B 47/068 70/279.1 |
| 6,802,546 | B2 | 10/2004 | Bates et al. | |
| 6,869,116 | B2 | 3/2005 | Dalsing | |
| 6,876,293 | B2 | 4/2005 | Frolov et al. | |
| 7,144,050 | B2 | 12/2006 | Lin | |
| 7,918,117 | B2 | 4/2011 | Frolov et al. | |
| 8,325,039 | B2 | 12/2012 | Picard et al. | |
| 8,746,760 | B2 | 6/2014 | Chen et al. | |
| 8,904,836 | B2 | 12/2014 | Guo | |
| 8,922,370 | B2 | 12/2014 | Picard et al. | |
| 9,406,181 | B2 | 8/2016 | Almomani et al. | |
| 9,528,294 | B2 | 12/2016 | Johnson et al. | |
| 9,617,757 | B2 | 4/2017 | Lowder | |
| 9,705,265 | B2 | 7/2017 | Lowder | |
| 9,725,929 | B2 | 8/2017 | Picard et al. | |
| 9,728,017 | B2 | 8/2017 | Paquin | |
| 9,732,542 | B2 | 8/2017 | Moon et al. | |
| 9,758,991 | B2 | 9/2017 | Lin et al. | |
| 9,845,621 | B2 | 12/2017 | Lowder | |
| 10,099,769 | B2 * | 10/2018 | Macaraeg, Jr. | B64C 1/1461 |
| 10,202,784 | B2 | 2/2019 | Parker et al. | |
| 10,508,469 | B2 | 12/2019 | Wong | |
| 10,519,694 | B2 | 12/2019 | Lin et al. | |
| 10,738,504 | B2 | 8/2020 | Uyeda et al. | |
| 10,753,123 | B2 | 8/2020 | Roatis et al. | |
| 10,760,302 | B2 | 9/2020 | Miller et al. | |
| 10,808,420 | B2 | 10/2020 | Morstatt et al. | |
| 10,829,959 | B2 | 11/2020 | Lowder | |
| 10,900,254 | B2 | 1/2021 | Murphy et al. | |
| 10,988,957 | B2 | 4/2021 | Lowder | |
| 11,131,114 | B2 | 9/2021 | Magnan | |
| 11,180,929 | B2 | 11/2021 | Walsh | |
| 2004/0046400 | A1 * | 3/2004 | Drysdale | E05B 77/06 292/216 |
| 2006/0059963 | A1 | 3/2006 | Conforti | |
| 2006/0220390 | A1 * | 10/2006 | Senn | E05C 9/08 292/11 |
| 2008/0066481 | A1 * | 3/2008 | An | E05B 17/0033 312/405 |
| 2009/0146439 | A1 | 6/2009 | Watts et al. | |
| 2016/0076280 | A1 * | 3/2016 | Rudraraju | E05B 85/16 292/336.3 |
| 2018/0030760 | A1 | 2/2018 | Main et al. | |
| 2019/0048618 | A1 * | 2/2019 | Mckibben | E05B 65/1006 |
| 2020/0032551 | A1 * | 1/2020 | Holmes | E05B 47/0012 |
| 2023/0053324 | A1 * | 2/2023 | Leites | E05B 47/0615 |

FOREIGN PATENT DOCUMENTS

| | | | | | |
|---|---|---|---|---|---|
| CN | 111852208 | A | * | 10/2020 | E05B 15/00 |
| DE | 202007000380 | U1 | * | 6/2008 | E05B 3/065 |
| DE | 202011051125 | U1 | * | 1/2013 | E05B 3/065 |
| WO | WO-9506691 | A1 | * | 3/1995 | A47G 1/175 |
| WO | 2006039745 | A1 | | 4/2006 | |
| WO | 2018203065 | A1 | | 11/2018 | |
| WO | WO-2020029124 | A1 | * | 2/2020 | |

OTHER PUBLICATIONS

Machine translation of CN-110080624-A (Year: 2019).*
Machine translation of CN 111852208 A (Year: 2020).*
Machine translation of WO 2020029124 A1 (Year: 2020).*
International Search Report; International Searching Authority; International Application No. PCT/US2023/010689; Sep. 5, 2023; 5 pages.
Written Opinion of the International Searching Authority; International Searching Authority; International Application No. PCT/US2023/010689; Sep. 5, 2023; 9pages.
Extended European Search Report; European Patent Office; European Patent Application No. 23740659.0; Mar. 27, 2025; 8 pages.
Examination Report No. 1; IP Australia; Australian Patent Application No. 2023206922; Jun. 19, 2025; 5 pages.
Examination Report No. 2; IP Australia; Australian Patent Application No. 2023206922; Aug. 29, 2025; 3 pages.
New Zealand Patent Examination Report 1; New Zealand Intellectual Property Officel New Zealand Application No. 812786; Dec. 16, 2025; 4 pages.

* cited by examiner

LOCKSET ASSEMBLY AND INSTALLATION

TECHNICAL FIELD

The present disclosure generally relates to lockset, and more particularly but not exclusively relates to systems and methods for assembling and/or installing locksets.

BACKGROUND

Locksets are typically at least partially assembled in a factory setting and subsequently installed to doors. However, certain existing methods of assembling and/or installing locksets suffer from certain drawbacks and limitations, including those related to manufacturability, ease of assembly, and/or ease of installation. For these reasons among others, there remains a need for further improvements in this technological field.

SUMMARY

A lockset apparatus according to certain embodiments includes one or more features that facilitate the assembly and/or installation of the lockset. By way of example, certain embodiments relate to an outside trim assembly including one or more features that facilitate installation of a spring cage, a lock module, a lock cylinder, a light guide, a battery tamper monitor, and/or a request to exit sensor. In certain forms, an outside trim assembly and/or an inside trim assembly may be utilized across multiple formats of access control device, such as the mortise format, the tubular format, and/or the exit format. Further embodiments, forms, features, and aspects of the present application shall become apparent from the description and figures provided herewith.

DETAILED DESCRIPTION OF ILLUSTRATIVE EMBODIMENTS

Figure 1:
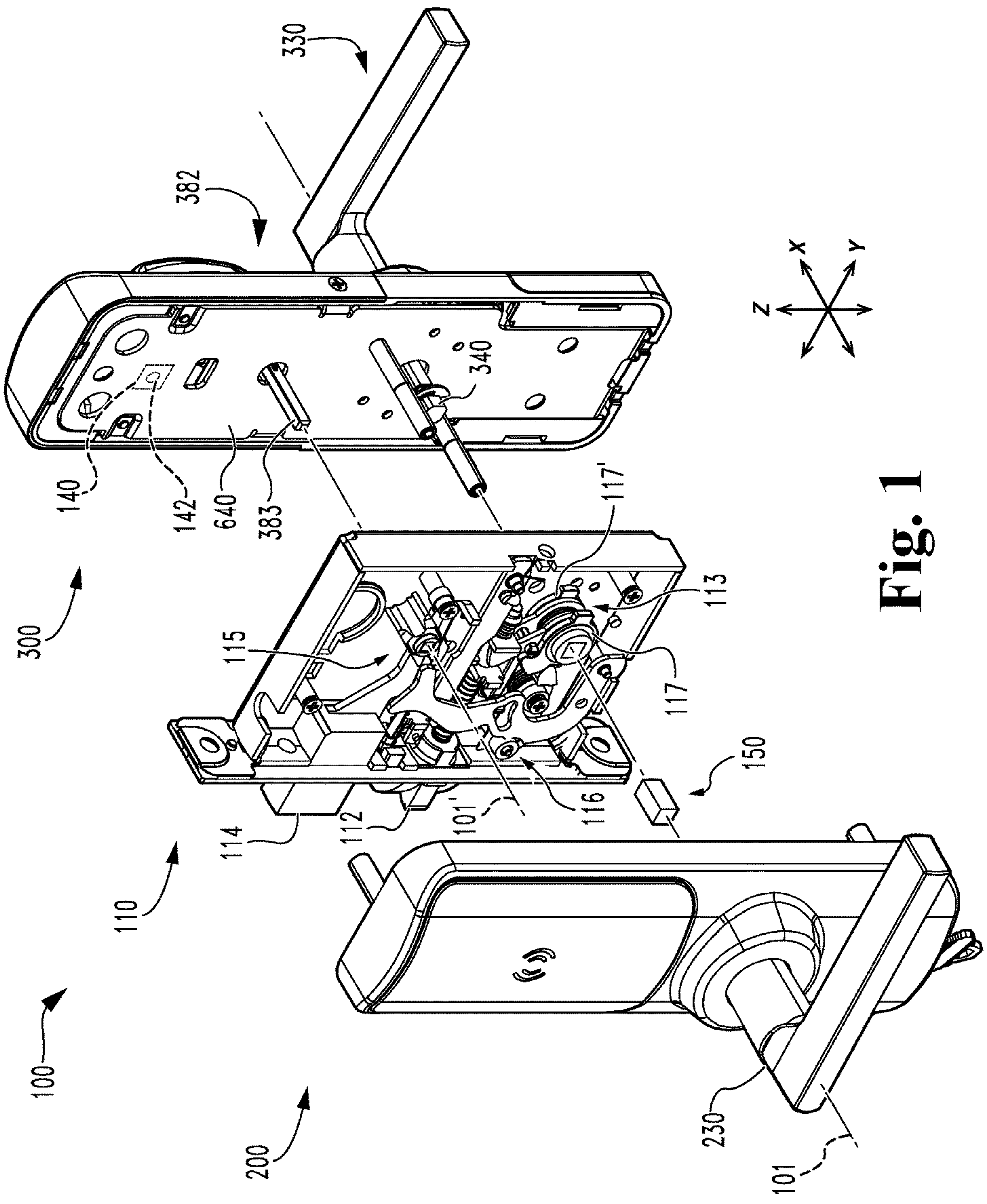
FIG. 1 is an exploded assembly view of a mortise format lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is an access control assembly in the form of a mortise format lockset 100 according to certain embodiments. The lockset 100 generally includes a mortise assembly 110 configured for mounting within a mortise pocket of a door, a latch spindle 150 extending along a longitudinal rotational axis 101 and engaged with the mortise assembly 110, an outside trim assembly 200 configured for mounting to an outer or non-egress side of a door, and an inside trim assembly 300 configured for mounting to an inner or egress side of the door. As described herein, the mortise assembly 110 is operably connected with each of the outside trim assembly 200 and the inside trim assembly 300 such that each of the outside trim assembly 200 and the inside trim assembly 300 is at least selectively operable to retract one or more bolts of the mortise assembly 110. The lockset 100 also includes a control assembly 140, which in the illustrated form is at least partially provided within the inside trim assembly 300. As described herein, various functions of the lockset 100 may be controlled by the control assembly 140.

In the illustrated embodiment, the access control assembly is provided in the form of a mortise format lockset 100. As described herein, however, certain components of the lockset 100, such as the outside trim assembly 200 and/or the inside trim assembly 300, may be utilized to produce access control assemblies of other formats, such as the tubular format and/or the exit format.

Figure 81:
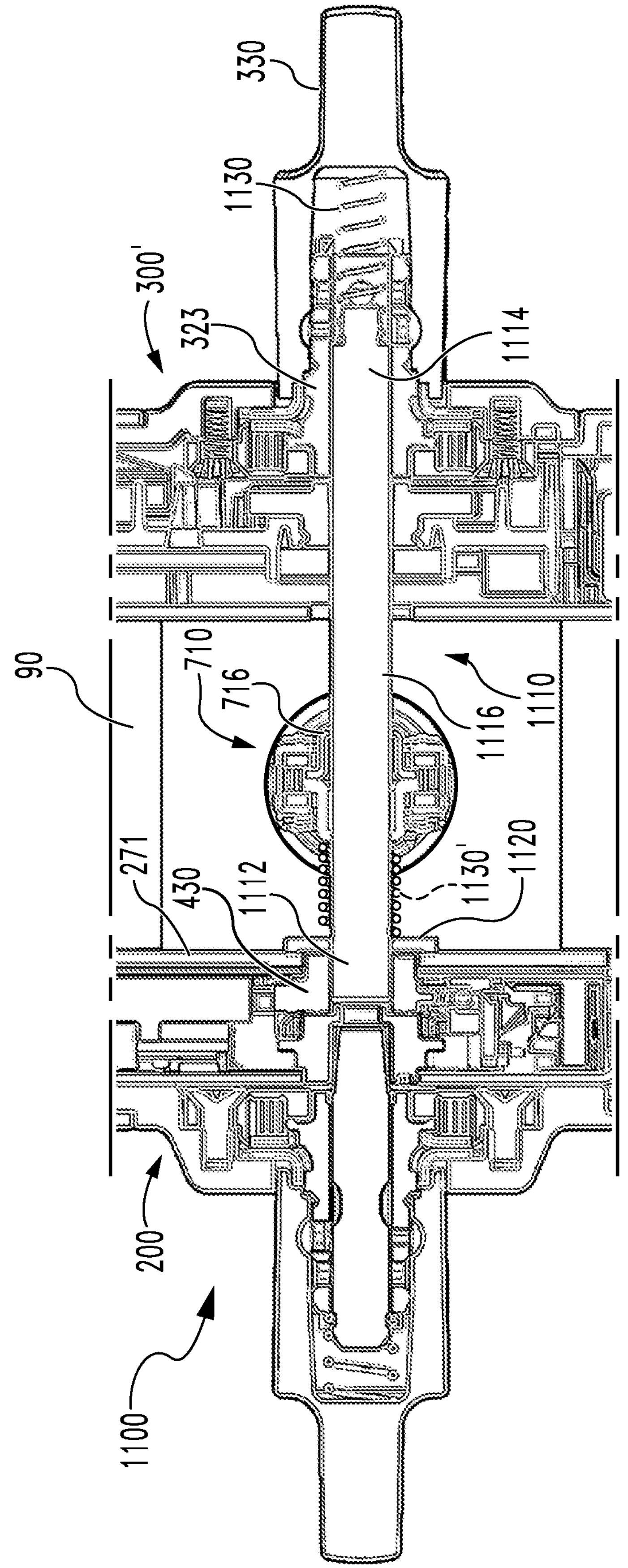
FIG. 81 is a cross-sectional view of a lockset according to certain embodiments.

The mortise assembly 110 generally includes a case 111, a latchbolt 112 movably mounted to the case 111, and a latchbolt actuation assembly 113 operable to retract the latchbolt 112. The latchbolt actuation assembly 113 includes at least one hub, and in the illustrated form includes an outside hub 117 and an inside hub 117', each of which is operable to retract the latchbolt 112. The outside hub 117 is engaged with the latch spindle 150 such that an outside handle 230 is selectively operable to retract the latchbolt 112, and the inside hub 117' is engaged with a drive spindle 340 of the inside trim assembly 300 such that an inside handle 330 is operable to retract the latchbolt 112. It is also contemplated that the mortise assembly 110 may include a single hub, for example in embodiments in which the latch spindle 120 and the inside drive spindle 340 are integrated into a single extended spindle 1110 (FIG. 81).

In the illustrated form, the mortise assembly 110 further includes a deadbolt 114 movably mounted to the case 111, a deadbolt actuation assembly 115 operable to retract the deadbolt 114, and a simultaneous retractor 116 configured to retract the deadbolt 114 during retraction of the latchbolt 112 by the latchbolt actuation assembly 113. The deadbolt actuation assembly 115 includes a cam that is engaged with a stem 383 of a thumbturn 382 such that the thumbturn 382 is operable to extend and retract the deadbolt 115. The simultaneous retractor 116 is engaged between the latchbolt actuation assembly 113 and the deadbolt 114 such that the simultaneous retractor 116 retracts the deadbolt 114 in response to actuation of the latchbolt actuation assembly 113.

The latch spindle 150 extends along the longitudinal axis 101 and is engaged with the outside hub 117 such that rotation of the latch spindle 150 causes a corresponding rotation of the outside hub 117 for retraction of the latchbolt 112. As described herein, the latch spindle 150 is engaged with the outside trim assembly 200 such that an outside handle 230 of the outside trim assembly 200 is selectively operable to rotate the latch spindle 150.

Figure 2:
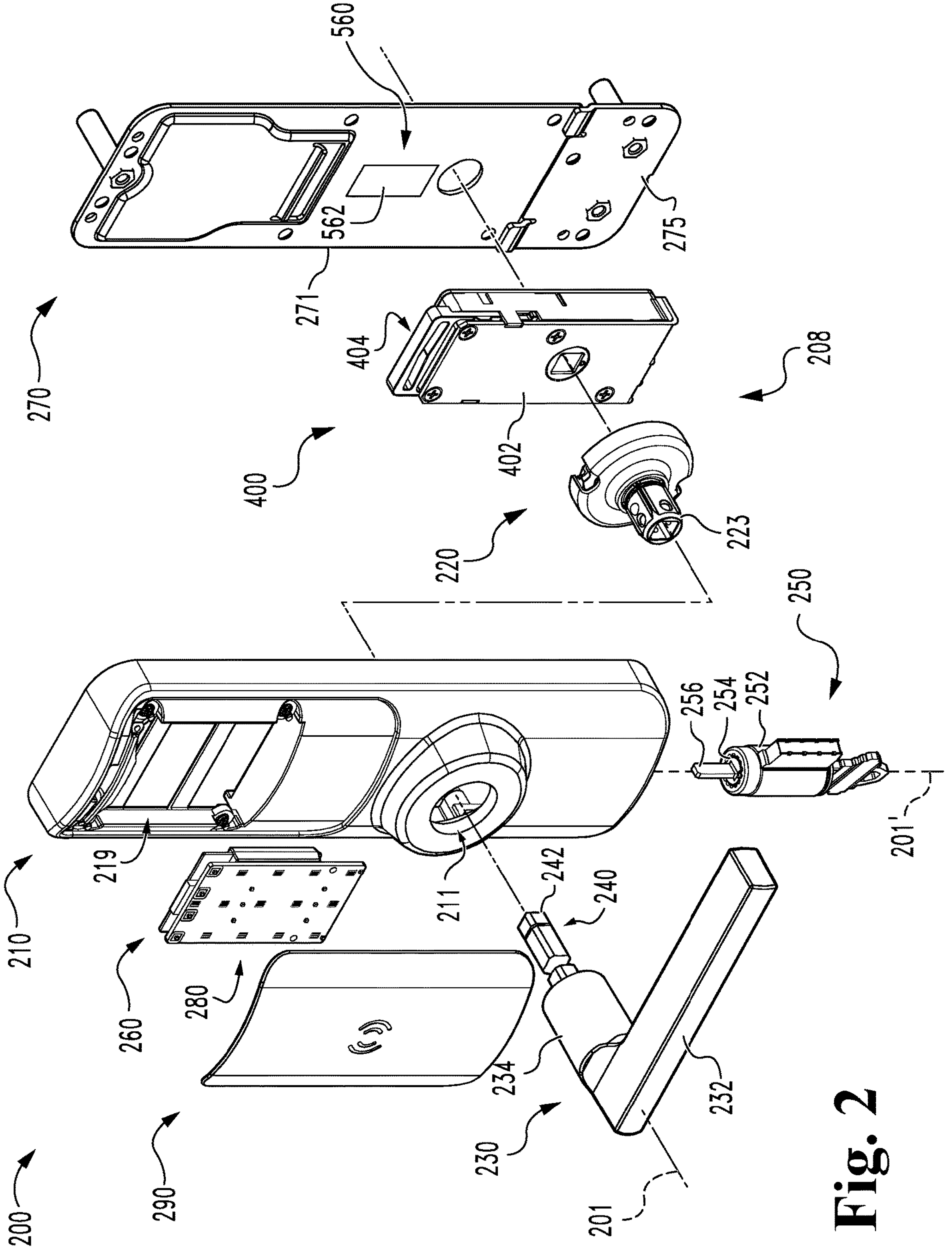
FIG. 2 is an exploded assembly view of an outside trim assembly according to certain embodiments.

With additional reference to FIG. 2, the outside trim assembly 200 generally includes an outside escutcheon 210, an outside spring cage 220 mounted in the escutcheon 210, an outside handle 230 mounted to the spring cage 220, an outside drive spindle 240 engaged with the handle 230 and extending at least partially through the spring cage 220, a lock cylinder 250 mounted to the escutcheon 210, an outside printed circuit board assembly (PCBA) 260 mounted in the escutcheon 210, a backplate assembly 270 that at least partially encloses various components of the outside trim assembly 200 within the escutcheon 210, and a lock module 400 according to certain embodiments. As described herein, the outside PCBA 260 may include a credential reader 280, and is covered at least in part by a front cover 290.

The lock module 400 is configured to selectively permit the outside handle 230 to actuate the mortise assembly 110. As described herein, the lock module 400 has an unlocking state in which the lock module 400 permits the outside handle 230 to actuate the mortise assembly 110, and a locking state in which the lock module 400 prevents the outside handle 230 from actuating the mortise assembly 110. In the illustrated form, the lock module 400 is provided as a clutch module that at all times permits rotation of the outside handle 230, and selectively rotationally couples the drive spindle 240 with the latch spindle 150 for actuation of the latch mechanism. It is also contemplated that the lock module 400 may take another form, such as one that selectively prevents rotation of the outside handle 230. In certain embodiments, the lock module 400 may, for example, be of the type described in U.S. application Ser. No. 17/531,087, filed Nov. 19, 2021, the contents of which are incorporated by reference in their entirety.

Figure 3:
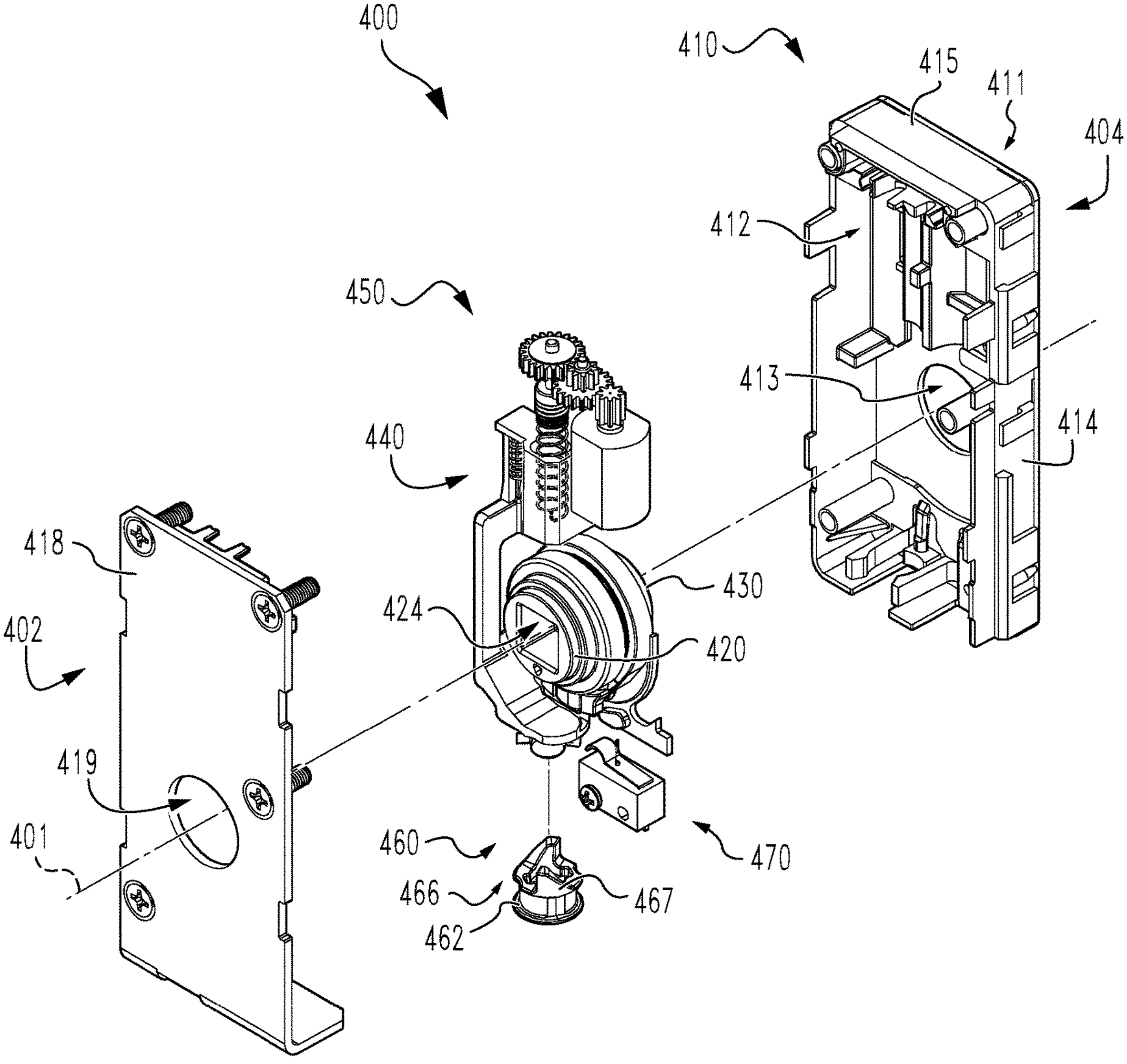
FIG. 3 is an exploded assembly view of a lock module according to certain embodiments.
Figure 4:
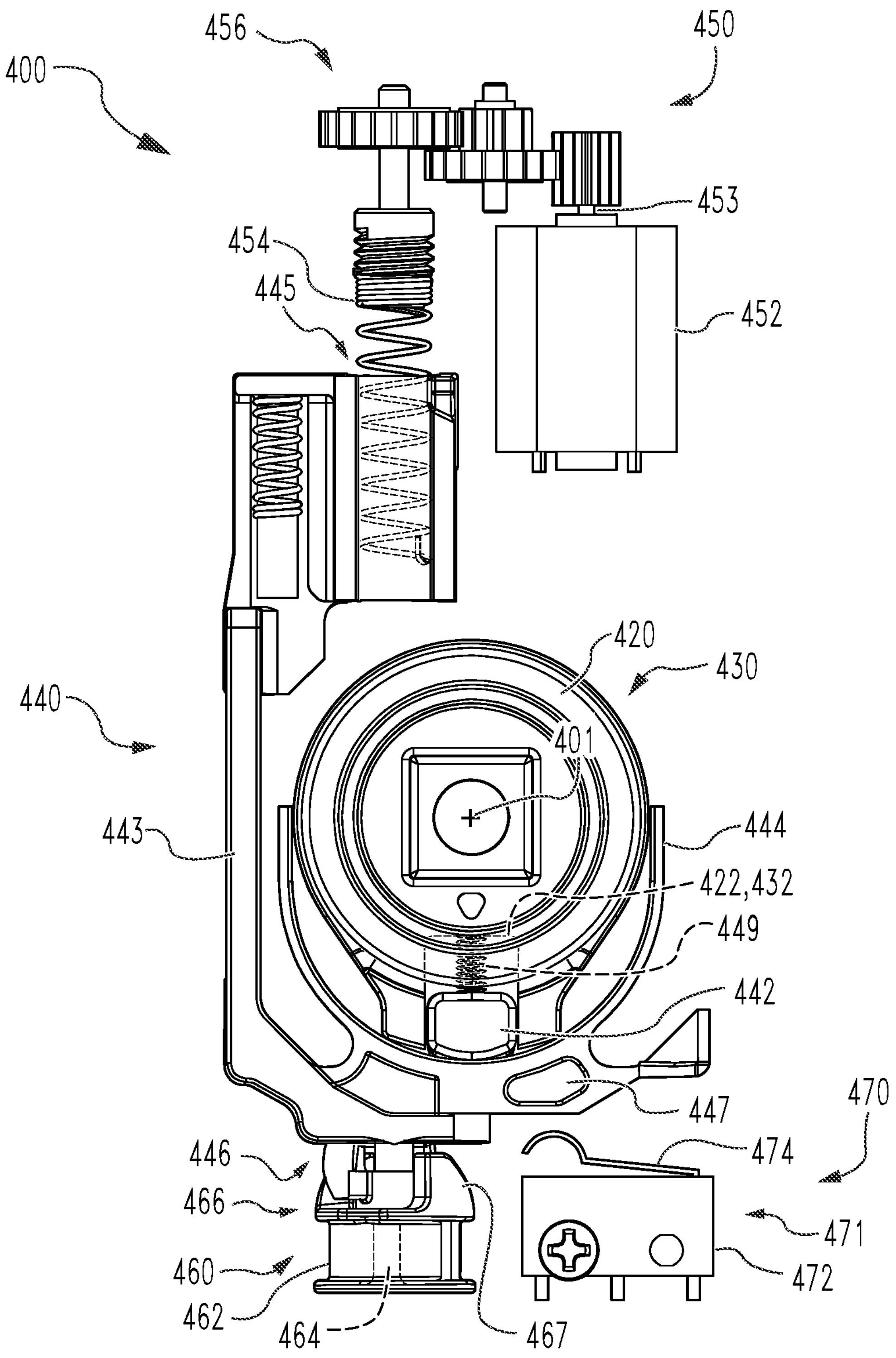
FIG. 4 is a plan view of a portion of the lock module.

With additional reference to FIGS. 3 and 4, the illustrated lock module 400 has a front side 402 facing the escutcheon 210 and a rear side 404 facing the cover plate assembly 270, and generally includes a housing 410, a first hub 420 rotatably mounted in the housing 410, a second hub 430 rotatably mounted in the housing 410, a clutch mechanism 440 operable to selectively rotationally couple the first hub 420 and the second hub 430, an electromechanical drive assembly 450 operable to move the clutch mechanism 440 between a decoupling or locked state and a coupling or unlocked state, and an override mechanism 460 operable to move the clutch mechanism 440 to the unlocked state. In certain forms, the lock module 400 may further include a lock status sensor 470 operable to detect the locked/unlocked condition of the lock module 400.

The housing 410 generally includes a case 411 defining a chamber 412, and a cover 418 configured for coupling with the case 411 to at least partially enclose various components of the lock module 400 within the chamber 412. The cover 418 defines a first opening 419 that rotatably supports the first hub 420, and the case 411 defines a second opening 413 that rotatably supports the second hub 430.

The first hub 420 is rotatably supported by the housing 410 for rotation about a longitudinal rotational axis 401 between a first hub home position and a first hub rotated position, and generally includes a first notch 422 and a first spindle engagement feature 424. In the illustrated form, the first spindle engagement feature 424 is provided in the form of a square opening configured to engage a square portion of the outside drive spindle 240. It is also contemplated that other geometries may be utilized. As one example, the opening may have a different cross-sectional geometry. As another example, the hub 420 may instead include a boss configured to be received in an opening formed in the end of the outside drive spindle 240.

The second hub 430 is rotatably supported by the housing 410 for rotation about the longitudinal rotational axis 401 between a second hub home position and a second hub rotated position, and generally includes a second notch 432 and a second spindle engagement feature. In the illustrated form, the second spindle engagement feature is provided in the form of a square opening configured to engage a square portion of the latch spindle 150. It is also contemplated that other geometries may be utilized. As one example, the opening may have a different cross-sectional geometry. As another example, the hub 430 may instead include a boss configured to be received in an opening formed in the end of the latch spindle 150, or may directly engaged the outside hub 117.

In the illustrated configuration of the outside trim assembly 200, the first hub 420 is rotationally coupled with the outside drive spindle 240, and the second hub 430 is rotationally coupled with the latch spindle 150. It is also contemplated that this orientation may be reversed, such that the first hub 420 is rotationally coupled with the latch spindle 150, and the second hub 430 is rotationally coupled with the outside drive spindle 240. Moreover, in certain embodiments, the lock module 400 may be reversible such that each of the hubs 420, 430 is operable to engage each of the spindles 150, 240.

As noted above, the first hub 420 is configured for coupling with the drive spindle 240, and the second hub 430 is configured for coupling with the latch spindle 150. The first hub 420 may thus be considered an input component of the lock module 400, and the second hub 430 may thus be considered an output component of the lock module 400. As described herein, the lock module 400 is configured to selectively permit rotation of an output component (e.g. the second hub 430) by an input component (e.g., the first hub 420).

The clutch mechanism 440 generally includes a coupler 442 having a coupling position and a decoupling position, and a movable wall 443 operable to move the coupler 442 between its coupling position and its decoupling position. In the illustrated form, the clutch mechanism 440 further includes a bias member 449 biasing the coupler 442 toward its decoupling position. In the illustrated form, the bias member 449 is provided in the form of a compression spring. It is also contemplated that the bias member 449 may be provided in another form, such as one including a torsion spring, an extension spring, a leaf spring, and/or one or more magnets.

Figure 6:
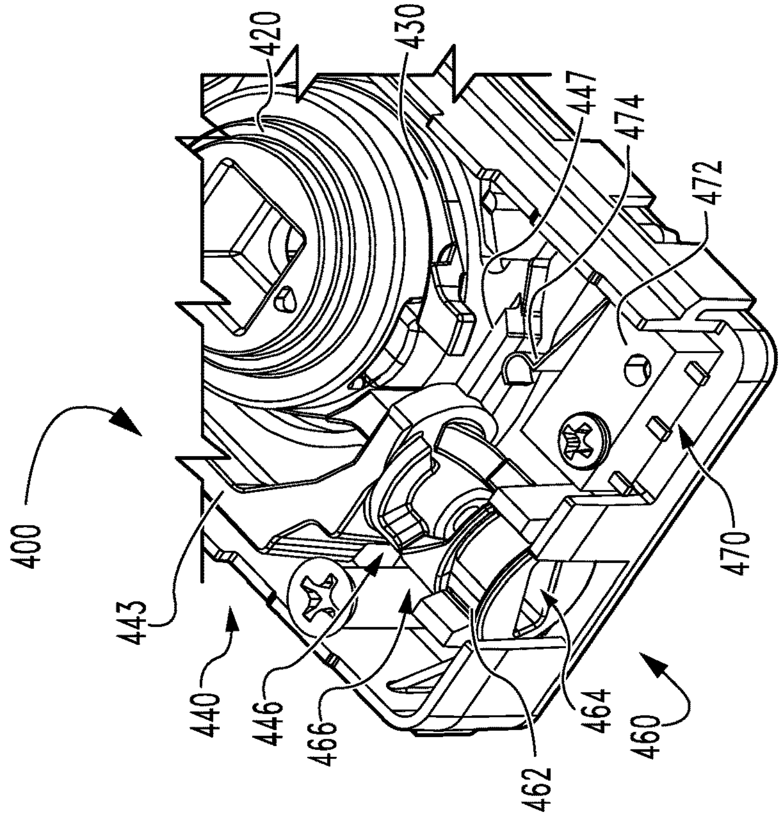
FIG. 6 is a perspective view of a portion of the lock module in an unlocked state.
Figure 5:
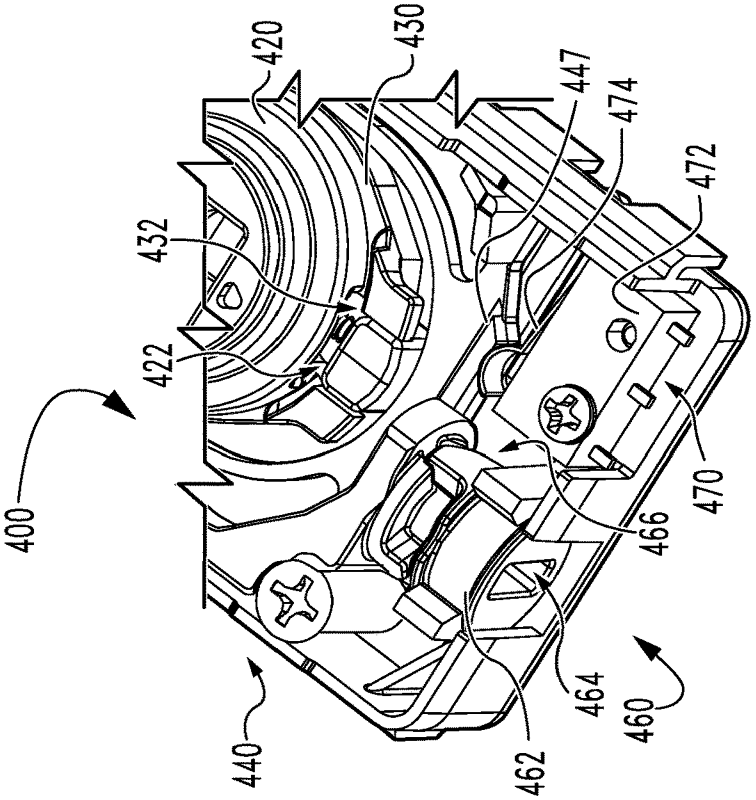
FIG. 5 is a perspective view of a portion of the lock module in a locked state.
Figure 7:
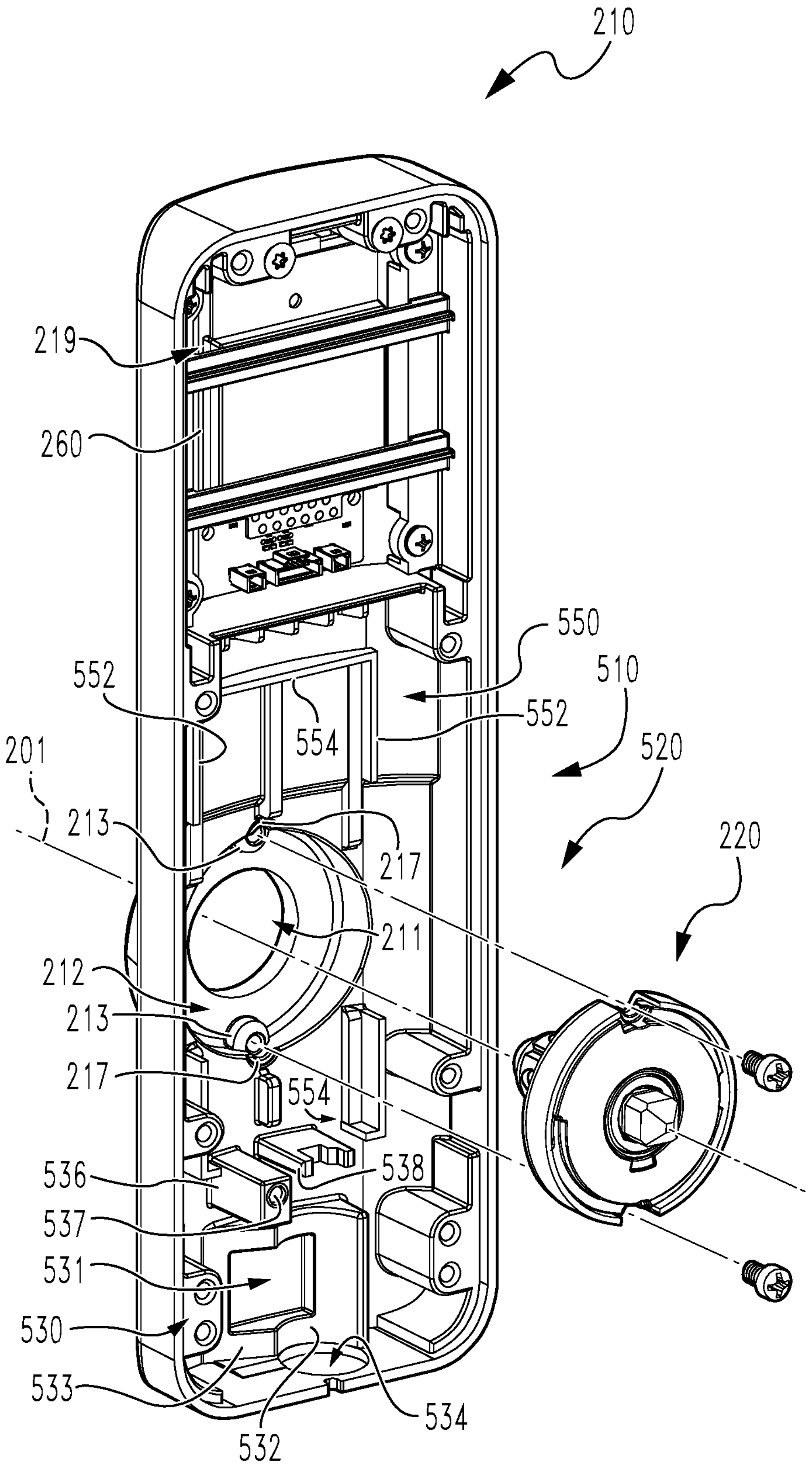
FIG. 7 is an exploded assembly view of a portion of the outside trim assembly.
Figure 8:
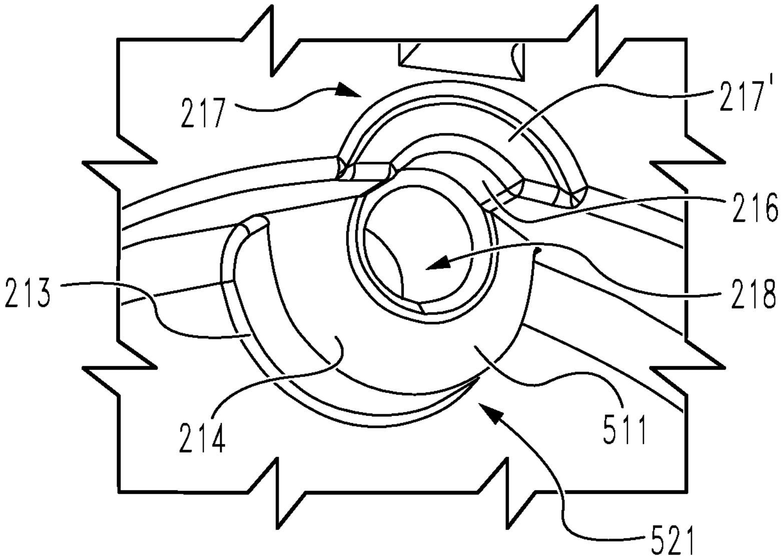
FIG. 8 is a perspective view of a boss of an escutcheon of the outside trim assembly.
Figure 9:
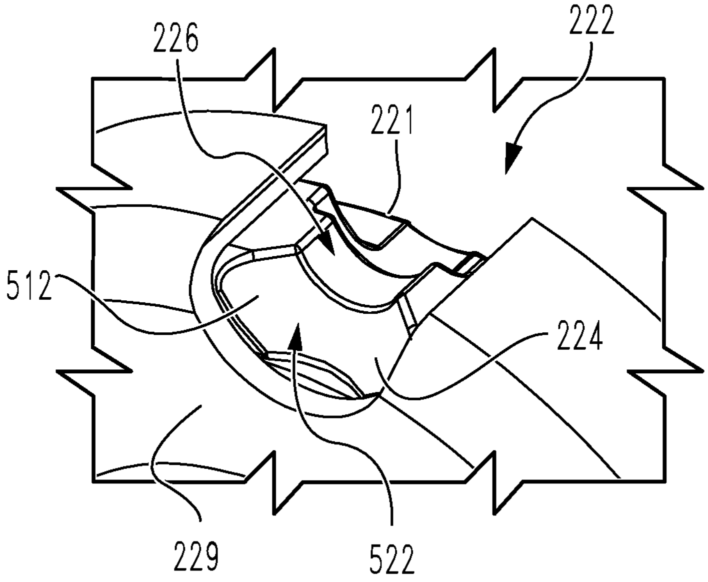
FIG. 9 is a perspective view of a portion of a spring cage according to certain embodiments.

With additional reference to FIGS. 5 and 6, the movable wall 443 has a locked position (FIG. 5) in which the movable wall 443 permits the bias member 449 to retain the coupler 442 in its decoupling position, and an unlocked position (FIG. 6) in which the movable wall 443 retains the coupler 442 in its coupling position against the urging of the bias member 449. The movable wall 443 includes an arcuate portion 444 that maintains the coupler 442 in its coupling position as rotation of the coupled hubs 420, 430 (e.g., by the outside drive spindle 240) causes the coupler 442 to orbit about the rotational axis 401. The movable wall 443 also includes an engagement portion 445 engaged with a spring 454 of the electromechanical drive assembly 450, a cam interface 446 through which the wall 443 is engaged with the override mechanism 460, and a projection 447 operable to actuate the lock status sensor 470.

When the clutch mechanism 440 is in its decoupling or locked state (FIG. 5), the movable wall 443 is in its locked position, and the coupler 442 is in its decoupling position. In the decoupling position, the coupler 442 is removed from at least one of the notches 422, 432 such that the first hub 420 is rotationally decoupled from the second hub 430. As a result, any rotation of the outside drive spindle 240 will not be transmitted to the latch spindle 150, and the outside handle 230 is unable to actuate the mortise assembly 110. This defines a locked condition of the lock module 400, in which the lock module 400 does not permit the outside drive spindle 240 to rotate the latch spindle 150 for actuation of the mortise assembly 110.

When the clutch mechanism 440 is in its coupling or unlocked state (FIG. 6), the movable wall 443 is in its unlocked position, and the coupler 442 is in its coupling position. In the coupling position, the coupler 442 is partially received in the first notch 422 and is partially received in the second notch 432 such that the coupler 442 extends between the notches 422, 432. As a result, the coupler 442 rotationally couples the hubs 420, 430 such that the outside handle 230 is operable to actuate the mortise assembly 110. This defines an unlocked condition of the lock module 400, in which the lock module 400 rotationally couples the outside drive spindle 240 with the latch spindle 150, and permits actuation of the mortise assembly 110 by the outside handle 230.

In the illustrated form, the lock mechanism of the lock module 400 is provided in the form of a clutch mechanism 440, which selectively permits the outside drive spindle 240 to rotate the latch spindle 150 by selectively coupling the first hub 420 with the second hub 430. It is also contemplated that the lock module 400 may selectively permit the outside drive spindle 240 to rotate the latch spindle 150 in another manner. For example, the hubs 420, 430 may be at all times rotationally coupled, and a lock mechanism according to certain embodiments may selectively prevent rotation of the coupled hubs 420, 430 to thereby selectively prevent the outside drive spindle 240 from rotating the latch spindle 150.

As should be evident from the foregoing, the locked/unlocked condition of the lock module 400 corresponds to the coupling/decoupling state of the clutch mechanism 440. Additionally, the coupling/decoupling state (or the locking/unlocking state) of the clutch mechanism 440 corresponds to the coupling/decoupling position of the coupler 442, which in turn depends upon the locked/unlocked position of the movable wall 443. Thus, the lock module 400 can be moved between its locked state and its unlocked state by moving the movable wall 443 between its locked position and its unlocked position. As described herein, each of the electromechanical drive assembly 450 and the override mechanism 460 is independently operable to move the wall 443 to its unlocked position such that the lock module 400 can be unlocked by each and either of the electromechanical drive assembly 450 and the override mechanism 460.

The electromechanical drive assembly 450 is operable to transition the lock module 400 between its locked state and its unlocked state in response to a lock/unlock signal, and includes an electromechanical driver 452. In the illustrated form, the electromechanical driver 452 is provided in the form of a rotary motor including an output shaft 453 that is operable to rotate a spring 454 via a gear train 456 to thereby move the wall 443 between its locked position and its unlocked position. It is also contemplated that the driver 452 may take another form operable to move the wall 443 between its locked position and its unlocked position. For example, the driver 452 may be provided in the form of a linear motor, a linear solenoid, a rotary solenoid, or an electromagnet.

In the illustrated embodiment, the spring 454 is provided as a coil spring, and the engagement portion 445 of the wall 443 is positioned between adjacent coils of the spring 454. As a result, rotation of the spring 454 in a locking direction urges the wall 443 toward its locking position, and rotation of the spring 454 in an unlocking direction opposite the locking direction urges the wall 443 toward its unlocking position. Such rotation of the spring 454 in opposite directions may be effected by causing the motor 452 to rotate the shaft 453 in opposite directions. In response to receiving a lock signal (e.g., from the control assembly 140), the motor 452 may rotate the motor shaft 453 in a first direction to thereby rotate the spring 454 in its locking direction, thereby urging the wall 443 toward its locked position. In response to receiving an unlock signal (e.g., from the control assembly 140), the motor 452 may rotate the motor shaft 453 in a second direction to thereby rotate the spring 454 in its unlocking direction, thereby urging the wall 443 toward its unlocked position. In the illustrated form, the lock/unlock signal is transmitted by a control assembly external to the lock module 400, such as the control assembly 140. In other embodiments, the lock/unlock signal may be transmitted by a control assembly internal to the lock module 400.

The override mechanism 460 is operable to unlock the lock module 400, and in the illustrated embodiment is provided in the form of an override cam 462 including a receiving slot 464 and a cam interface 466 operable to engage the cam interface 446 of the wall 443. The receiving slot 464 is configured to receive a tailpiece 256 of the lock cylinder 250 such that actuation of the lock cylinder 250 rotates the override cam 462 between a home position (FIG. 5) and a rotated position (FIG. 6). As described herein, such rotation of the override cam 462 from the home position to the rotated position urges the wall 443 from its locked position to its unlocked position, thereby unlocking the lock module 400.

With the override cam 462 in its home position (FIG. 5), the override cam interface 466 permits movement of the wall cam interface 446 such that the wall 443 is free to move between its locked and unlocked positions (e.g., under the urging of the electromechanical drive assembly 450). Thus, when the override cam 462 is in its home position, the lock module 400 is free to lock and unlock as normal. During rotation of the override cam 462 toward its rotated position, a ramp 467 of the cam interface 466 engages a corresponding ramp of the wall cam interface 446, thereby urging the wall 443 toward its unlocked position and unlocking the lock module 400. Thus, when the override cam 462 is in its rotated position (FIG. 6), the lock module 400 is unlocked. The override mechanism 460 is therefore operable to unlock the lock module 400 even when the electromechanical drive assembly 450 has not been actuated and/or is under a power failure condition.

The lock status sensor 470 is operable to detect the locked/unlocked state of the lock module 400, and in the illustrated form comprises a snap action switch 471 including a body portion 472 and an actuation arm 474. Those skilled in the art will readily recognize that snap action switches such as the switch 471 have a default state (i.e., one of an open state or a closed state) when the arm 474 is in a home position, and a non-default state (i.e., the other of the open state or the closed state) when the arm 474 is in a depressed position. In the illustrated form, the projection 447 of the wall 443 is configured to depress the arm 474 when the wall 443 is in its locked position (FIG. 5), and to allow the arm 474 to return to its home position when the wall 443 is in its unlocked position (FIG. 6). As a result, the locked/unlocked position of the wall 443 (and thus the locked/unlocked condition of the lock module 400) can be determined based upon the default/non-default state of the switch 471.

While the illustrated lock status sensor 470 is provided in the form of a mechanical snap action switch 471, it should be appreciated that the lock status sensor 470 may take another form. As one example, the lock status sensor 470 may be a magnetically-actuated sensor, such as a reed switch or a Hall effect sensor. In such forms, a magnet may be mounted to the wall 443 to selectively actuate the magnetic sensor. Moreover, while the illustrated switch 471 is positioned to be in its default state when the lock module 400 is unlocked and to be in its non-default state when the lock module 400 is locked, it should be appreciated that this configuration may be reversed such that the switch 471 is in its default state when the lock module 400 is locked, and is in its non-default state when the lock module 400 is unlocked.

With additional reference to FIGS. 7-10, the illustrated outside trim assembly 200 further includes an alignment mechanism 510 configured to facilitate alignment of the spring cage 220 with the escutcheon 210, and an anti-rotation mechanism 520 configured to prevent rotation of a portion of the spring cage 220 relative to the escutcheon 210. While the alignment mechanism 510 and anti-rotation mechanism 520 are described herein with reference to the outside trim assembly 200, it should be appreciated that the inside trim assembly 300 may include similar features to align and retain the inside spring cage 320 relative to the inside escutcheon 310. It is also contemplated that other features described in association with the engagement of outsie spring cage 220 and outside escutcheon 210 may be utilized in connection with the inside trim assembly 300.

The alignment mechanism 510 includes at least one ramp, and in the illustrated form includes a plurality of ramps. More particularly, the illustrated alignment mechanism 510 includes a pair of escutcheon ramps 511 and a pair of spring cage ramps 512. As described herein, the escutcheon 210 includes the escutcheon ramps 511, the spring cage 220 includes the spring cage ramps 512, and the escutcheon ramps 511 are configured to engage the spring cage ramps 512 during assembly of the outside trim assembly 200 to provide for proper alignment between the spring cage 220 and the escutcheon 210.

The anti-rotation mechanism 520 includes at least one protrusion and at least one recess, and in the illustrated form includes a pair of protrusions 521 and a pair of recesses 522. In the illustrated form, the escutcheon 210 includes the protrusions 521, the spring cage 220 includes the recesses 522, and the protrusions 521 are configured to engage the recesses 522 to prevent rotation of the spring cage 220 relative to the escutcheon 210.

The escutcheon 210 defines a spindle opening 211 through which a support spindle 223 of the spring cage 220 projects. Formed on a rear side of the escutcheon 210 is a pocket 212, and a pair of bosses 213 are positioned in the pocket 212 adjacent an outer periphery of the pocket 212. Each boss 213 includes a corresponding chamfered tip 214 defining one of the escutcheon ramps 511 and one of the protrusions 521. While other geometries are contemplated, each chamfered tip 214 in the illustrated embodiment defines a generally frustoconical male portion of the corresponding boss 213. As described herein, the escutcheon 210 also defines a lock cylinder mounting location 530 in which the lock cylinder 250 is mounted, and a lock module mounting location 550 in which the lock module 400 is mounted.

The lock cylinder mounting location 530 generally includes a cradle 531 including an arcuate wall 532 and an oblique wall 533, an aperture 534 through which a keyway 255 of the lock cylinder 250 is accessible, and a post 536 for supporting a clamp 540 (FIGS. 12 and 13) by which the lock cylinder 250 is secured to the escutcheon 210. As described herein, the rear side of the escutcheon 210 defines a rear plane 215 (FIG. 10), and the oblique wall 533 extends at an oblique angle relative to the rear plane 215.

The lock module mounting location 550 generally includes a floor 552 and one or more walls generally defining an inner perimeter that corresponds to the outer perimeter of the lock module 400. The walls include a pair of transverse or generally vertical walls 554 that interface with vertical edges 414 of the lock module housing 410, and a pair of lateral or generally horizontal walls 555 that interface with horizontal edges 415 of the lock module housing 410.

An area above the opening 211 may define a PCBA mounting location 219 in which the PCBA 260 is mounted. The front side of the escutcheon 210 may be open at the PCBA mounting location 219, and a front cover 290 passive to selected bands of electromagnetic radiation (e.g., radio and/or infrared) may be mounted to the escutcheon 210 and cover the PCBA 260. A pair of recesses 217 are formed adjacent the bosses 213 near the outer periphery of the pocket 212, and each recess 217 includes a floor 217'. Each boss 213 also partially defines a corresponding and respective fastener opening 218, which may be threaded. Each fastener opening 218 is also defined in part by an arcuate wall 216, which extends from the tip of the boss 213 to the floor 217' of the recess 217.

The spring cage 220 is configured for mounting within the pocket 212, and generally includes a base 221, a support spindle 223 mounted to the base 221 for rotation about a rotational axis 225, a bias member 228 rotatably biasing the support spindle 223 toward a home position, and a cover 229 that at least partially covers the bias member 228. The support spindle 223 supports the outside drive spindle 240, which is received in the support spindle 223 such that the bias member 228 biases the drive spindle 240 (and thus the outside handle 230) toward a home position. In the illustrated form, the bias member 228 is provided in the form of a clock spring. It is also contemplated that the bias member 228 may be provided in another form, such as one including a torsion spring, a compression spring, an extension spring, a leaf spring, and/or one or more magnets.

The base 221 includes a pair of engagement regions 222 that facilitate mounting of the spring cage 220 to the escutcheon 210. Each engagement region 222 generally includes a chamfered recess 224, an arcuate wall 226, and a recess 227 that is defined in part by a floor 227'. Each chamfered recess 224 defines a corresponding spring cage ramp 512 and a corresponding recess 522. The chamfered recess 224 is configured to receive the chamfered tip 214 of a corresponding boss 213, and in the illustrated form has a generally frustoconical female geometry.

During insertion of the spring cage 220 into the pocket 212, the alignment mechanism 510 aids in providing proper alignment of the spring cage 220 relative to the escutcheon 210. During such insertion, the ramps 511, 512 defined by the chamfered portions 214, 224 engage one another and center the spring cage 220 relative to the pocket 212, thereby more closely aligning the rotational axis 225 of the spring cage 220 with the longitudinal axis 201. When the spring cage 220 is seated in the pocket 212, each chamfered recess 224 receives the chamfered tip 214 of a corresponding boss 213, the arcuate walls 216, 226 face one another and further define the fastener opening 218, and the recesses 217, 227 are adjacent one another such that the floors 217', 227' are substantially aligned, but slightly misaligned.

The spring cage 220 may be mounted to the escutcheon 210 using one or more fasteners. In the illustrated form, the spring cage 220 is mounted to the escutcheon 210 using a pair of threaded fasteners 570, such as screws and/or bolts. Each threaded fastener 570 generally includes a head 572 and a shank 574 extending from the head 572. In the illustrated form, the shank 574 is at least partially threaded, and engages corresponding threads formed within the fastener opening 218. At least a portion of the shank 574 is positioned between an inner periphery of the pocket 212 and an outer periphery of the base 221.

Figure 11:
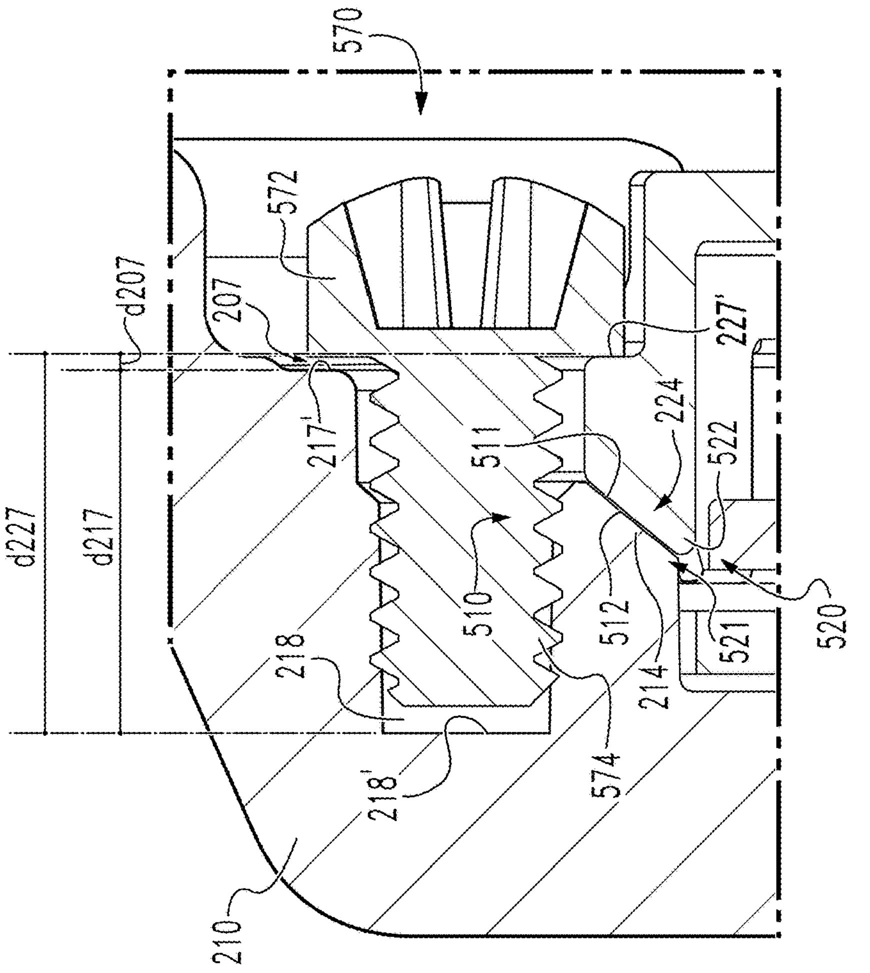
FIG. 11 is a cross-sectional view of a portion of the outside trim assembly, and illustrates features associated with a fastener.
Figure 10:
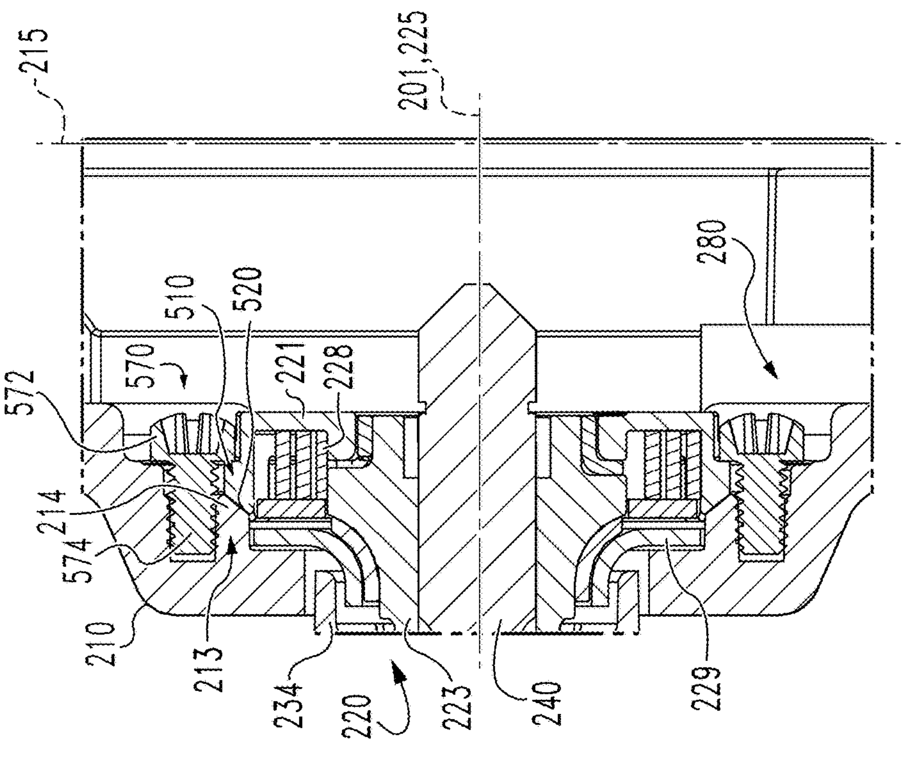
FIG. 10 is a cross-sectional view of a portion of the outside trim assembly, and illustrates features associated with the spring cage.

With additional reference to FIG. 11, when the spring cage 220 is mounted within the pocket 212, each fastener opening 218 is defined in part by the escutcheon 210 and in part by the base 221 of the spring cage 220. Each fastener opening 218 is defined in part by a floor 218', and extends through the aligned arcuate walls 216, 226 to the floors 217', 227' of the recesses 217, 227. A first distance d217 is defined between the opening floor 218' and the floor 217' of the escutcheon recess 217. A second distance d227 is defined between the opening floor 218' and the floor 227' of the spring cage base recess 227.

As noted above, the floors 217', 227' are substantially coplanar, but slightly misaligned. More particularly, the floors 217', 227' are offset from one another by an offset distance d207 such that the second distance d227 is greater than the first distance d217. Thus, when the fastener 570 is advanced into the opening 218, the head 572 will contact the spring cage floor 227' before contacting the escutcheon floor 217' such that a gap 207 is defined between the head 572 and the escutcheon floor 217'. The gap dimension d207 may be three millimeters or less, two millimeters or less, one millimeter or less, or between one and three millimeters. In certain embodiments, the floors 217', 227' may be considered to be substantially coplanar when the offset distance d207 is five millimeters or less, or three millimeters or less.

In certain embodiments, the assembly process may involve stopping advancement of the fastener 570 before the head 572 contacts the escutcheon floor 217' such that the gap 207 is formed between the head 572 and the escutcheon floor 217'. In certain forms, the assembly process may involve continuing to advance the fastener 570 until the head 572 contacts the escutcheon floor 217'.

Because the spring cage floor 227' projects beyond the escutcheon floor 217', the fastener head 572 should contact the spring cage floor 227' before contacting the escutcheon floor 217' as noted above. This ensures that a portion of the spring cage base 221 is clamped between the fastener head 572 and the escutcheon 210. If the floors 217', 227' were instead designed to be flush with one another, manufacturing tolerances would result in at least some products in which the escutcheon floor 217' projects beyond the spring cage floor 227', which would result in a loose clamping of the spring cage base 221 and potential rattling of the spring cage 220. By designing the lockset 100 such that the spring cage floor 227' projects beyond the escutcheon floor 217', such loose clamping of the spring cage base 221 may be obviated. While the offset floors 217', 227' have been described in association with the outside trim assembly 200, it should be appreciated that similar features may be associated with the inside trim assembly 300.

With the fasteners 570 installed, the anti-rotation mechanism 520 aids in preventing rotation of the spring cage base 221 relative to the escutcheon 210. Should the handle 230 be over-torqued, the protrusions 521 and recesses 522 engage one another and transmit loads from the spring cage base 221 to the escutcheon 210, thereby providing resistance to the over-torqueing attack. If other external loads are applied to the spring cage 220, slight deformation in the spring cage 220 and/or the escutcheon 210 may cause the gap 207 to disappear such that the fastener 570 provides further support for the spring cage 220.

The outside handle 230 comprises a shank 234 and a grip portion 232 extending from the shank 234. The shank 234 is sized and shaped to receive the support spindle 223, and may be secured to the support spindle 223 by an appropriate fastener 204, such as a set screw. In certain embodiments, the fastener 204 may extend through the support spindle 223 and engage the drive spindle 240. With the outside trim assembly 200 assembled, the outside handle 230 is rotationally coupled with and supported by the support spindle 223 such that the spring cage 220 biases the handle 230 toward a handle home position. In the illustrated form, the outside handle 230 is provided in the form of a lever. It is also contemplated that the outside handle 230 may be provided in another form, such as that of a knob.

The drive spindle 240 is positioned at least partially in the support spindle 223, and includes an engagement portion 242 that extends beyond the rear side of the spring cage 220 and into engagement with the first hub 420 of the lock module 400. In the illustrated form, the engagement portion 242 has a square male geometry, and the spindle engagement feature 424 has a corresponding square female geometry. It is also contemplated that other geometries may be utilized for the engagement portion 242 and/or the spindle engagement feature 424. When the outside trim assembly 200 is assembled, the drive spindle 240 operably connects the handle 230 with the first hub 420 such that the handle 230 is selectively operable to rotate the latch spindle 150 for actuation of the mortise assembly 110 as described above.

Figure 12:
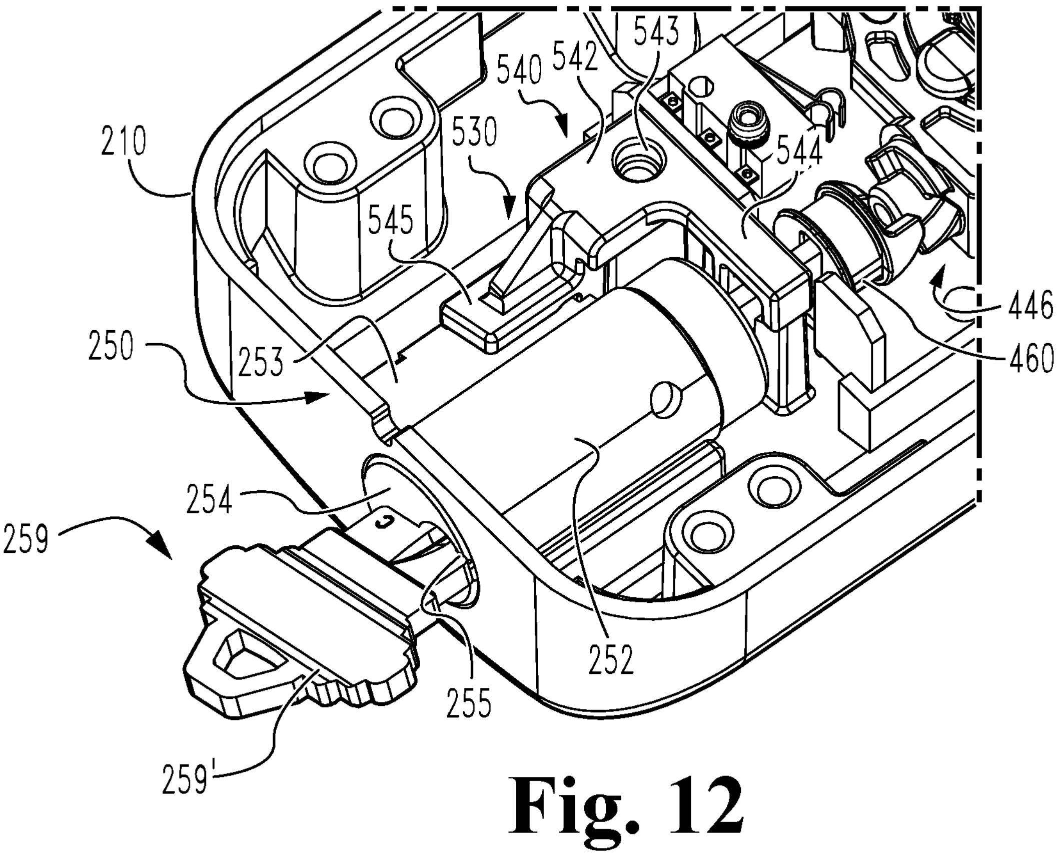
FIG. 12 is a perspective view of a portion of the outside trim assembly, and illustrates features associated with a lock cylinder.
Figure 13:
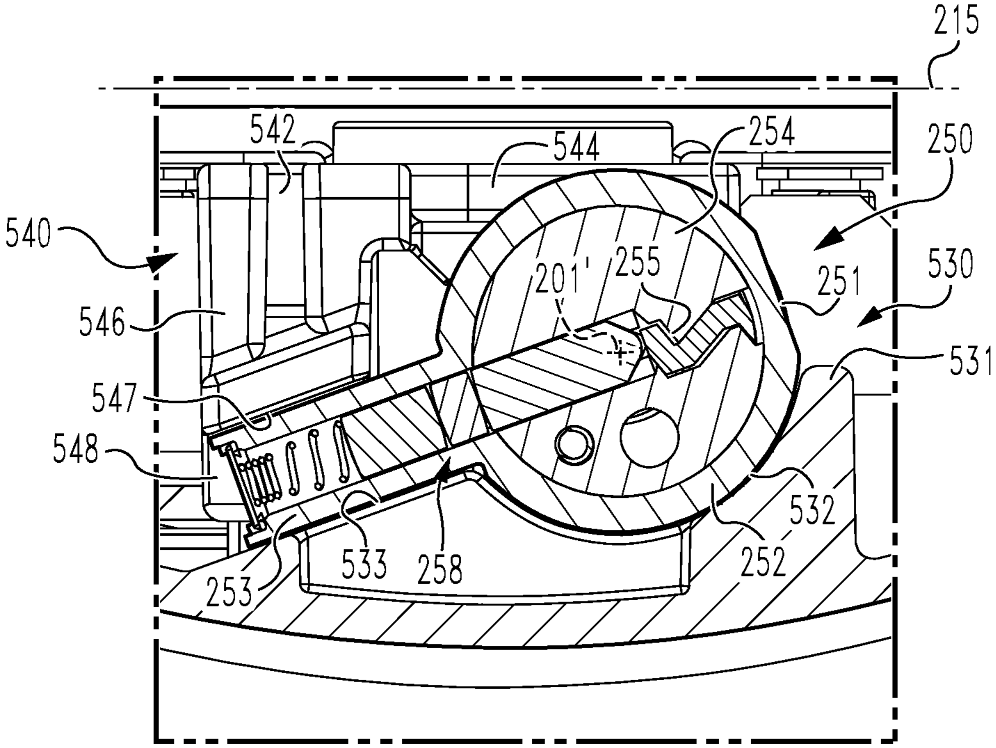
FIG. 13 is a cross-sectional view of a portion of the outside trim assembly, and illustrates features associated with the lock cylinder.

With additional reference to FIGS. 12 and 13, the lock cylinder 250 is mounted to the escutcheon 210 at the lock cylinder mounting location 530, and is secured at the mounting location 530 via a clamp 540. The lock cylinder 250 generally includes a shell 251 having a body 252 and a bible or tower 253 extending from the body 252, a plug 254 rotatably mounted in the body 252 of the shell 251, a tailpiece 256 coupled with the plug 254, and a tumbler assembly 258 configured to selectively prevent rotation of the plug 254 relative to the shell 251.

As is typical of lock cylinders, the tumbler assembly 258 permits rotation of the plug 254 relative to the shell 251 only when a proper key 259 is inserted into the keyway 255 of the plug 254. In the illustrated form, the tumbler assembly 258 is provided in the form of a pin tumbler assembly. It is also contemplated that the tumbler assembly 258 may include additional and/or alternative forms of tumblers, such as disc tumblers, wafer tumblers, and/or finger pins. Moreover, while the illustrated lock cylinder 250 is a key-in-lever format lock cylinder, it is also contemplated that other formats may be utilized, such as an interchangeable core format and/or a mortise format.

The tailpiece 256 extends along a rotational axis 201' into the receiving slot 464 of the override mechanism 460 such that the override mechanism 460 rotates in response to actuation of the lock cylinder 250. As a result, the lock cylinder 250 is operable to unlock the lock module 400 via the override mechanism 460 as described above. In the illustrated form, the plug 254 is engaged with the override mechanism 460 via the tailpiece 256. It is also contemplated that the tailpiece 256 may be omitted, and that the plug 254 may instead be directly coupled with the override mechanism 460.

In the illustrated form, the rotational axis 201' of the plug 254 is offset from and transverse to the longitudinal rotational axis 201 about which the support spindle 223, the handle 230, the drive spindle 240, and the hubs 420, 430 are rotatable. The offset distance defined between the rotational axes 201, 201' may provide additional room for internal components of the outside trim assembly 200. In the illustrated form, the axes 201, 201' are perpendicular to each other. It is also contemplated that the axes 201, 201' may be angularly offset from one another by an angle in the range of 80° to 100°.

The lock cylinder 250 is mounted in the lock cylinder mounting location 530, and is supported by the cradle 531. More particularly, the shell body 252 is seated in and supported by the arcuate wall 532 of the cradle 531, and the tower 253 is engaged with and supported by the oblique wall 533 of the cradle 531. As described herein, the clamp 540 maintains the position of the lock cylinder 250 within the escutcheon 210.

The clamp 540 generally includes a body portion 542, a first arm 544 extending from the body portion 542 in a first direction, and a second arm 546 extending from the body portion 542 in a second direction. In the illustrated form, the first direction and the second direction are transverse to one another. The body portion 542 includes a fastener opening 543 aligned with a corresponding fastener opening 537 formed in the post 536 such that the clamp 540 can be secured to the escutcheon 210 via an appropriate fastener, such as a screw. The first arm 544 covers a portion of the tailpiece 256 and provides support against shifting of the tailpiece 256 in one or more directions transverse to the rotational axis 201'. The second arm 546 includes an oblique wall 547 that runs generally parallel to the oblique wall 533 such that the tower 253 is captured between the oblique walls 533, 547, thereby preventing rotation of the shell 251 relative to the escutcheon 210. The tower 253 is also captured between a finger 548 of the clamp 540 and a wall of the escutcheon 210, and is thereby prevented from shifting along the axis 201'.

Figure 14:
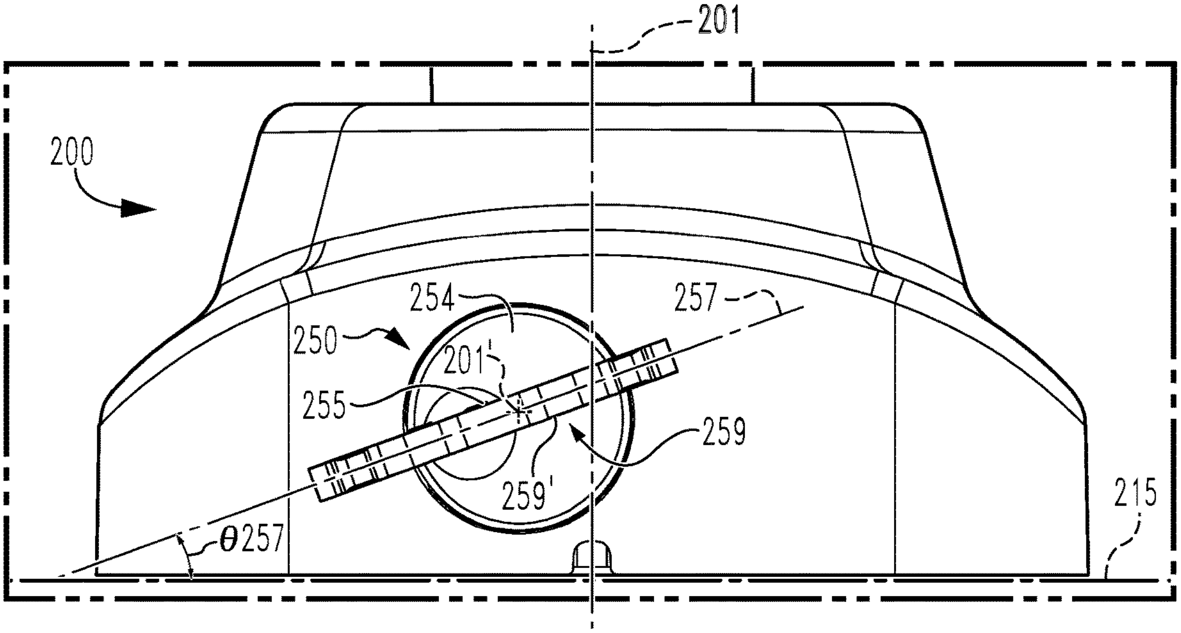
FIG. 14 is a bottom-up view of the outside trim assembly with a plug of the lock cylinder in a home position.
Figure 15:
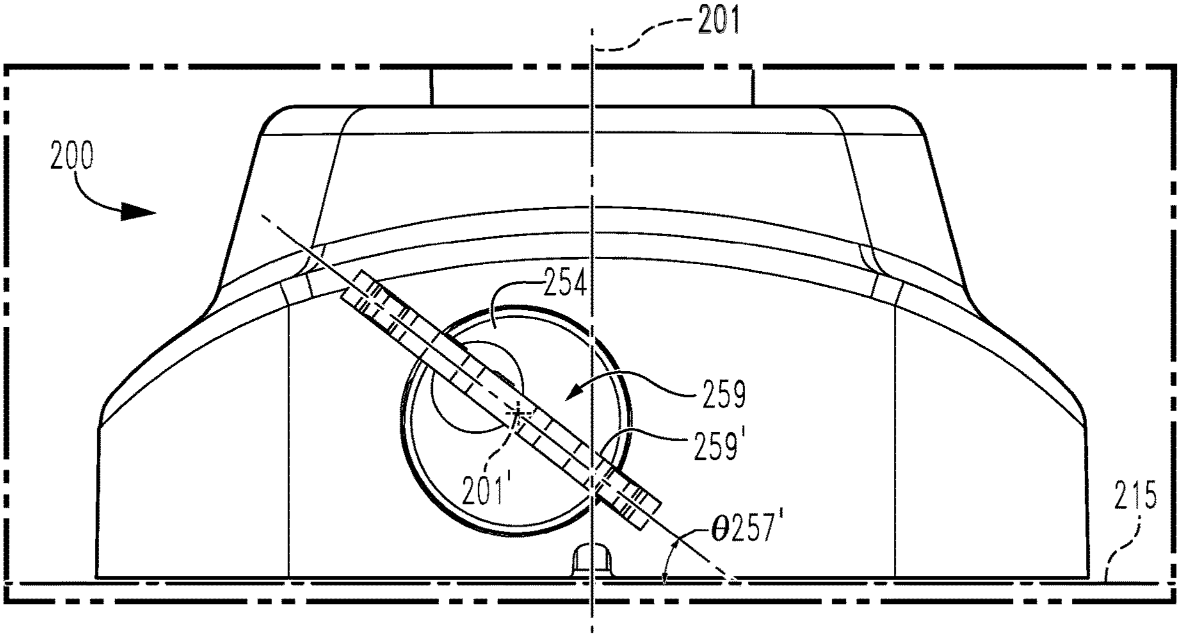
FIG. 15 is a bottom-up view of the outside trim assembly with a plug of the lock cylinder in a rotated position.

With additional reference to FIGS. 14 and 15, when the proper key 259 is inserted into the keyway 255, the plug 254 is rotatable relative to the shell 251 and the escutcheon 210 between a home position (FIG. 14) and a rotated position (FIG. 15). As will be appreciated by those skilled in the art, when the key 259 is not inserted, the plug 254 is locked in its home position by the tumbler assembly 258. The keyway 255 extends along and defines a keyway plane 257, which is shared by the bow 259' of the key 259 when the shank of the key 259 is inserted into the keyway 255.

With the plug 254 in its home position (FIG. 14), the override mechanism 460 is in a corresponding home position, and the electromechanical drive assembly 450 is free to transition the lock module 400 between its locked and unlocked conditions. Additionally, the keyway plane 257 defines a first oblique angle θ257 relative to the rear plane 215 of the escutcheon 210 when the plug 254 is in its home position.

With the plug 254 in its rotated position (FIG. 15), the override mechanism 460 is in a corresponding rotated position, and retains the lock module 400 in its unlocked condition as described above. Additionally, the keyway plane 257 defines a second oblique angle θ257' relative to the rear plane 215 of the escutcheon 210 when the plug 254 is in its rotated position.

As should be appreciated, with the plug 254 in its home position, rotation of the inserted key 259 in an unlocking direction (clockwise in FIGS. 14 and 15) rotates the plug 254 from its home position to its rotated position, thereby unlocking the lock module 400. In certain prior approaches, the keyway plane is provided parallel to the rear plane of the escutcheon. However, it has been found that such a parallel arrangement may cause the key bow 259' to engage the door (the surface of which may be generally coincident with the rear plane 215) during actuation of a lock cylinder. In the present arrangement, by contrast, the plug 254 is operable to rotate through its normal actuation range (e.g., a range of about 60°) without causing interference between the key bow 259' and the door, thereby facilitating the mechanical override procedure.

While other angles are contemplated, in the illustrated form, the first oblique angle θ257 is about 20° (e.g., between 15° and 25° or between 10° and 30°), and the second oblique angle θ257' is about 40° (e.g., between 35° and 45° or between 30° and 50°). Thus, rotation of the plug 254 from its home position to its rotated position causes the keyway plane 257 to rotate by about 60° (e.g., between 50° and 70°) for actuation of the override mechanism 460 and mechanical override of the locked/unlocked state of the outside trim assembly 200. In certain forms, the first oblique angle θ257 is at least 5°, or at least 10°.

Figure 16:
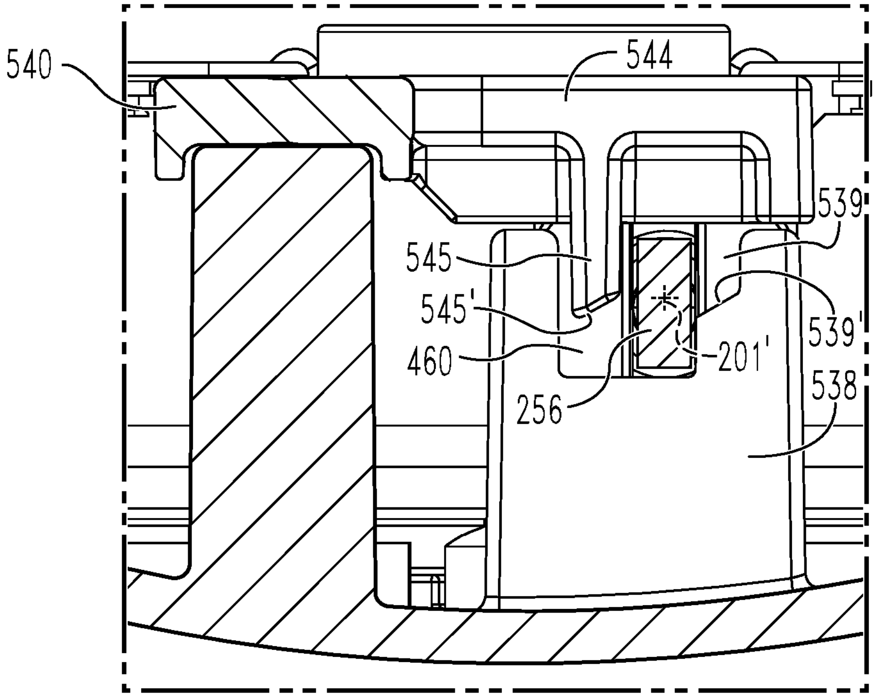
FIG. 16 is a cross-sectional view of a portion of the outside trim assembly, and illustrates a tailpiece in a home position.
Figure 17:
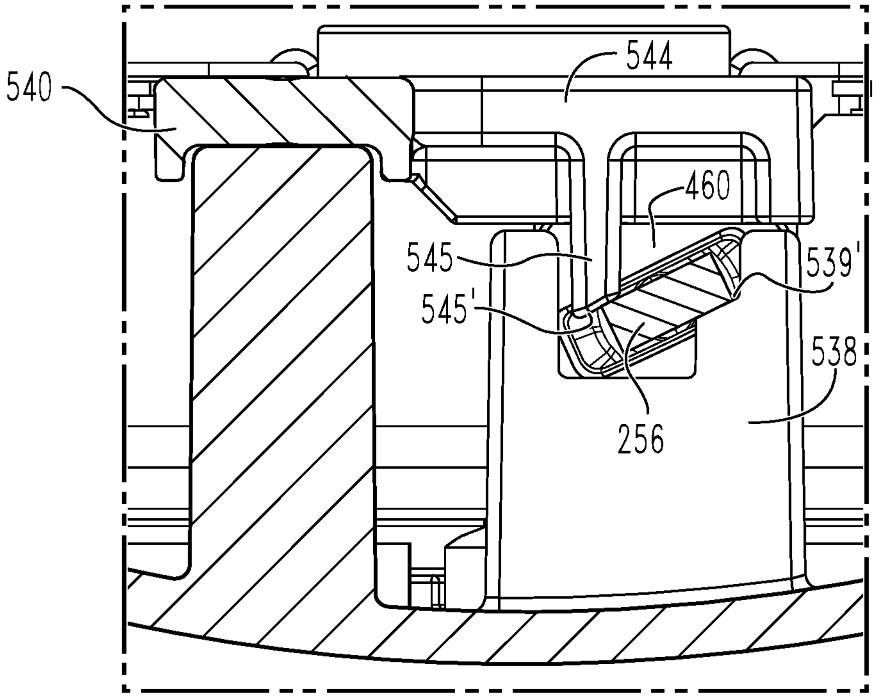
FIG. 17 is a cross-sectional view of a portion of the outside trim assembly, and illustrates a tailpiece in a rotated position.

With additional reference to FIGS. 16 and 17, illustrated therein is a portion of the outside trim assembly 200 with the plug 254 in its home position (FIG. 16) and with the plug 254 in its rotated position (FIG. 17). As noted above, a portion of the tailpiece 256 is covered by the first arm 544 of the clamp 540. This portion of the tailpiece 256 is also received in a recess 539 defined by a flange 538 of the lock cylinder mounting location 530. When the plug 254 is in its home position and the proper key 259 is inserted, the tailpiece 256 is free to rotate relative to the escutcheon 210 in the unlocking direction (clockwise in FIGS. 16 and 17). When the plug 254 is driven to its rotated position (FIG. 17), the tailpiece 256 engages the flange 538 and a projection 545 of the first arm 544 to thereby prevent further rotation of the plug 254 in the unlocking direction. More particularly, a first portion of the tailpiece 256 engages an oblique surface 545' of the projection 545, and a second portion of the tailpiece 256 engages an oblique surface 539' of the flange 538. As a result, the clamp 540 cooperates with the escutcheon 210 to prevent rotation of the plug 254 beyond the rotated position by engaging the tailpiece 256.

Figure 18:
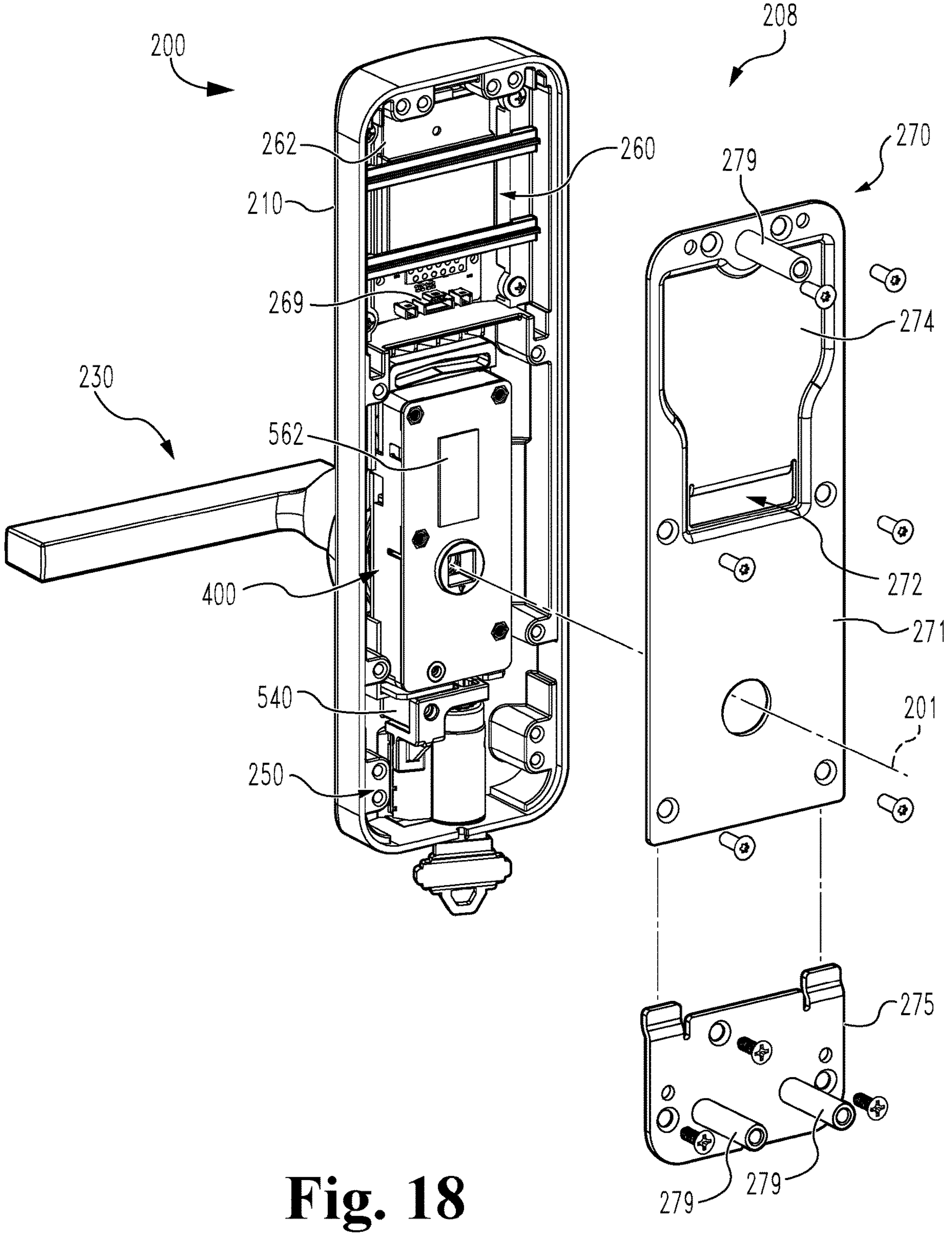
FIG. 18 is a partially-exploded assembly view of the outside trim assembly.

With additional reference to FIG. 18, the backplate assembly 270 generally includes a main backplate 271, a separate secondary plate 275, and one or more posts or ferrules 279, each of which is mounted to one of the main backplate 271 or the secondary plate 275. In certain embodiments, the backplate assembly 270 and the escutcheon 210 may be considered to at least partially define a housing assembly 208 of the outside trim assembly 200.

The main backplate 271 encloses the lock module 400 and various other components of the outside trim assembly 200 within the escutcheon 210, while the secondary plate 275 encloses the lock cylinder 250 and the clamp 540 within the escutcheon 210. The main backplate 271 includes a wiring opening 272 through which a wire harness may extend for connection with the connector 269. In the illustrated form, the wiring opening 272 is formed in a recessed portion 274 of the main backplate 271, which provides a pocket 203 (FIG. 40) between the main backplate 271 and the door such that a portion of the wire harness 190 may be accommodated between the main backplate 271 and the door while another portion of the wire harness 190 extends through an opening in the door for connection with the inside trim assembly 300. As described herein, the secondary plate 275 is operable to be removed from the escutcheon 210 separately of the main backplate 271 to facilitate rekeying of the outside trim assembly 200.

It may be the case that a user desires to change the key 259 by which the lock cylinder 250 is operable. In such cases, it may be desirable to remove the lock cylinder 250 for replacement or repinning. In order to do so, the user may remove the secondary plate 275 to expose the lock cylinder 250 and the clamp 540, which may then be removed. The lock cylinder 250 may then be repinned or replaced with a new lock cylinder along the lines described herein. While the rekeying process described herein involves removing the lock cylinder 250 for repinning or replacement, it is also contemplated that the lock cylinder 250 may be a rekeyable lock cylinder of the type that is operable to be rekeyed in situ.

With additional reference to FIGS. 19-27, illustrated therein are certain example steps that may be taken to install a lock cylinder to the outside trim assembly 200. In certain embodiments, the following installation procedure may take place in a factory setting, for example during initial assembly of the outside trim assembly 200. It is also contemplated that the installation procedure may take place elsewhere, such as in the event that a user desires to replace the existing lock cylinder 250 for the outside trim assembly 200.

Figure 21:
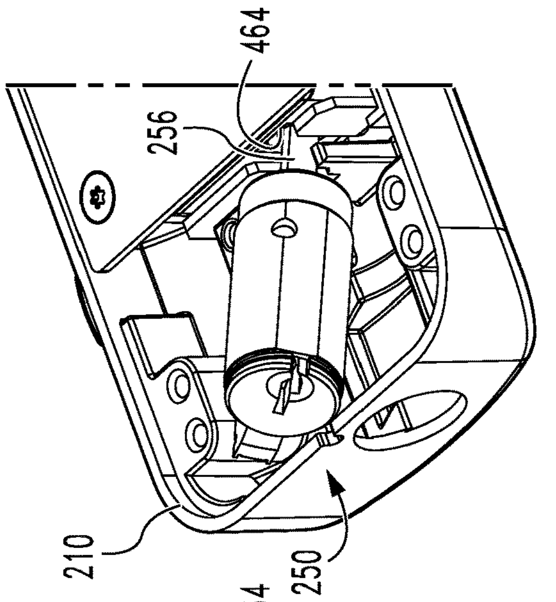
FIGS. 19-27 illustrate a portion of the outside trim assembly at various stages during installation of the lock cylinder.
Figure 20:
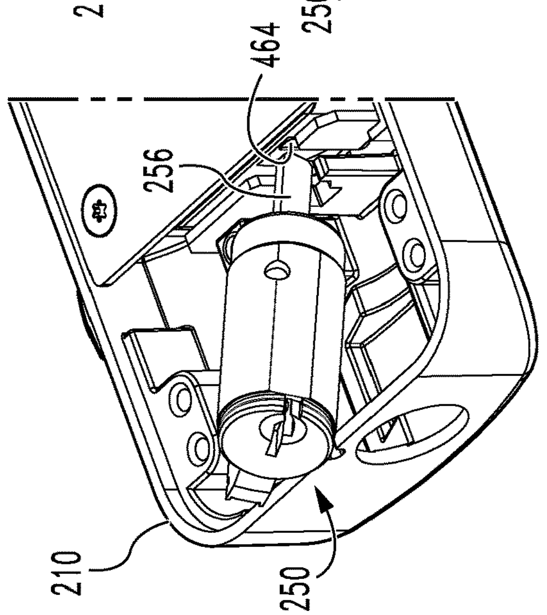
Figure 19:
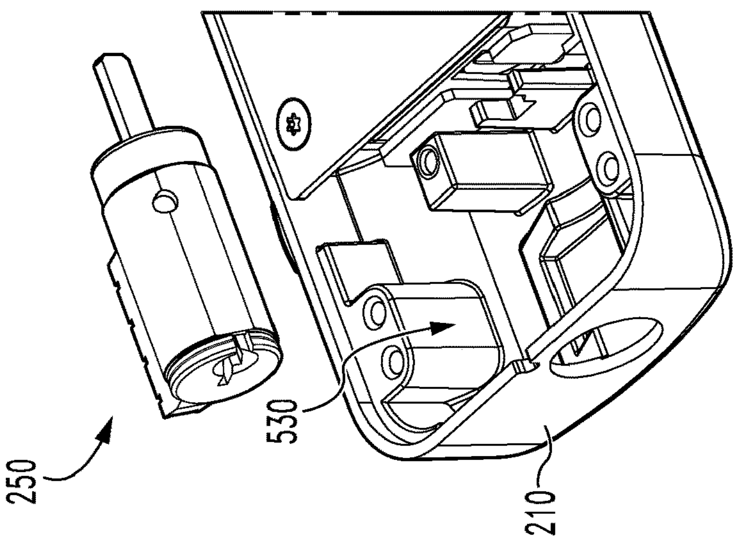
Figure 22:
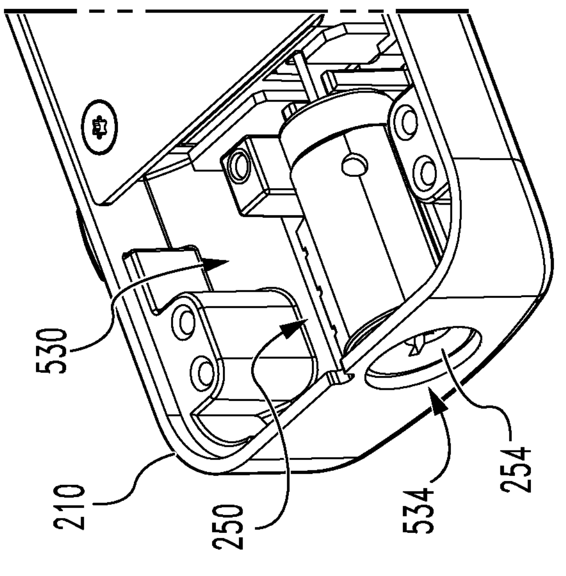
Figure 23:
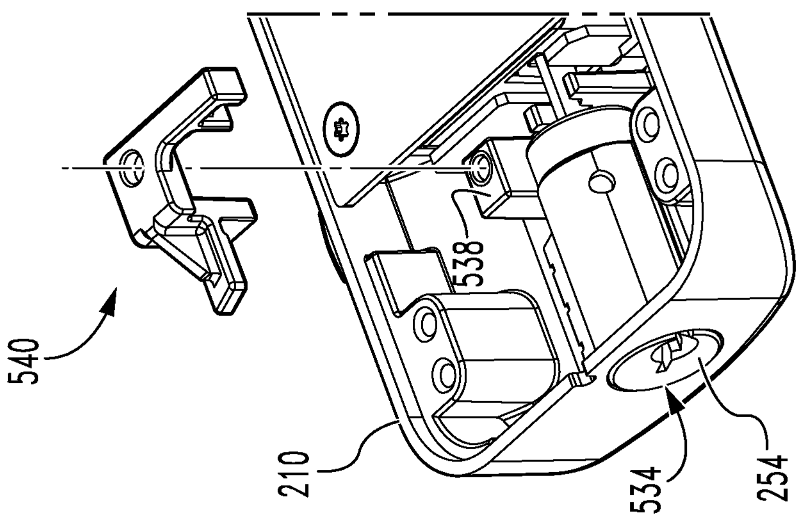
Figure 24:
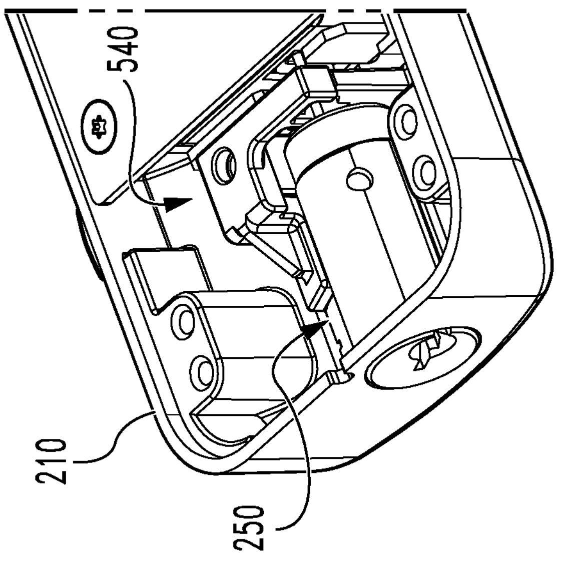

In order to install the lock cylinder 250, the lock cylinder 250 may first be positioned above the area opened by removal of the secondary plate 275 (FIG. 19). The lock cylinder 250 may then be angled such that the tailpiece 256 extends toward the override mechanism 460 (FIG. 20), and moved toward the lock module 400 to thereby insert the tailpiece 256 into the slot 464 of the override mechanism 460 (FIG. 21). The lock cylinder 250 may then be pushed downward such that the shell body 252 engages the arcuate wall 532 and the tower 253 engages the oblique wall 533 (FIG. 22). The lock cylinder 250 may then be pushed toward the perimeter wall of the escutcheon 210 such that the face of the plug 254 seats in the aperture 534 (FIG. 23). With the lock cylinder 250 seated, the clamp 540 may be moved into engagement with the post 536 (FIG. 24), and thereafter secured to the post 536 with an appropriate fastener.

Figure 27:
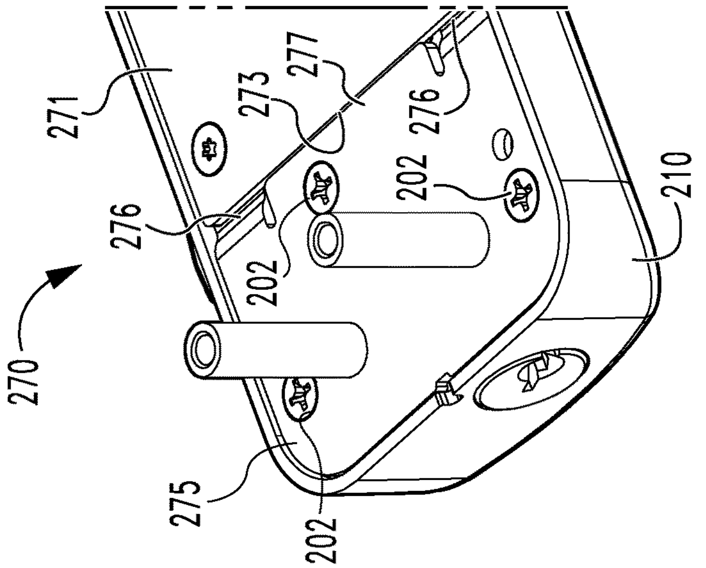
Figure 26:
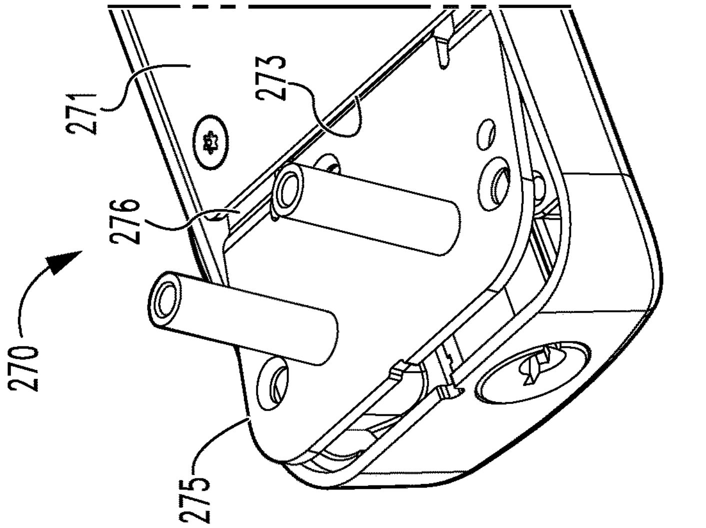
Figure 25:
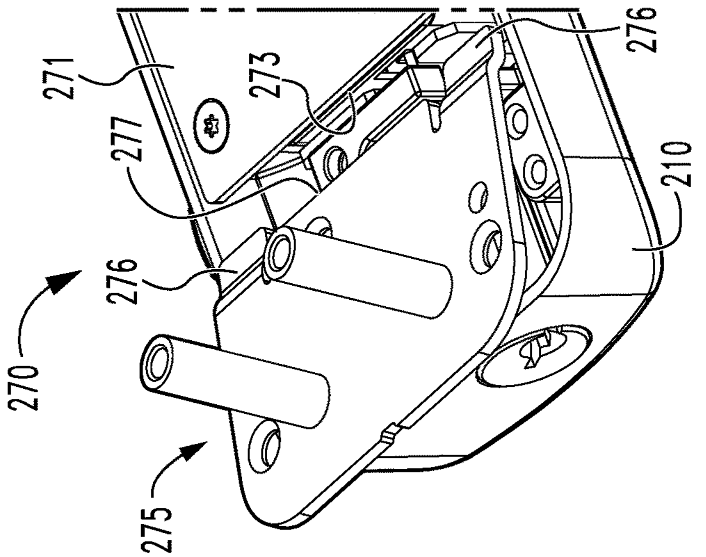
Figure 29:
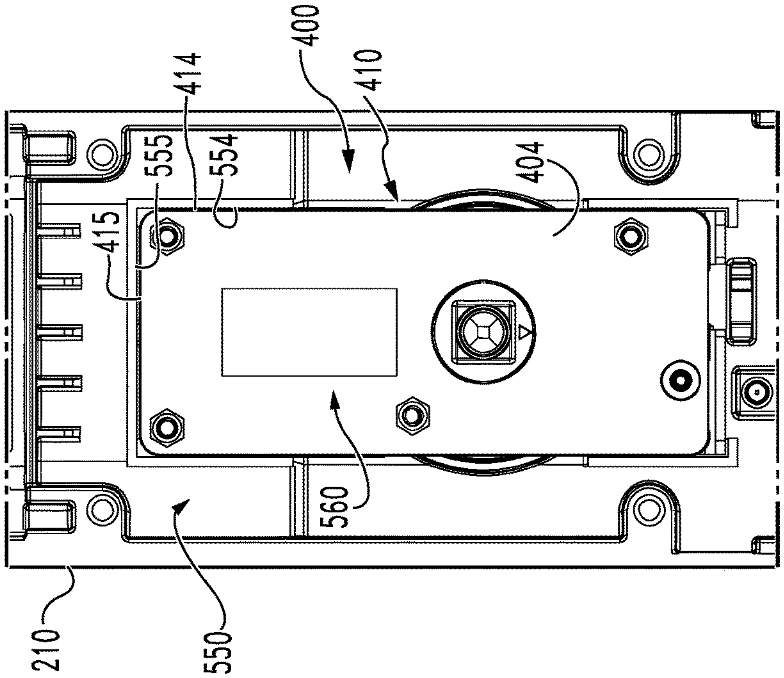
FIG. 29 is a plan view of a portion of the outside trim assembly.
Figure 28:
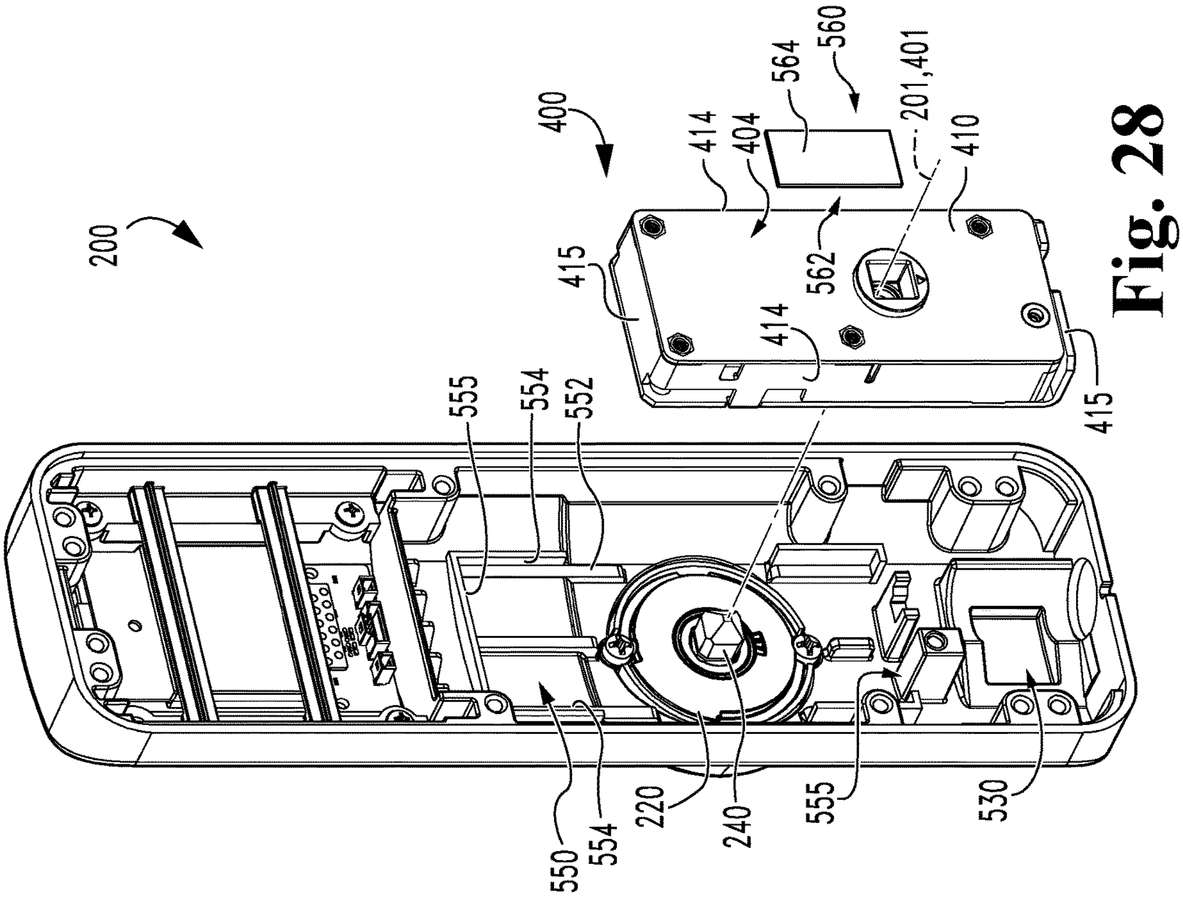
FIG. 28 is a partially-exploded assembly view of the outside trim assembly.
Figure 31:
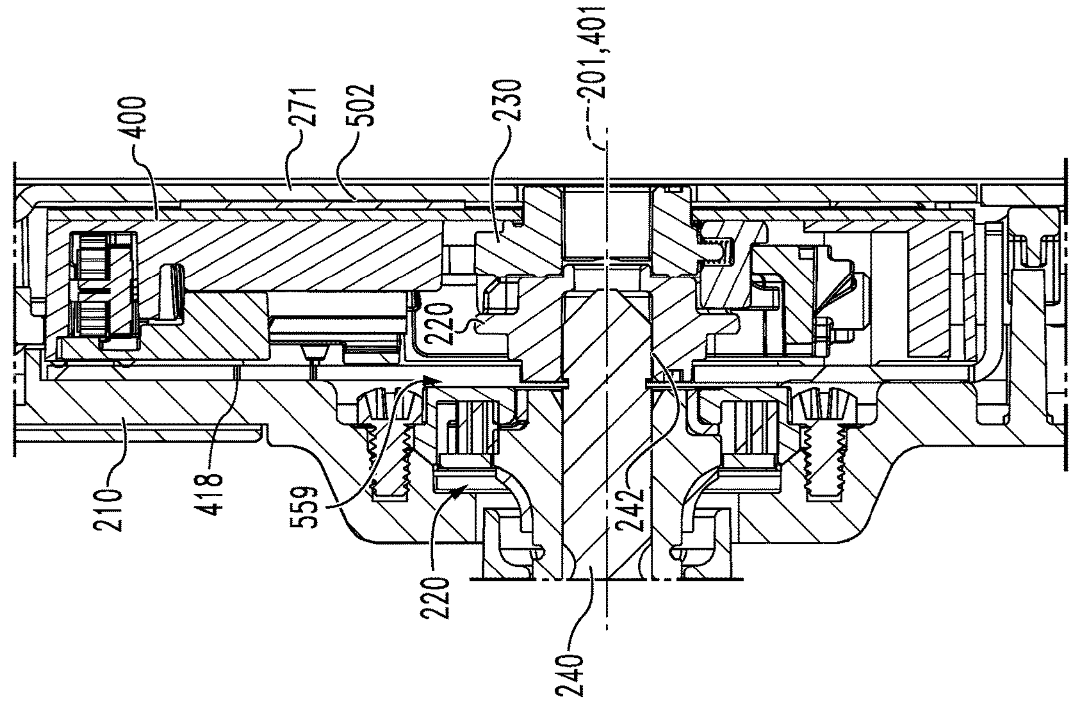
FIG. 31 is a cross-sectional view of a portion of the outside trim assembly, and illustrates features associated with the lock module.
Figure 30:
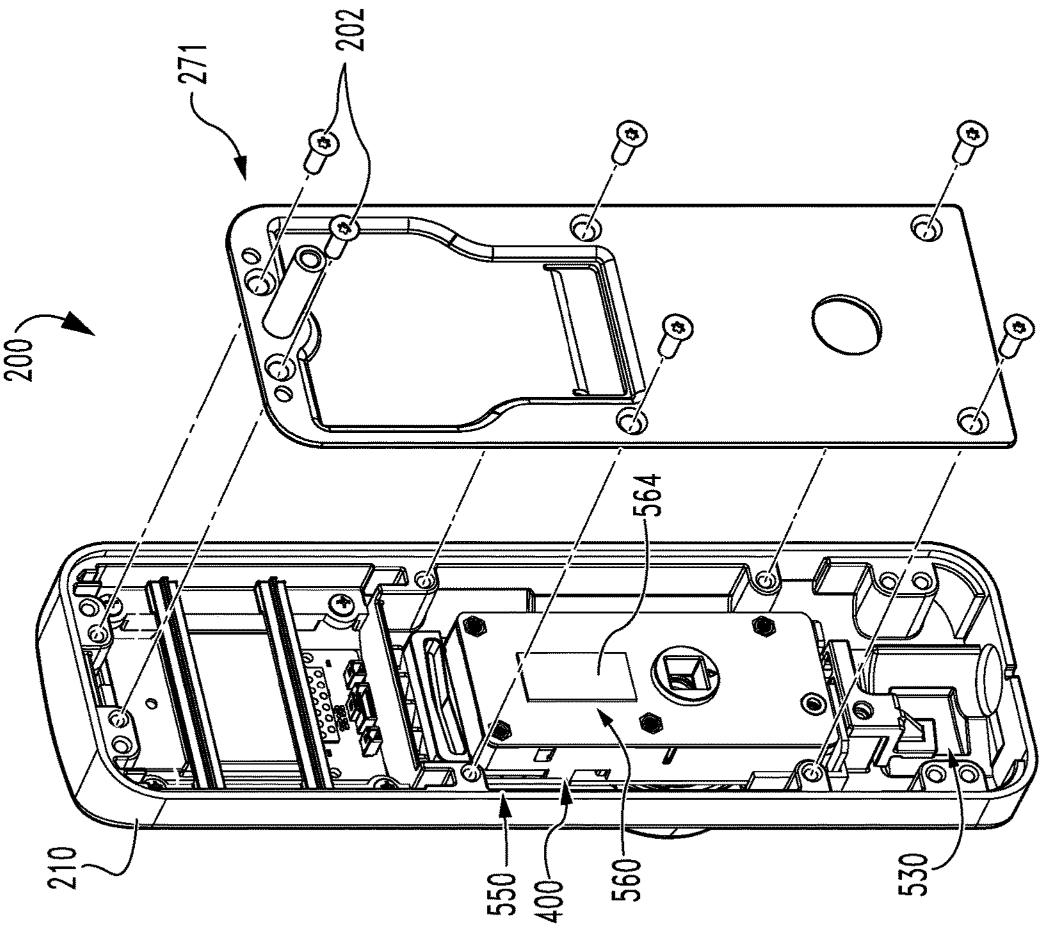
FIG. 30 is a partially-exploded assembly view of the outside trim assembly.
Figure 33:
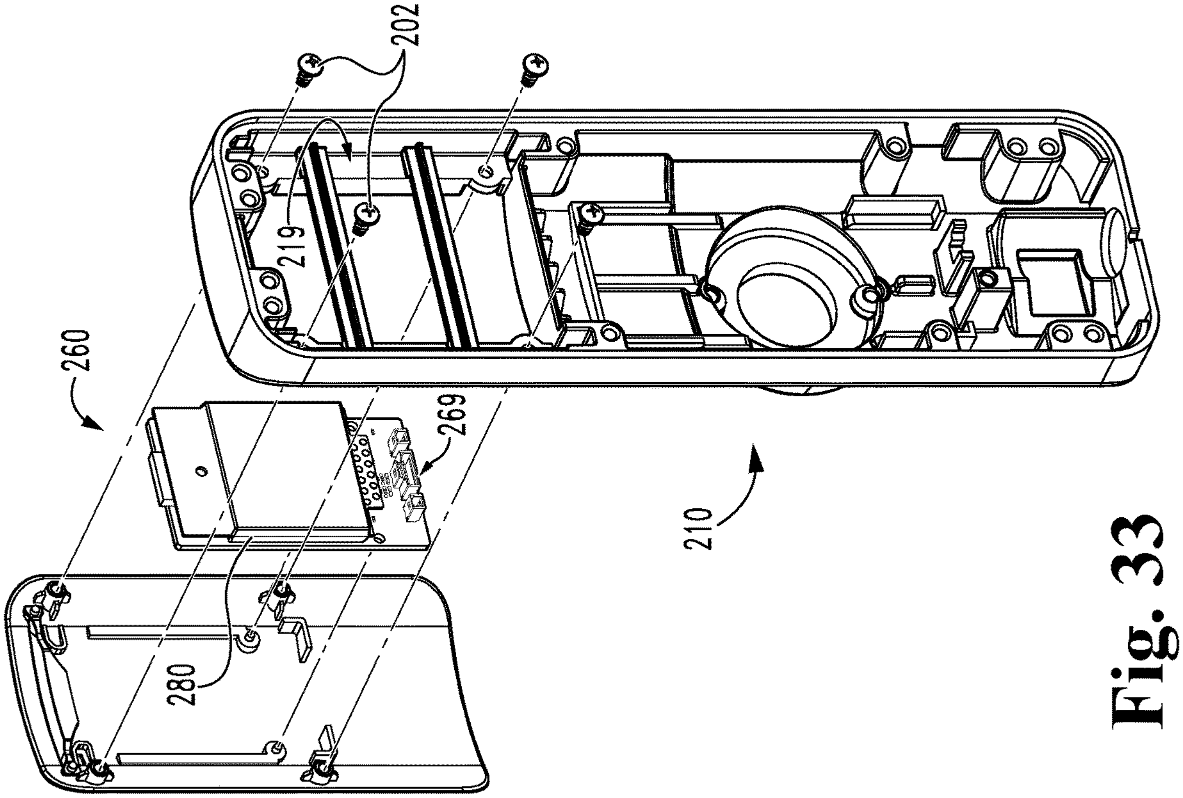
FIG. 33 is a partially-exploded assembly view of a portion of the outside trim assembly.
Figure 32:
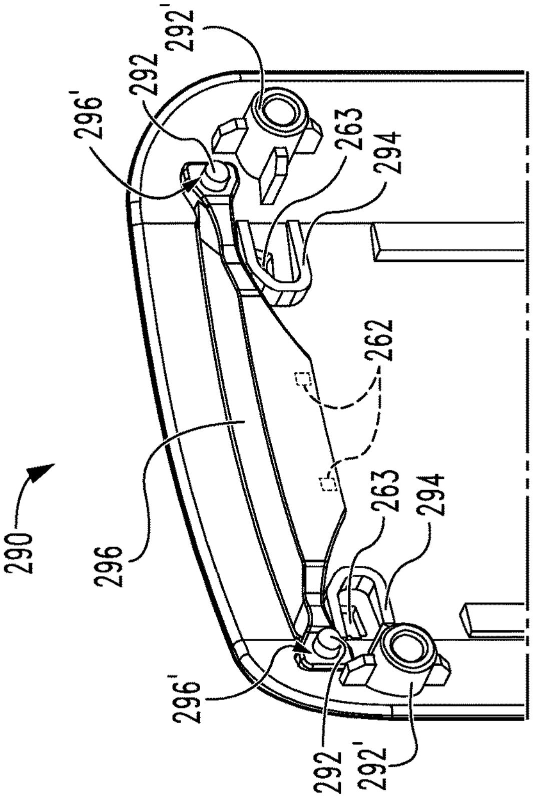
FIG. 32 is a perspective view of a portion of a front cover of the outside trim assembly.
Figure 34:
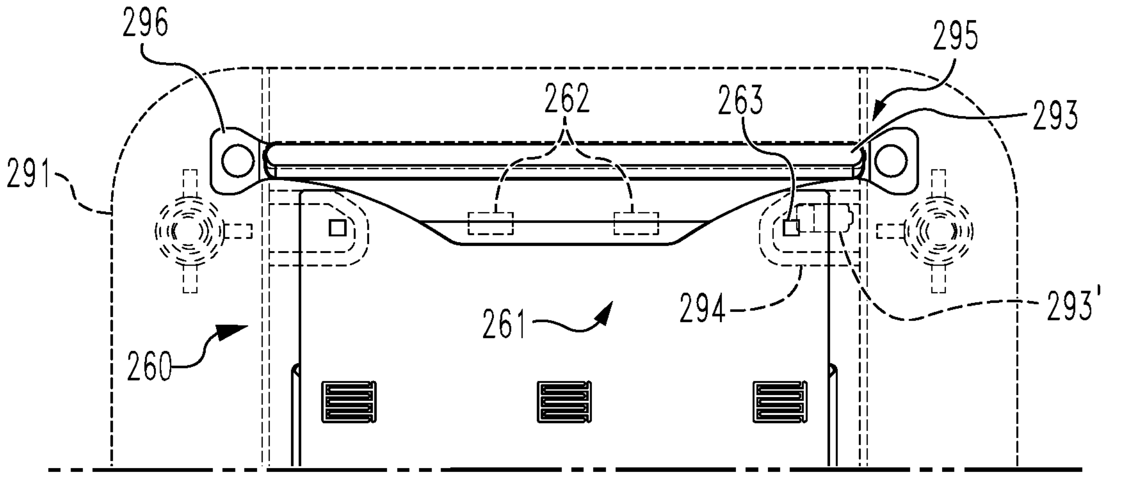
FIG. 34 is a plan view of a portion of the outside trim assembly.
Figure 35:
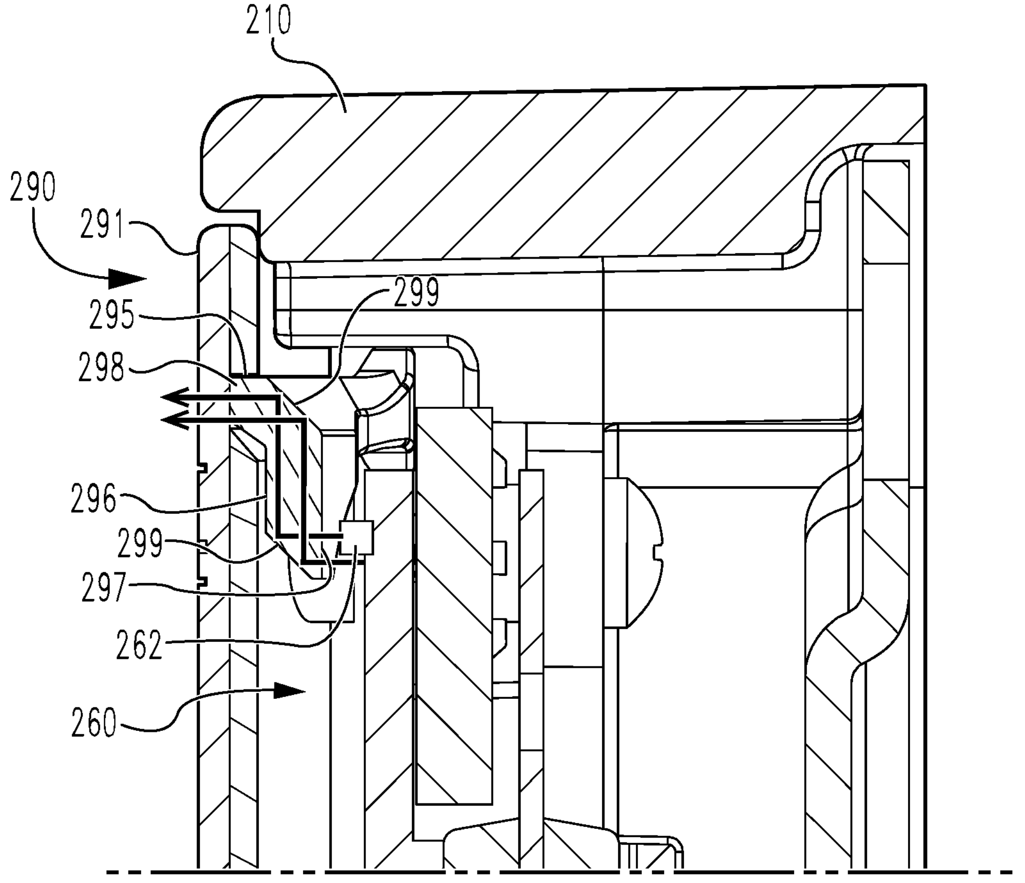
FIG. 35 is a cross-sectional view of a portion of the outside trim assembly, and illustrates features associated with a light guide.

With the lock cylinder 250 installed, the secondary plate 275 may be secured to the escutcheon 210 to thereby enclose the lock cylinder 250 within the escutcheon 210. Such installation of the secondary plate 275 may begin with holding the plate 275 at an angle relative to the escutcheon 210 such that tabs 276 of the secondary plate 275 extend toward the main backplate 271 (FIG. 25). The tabs 276 extend beyond a top edge 277 of the secondary plate 275, and can thus be inserted below the bottom edge 273 of the main backplate 271 (FIG. 26). The secondary plate 275 may then be moved to a horizontal orientation in which the tabs 276 are positioned behind the bottom edge 273 and the rear face of the secondary plate 275 is aligned with the rear face of the escutcheon 210, and secured to the escutcheon 210 using one or more fasteners 202 (FIG. 27).

With additional reference to FIGS. 28-31, illustrated therein is a portion of the outside trim assembly 200 during installation of the lock module 400. In certain embodiments, such installation of the lock module 400 may take place after installation of the spring cage 220 and prior to installation of the lock cylinder 250. Thus, the lock module installation procedure may begin in the state illustrated in FIG. 10, in which the spring cage 220 has been mounted in the pocket 212. The lock module 400 may then be inserted into the lock module mounting location 550 such that the edges of the housing 410 are adjacent the walls of the mounting location 550. With the lock module 400 seated in the mounting location 550, the transverse or vertical edges 414 of the lock module housing 410 are adjacent the transverse or vertical walls 554 of the mounting location 550, thereby limiting lateral shifting of the lock module 400. Similarly, the lateral or horizontal edges 415 of the lock module housing 410 are adjacent the lateral or horizontal walls 555 of the mounting location 550, thereby limiting transverse shifting of the lock module 400. Insertion of the lock module 400 into the mounting location 550 may also cause the engagement portion 242 of the drive spindle 240 to engage the spindle engagement feature 424 of the first hub 420, thereby coupling the drive spindle 240 with the first hub 420.

In certain embodiments, installation of the lock module 400 may involve the use of one or more shims 560. In the illustrated form, a shim 560 is positioned between the lock module housing 410 and the main backplate 271. The shim 560 may be formed of a soft material, such as a material having a lower hardness than the escutcheon 210. In certain embodiments, the shim 560 may be formed of a foam material and/or an elastomeric material. In certain embodiments, the shim 560 may be adhered to the lock module housing 410 and/or the main backplate 271. For example, the shim 560 may include an adhesive side 562 (e.g., one that is exposed by removing a protective film) and an opposite side 564, and the shim 560 may be adhered to one of the lock module housing 410 or the main backplate 271 using the adhesive side 562. In the illustrated form, the adhesive side 562 faces the lock module 400, and the shim 560 is adhered to the lock module 400 via the adhesive side 562. In addition or as an alternative to an adhesive side facing the lock module 400, the shim 560 may comprise an adhesive side facing the main backplate 271, and may be adhered to the main backplate 271 via such an adhesive side.

Regardless of whether or not an adhesive is utilized, the shim 560 may be placed between the housing 410 and a portion of the housing assembly 208. For example, the shim 560 may be placed between the housing 410 and the main backplate 271, and the backplate 271 may be secured to the escutcheon 210 (e.g., using one or more fasteners 202) to retain the shim 560 between the housing 410 and the backplate 271, thereby limiting longitudinal movement of the lock module 400. With the shim 560 so positioned, the shim 560 provides a snug abutment between the housing 410 and the backplate 271 to thereby minimize shifting, rocking, and/or rattling that may otherwise occur (e.g., due to manufacturing tolerances).

As should be evident from the foregoing, with the lock module 400 installed, lateral and transverse shifting of the lock module 400 are limited by engagement of the walls 554, 555 with the edges 414, 415 of the lock module housing 410. Additionally, longitudinal shifting of the lock module 400 is limited by engagement of the front side 402 of the lock module 400 with the floor 552, and by engagement of the rear side 404 of the lock module 400 with the main backplate 271 (e.g., via the shim 560). Although a single shim 560 is illustrated as being positioned between the housing 410 and the backplate 271, it is also contemplated that one or more shims may be positioned at additional and/or alternative locations. For example, one or more shims may be positioned between the front side of the housing 410 and the floor 552, one or more shims may be positioned between a vertical edge 414 of the housing 410 and the corresponding transverse wall 554, and/or one or more shims may be positioned between a horizontal edge 415 of the housing 410 and the corresponding lateral wall 515.

In the illustrated form, the floor 552 of the lock module mounting location 550 is positioned rearward of the rear side of the spring cage 220. As a result, when the lock module 400 is seated in the mounting location 550, a gap 559 (FIG. 31) is defined between the front side 402 of the lock module 400 and the rear side of the spring cage 220. This may aid in discouraging the spring cage 220 from binding with the lock module 400.

With additional reference to FIGS. 32-35, further details regarding the assembly and installation of the PCBA 260 and front cover 290 will now be provided. The illustrated PCBA 260 comprises the credential reader 280, and in the illustrated form further comprises a plurality of light sources such as light-emitting diodes (LEDs) 261, and a connector 269 configured to connect with the wire harness 190. The plurality of LEDs 261 includes at least one first LED 262 and at least one second LED 263. As described herein, light emitted by the at least one first LED 262 is guided by a light guide 296 of the front cover 290, and light emitted by the at least one second LED 263 is isolated from the light guide 296. While the light sources of the illustrated embodiment are provided in the form of LEDs, it should be appreciated that other light sources (e.g., incandescent and/or fluorescent light sources) may be utilized.

The front cover 290 generally includes a cover panel 291 and a light guide 296 mounted to the cover panel 291. The cover panel 291 is passive to select bands of electromagnetic radiation (e.g., radio frequency, infrared, etc.), which may facilitate wireless communication with one or more external devices (e.g., a mobile device, an access control system, or a credential such as a proximity card or smart card). The rear side of the illustrated cover panel 291 includes one or more staking posts 292, one or more mounting posts 292', and one or more isolation walls 294. Additionally, a channel 295 is formed within the cover panel 291 and is aligned with a first display region 293 of the cover panel 291. As described herein, the staking posts 292 facilitate mounting of the light guide 296 to the cover panel 291, the mounting posts 292' facilitate mounting of the front cover 290 to the escutcheon 210, the channel 295 facilitates the display of light from the first LED(s) 262 in the first display region 293, and the isolation walls 294 aid in isolating the light emitted by the second LED(s) 263.

The light guide 296 generally includes an input region 297, an output region 298, and one or more mirrored walls 299 that reflect light from the input region 297 to the output region 298. As described herein, the input region 297 is aligned with the one or more first LEDs 262, the output region 298 is aligned with the channel 295, and the mirrored wall(s) 299 direct light emitted by the first LED(s) 262 to the output region 298. The light guide 296 also includes one or more openings 296' configured to receive the one or more staking posts 292, which may then be deformed to stake the light guide 296 to the front panel 291, for example via heat staking.

It should be evident from the foregoing that light emitted by the first LED(s) 262 will be displayed in the output region 298 and visible within the channel 295. Light emitted by the second LED(s) 263, however, will not be guided by the light guide 296. Instead, each second LED 263 is isolated from the input region 297 by a corresponding isolation wall 294. The isolation wall(s) 294 thereby discourage light emitted by the second LED(s) 263 from being displayed in the output region 298, such that the light emitted by the second LED 263 is instead visible via a second display region 293' of the cover panel 291.

In the illustrated form, each first LED 262 is a status-indicating LED configured to display information relating to a current status of the lockset 100. For example, one or more of the first LEDs 262 may illuminate to indicate that the lockset 100 is operational, to indicate that a wireless communication device 268 of the PCBA 260 is active, and/or to convey additional information regarding the status and/or operation of the lockset 100. While other forms are contemplated, in the illustrated form, at least one second LED 263 illuminates to indicate a low-battery condition. In certain embodiments, the second display region 293' may be provided in the form of a transparent or translucent icon (e.g., a battery icon) that is aligned with the LED 263 to more clearly indicate to the user that illumination of the LED 263 corresponds to the low-battery condition.

During assembly of the outer outside trim assembly 200, the light guide 296 may be staked to the cover panel 291 using the staking posts 292. In certain embodiments, at least a portion of the PCBA 260 may be secured to the cover panel 291, for example via one or more fasteners 202. The PCBA 260 may be inserted into the PCBA mounting location 219, and one or more fasteners 202 may be utilized to secure the front cover 290 to the escutcheon 210, such as using the one or more mounting posts 292'.

Figure 36:
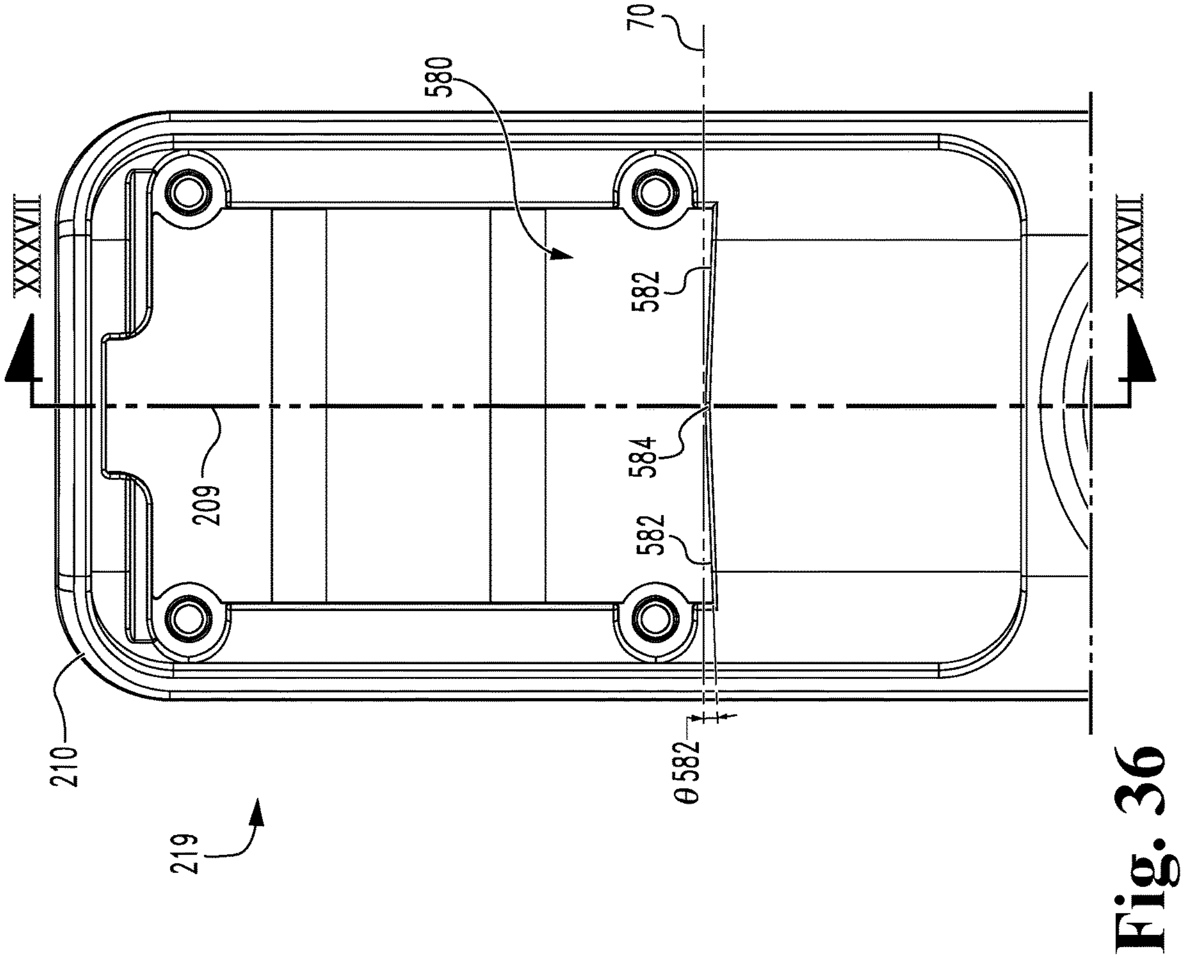
FIG. 36 is a plan view of a portion of the escutcheon.

With additional reference to FIG. 36, the illustrated outside escutcheon 210 further includes a water management arrangement 580. In certain forms, the outside trim assembly 200 may be mounted on the outer side of an exterior door of a building such that the outside trim assembly 200 may be exposed to precipitation. It has been found that even when seals and gaskets are used to discourage the collection of precipitation and/or condensation within an outside trim assembly, water may nonetheless collect within an outside trim assembly. As described herein, the water management arrangement 580 may aid in directing such collected water away from one or more portions of the outside trim assembly 200 that may be more prone to degradation, deterioration, or interference by water, such as the lock cylinder 250 and/or the lock module 400.

In the illustrated form, the lower portion of the PCBA mounting location 219 includes a pair of slopes 582 that meet at a peak 584 formed near a central vertical plane 209 of the escutcheon 210. Each of the slopes 582 declines from the peak 584 at a first oblique angle θ582 relative to a horizontal plane 70. As a result, any water (e.g., precipitation and/or condensation) that collects about the perimeter of the front cover 290 will be diverted away from the peak 584 toward the lateral sides of the mounting location 219. While other forms are contemplated, in the illustrated form, the first oblique angle θ582 is between 1° and 5°, and may be about 3°.

Figure 37:
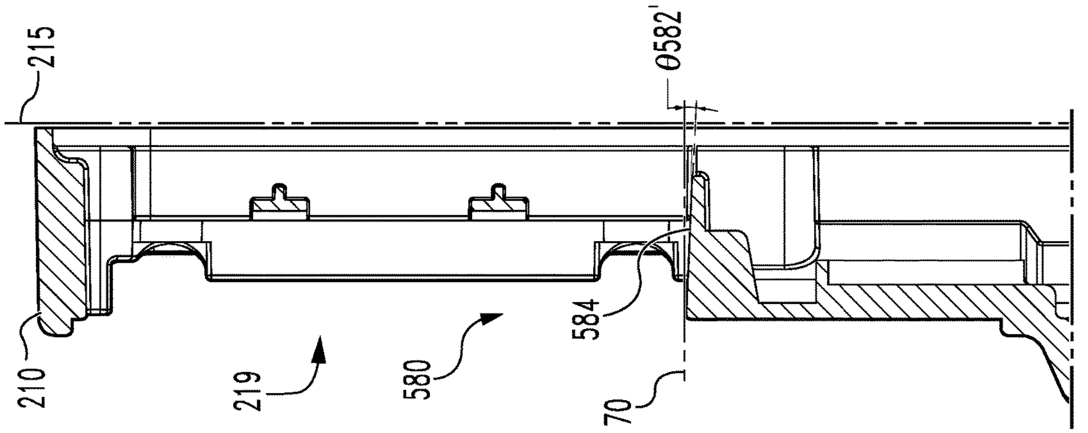
FIG. 37 is a cross-sectional view of a portion of the escutcheon, taken along the line XXXVII-XXXVII illustrated in FIG. 36.

With additional reference to FIG. 37, the slopes 582 and the peak 584 are also angled relative to the horizontal plane 70 toward the rear plane 215 at a second oblique angle θ582'. As a result, any water (e.g., precipitation and/or condensation) that collects about the perimeter of the front cover 290 will be diverted into the interior of the escutcheon 210, and not down the front face of the escutcheon 210. While other forms are contemplated, in the illustrated form, the second oblique angle θ582' is between 1° and 5°, and may be about 3°. In the illustrated embodiment, the slopes 582 are angled relative to both the vertical plane 209 perpendicular to the rear plane 215 and the horizontal plane 70 perpendicular to the rear plane 215. It is also contemplated that the slopes 582 may be parallel to one of the planes 70, 209.

Figure 38:
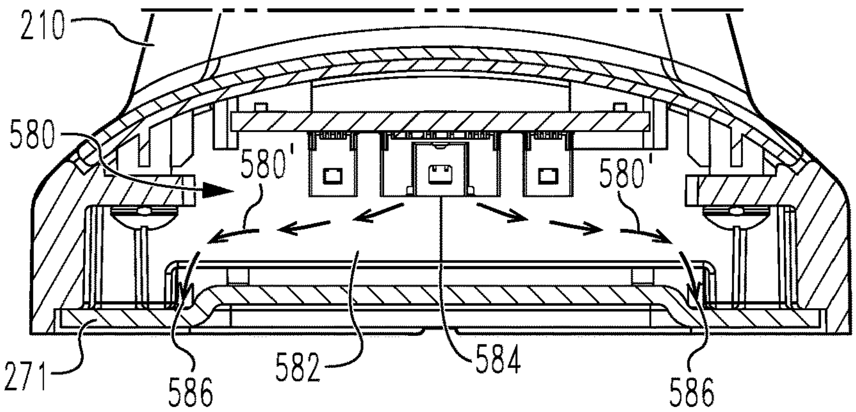
FIG. 38 is a top-down cross-sectional view of a portion of the outside trim assembly, and illustrates features associated with a water management arrangement.
Figure 39:
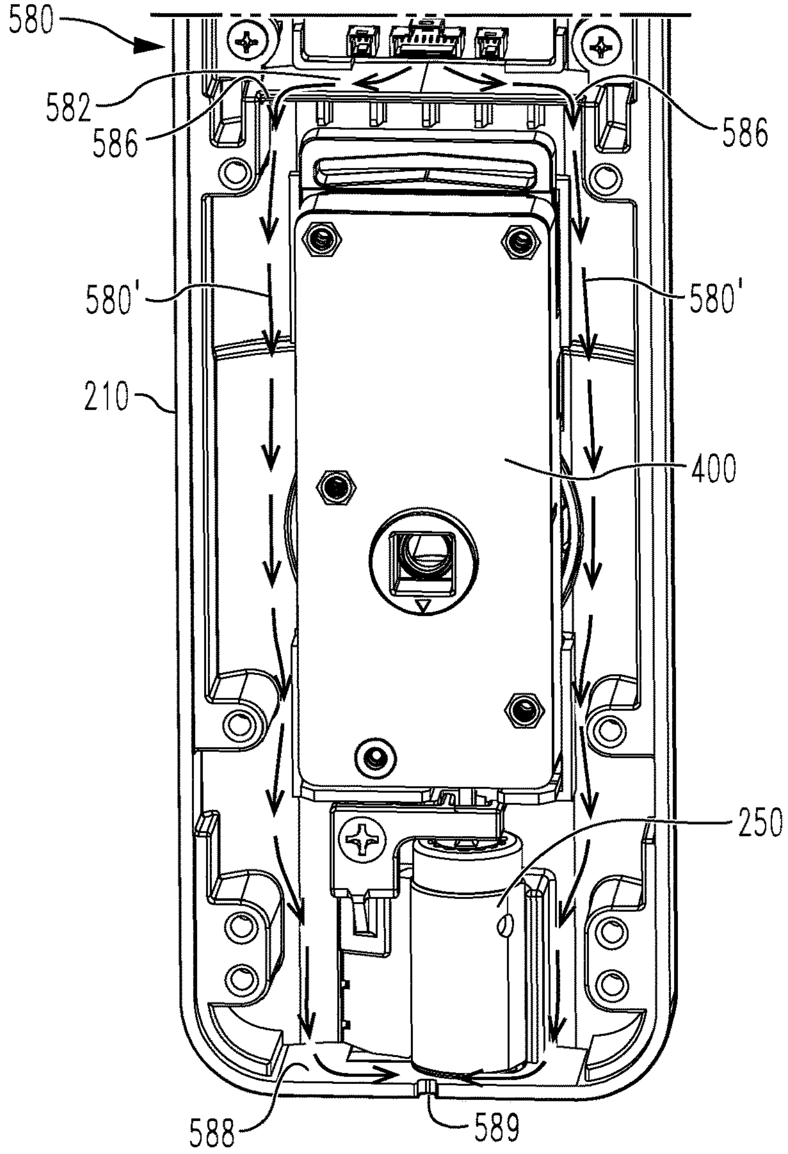
FIG. 39 is a rear perspective view of a portion of the outside trim assembly, and illustrates features associated with the water management arrangement.

With additional reference to FIGS. 38 and 39, the water management arrangement 580 also includes a pair of openings 586 formed near the main backplate 271. Due to the arrangement of the slopes 582, any water collected beneath the front cover 290 will be diverted along one of two water paths 580' that pass through the openings 586. As illustrated in FIG. 39, these water paths 580' avoid the lock module 400 and the lock cylinder 250, thereby discouraging any collected water from interfering with the operation of these components and/or causing degradation to the components. Water flowing along the water paths 580' is then collected at a bottom floor 588 of the escutcheon 210, and diverted to an exit aperture 589. The bottom floor 588 may be sloped relative to the vertical plane 209 and/or the horizontal plane 70 in order to aid in directing the water along the paths 580' to the exit aperture 589.

Figure 40:
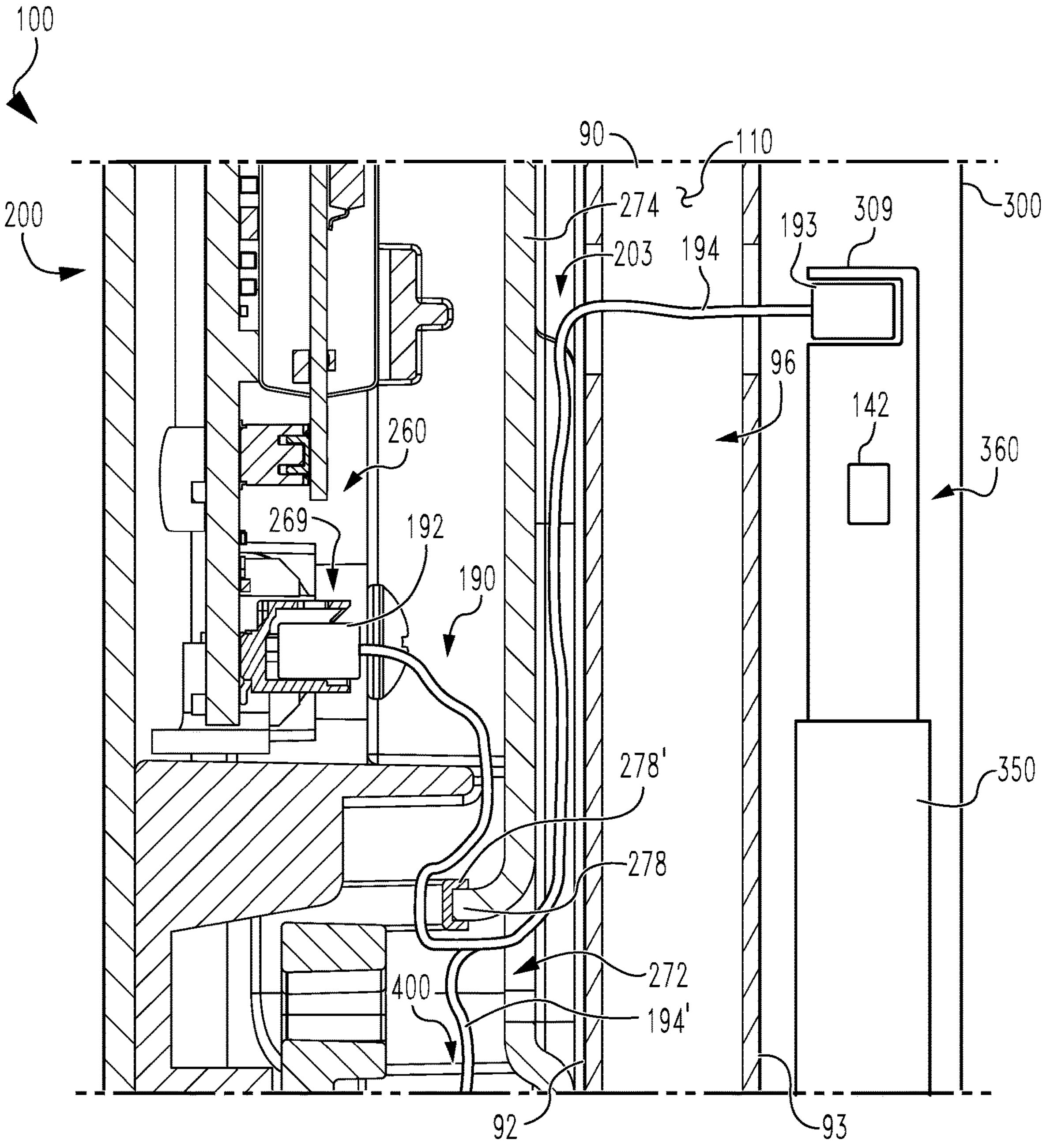
FIG. 40 is a partially-schematic cross-sectional illustration of the mortise lockset installed to a door, and illustrates features associated with a wire harness.

With additional reference to FIG. 40, illustrated therein is a cross-sectional view of the lockset 100 installed to a door 90. The door 90 has an exterior or non-egress side 92 to which the outside trim assembly 200 is mounted, an interior or egress side 93 to which the inside trim assembly 300 is mounted, and a door preparation 96 in which the mortise assembly 110 is mounted. In the illustrated form, the door preparation 96 is a standard mortise-format door preparation. In the interest of clarity, the mortise assembly 110 is omitted and the inside trim assembly 300 is represented schematically.

The lockset 100 includes at least one wire harness 190 that extends through the door 90 and connects one or more electronic components of the outside trim assembly 200 (e.g., the PCBA 260 and/or the lock module 400) with one or more electronic components of the inside trim assembly 300 (e.g., a power source 350 and/or an inside PCBA 360 including a controller 142). The wire harness 190 includes a first connector 192 engaged with a connector 269 of the outside PCBA 260, a second connector 193 engaged with a connector 309 of the inside PCBA 360, and one or more wires 194 extending between and connecting the connectors 192, 193 such that the outside PCBA 260 is in electrical communication with the inside PCBA 360.

As illustrated in FIG. 40, the recessed portion 274 of the main backplate 271 is recessed from the non-egress side 92 of the door 90 such that a pocket 203 is formed between the rear surface of the recessed portion 274 and the front surface of the door 90. This pocket 203 provides an avenue through which a portion of the wire harness 190 extends from the opening 272 to an opening in the face of the door 90. The opening 272 may be defined in part by a flange 278 that projects into the interior of the escutcheon 210, and the flange 278 may have mounted thereon a pad 278' to discourage the flange 278 from damaging the wires 194. In certain embodiments, the wires 194 pass through the mortise assembly 110. In other embodiments, the wires 194 may not necessarily pass through the mortise assembly 110.

In the illustrated form, the wire harness 190 further includes additional wires 194' extending between and connecting the second connector 193 and an additional connector that is engaged with a further connector of the lock module 400 such that the inside PCBA 360 is operable to provide power and/or control signals to the electromechanical drive assembly 450 and/or receive information transmitted by the lock status sensor 470. It is also contemplated that a second wire harness may be utilized to connect the lock module 400 with the inside PCBA 360.

Figure 41:
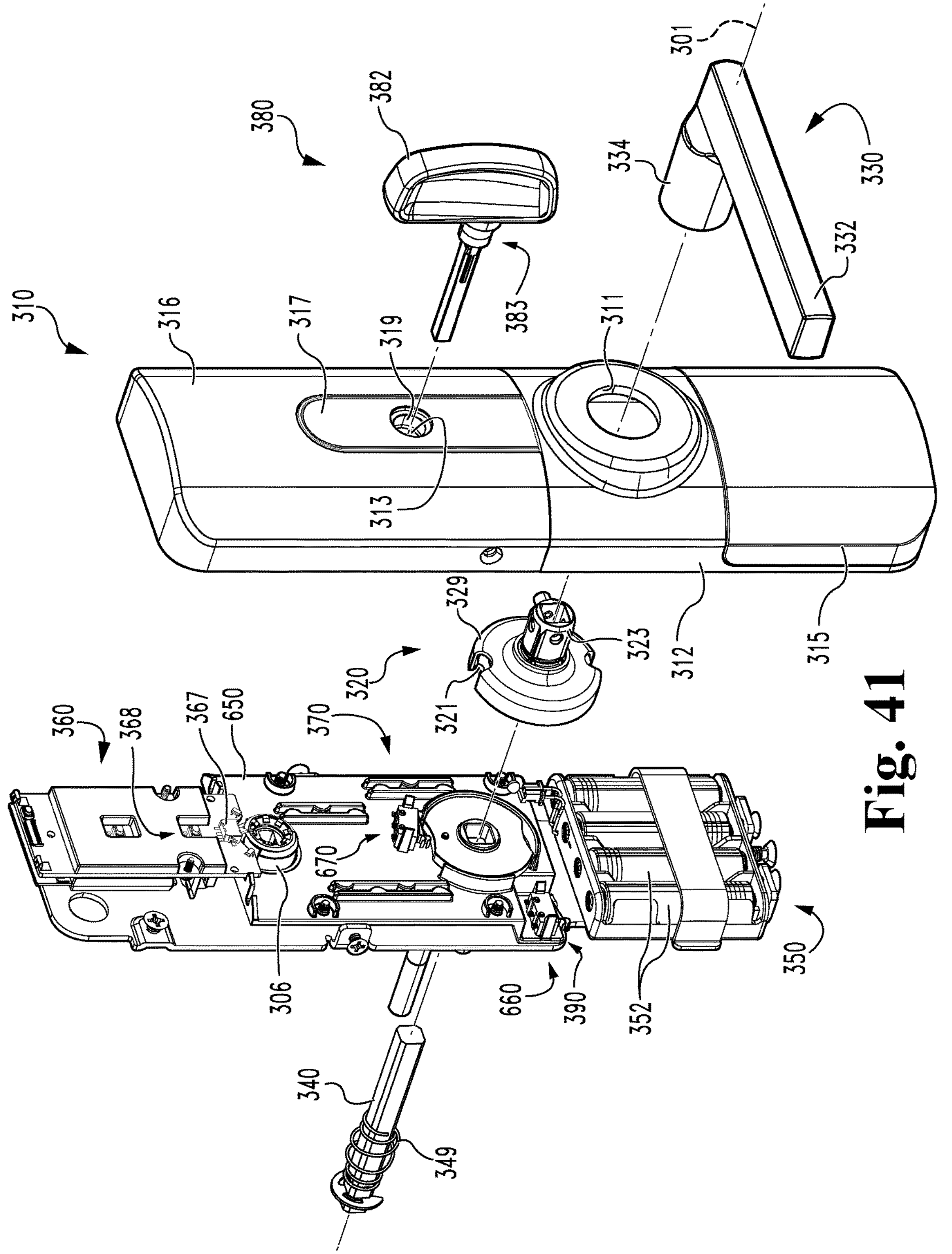
FIG. 41 is an exploded assembly view of an inside trim assembly according to certain embodiments.
Figure 42:
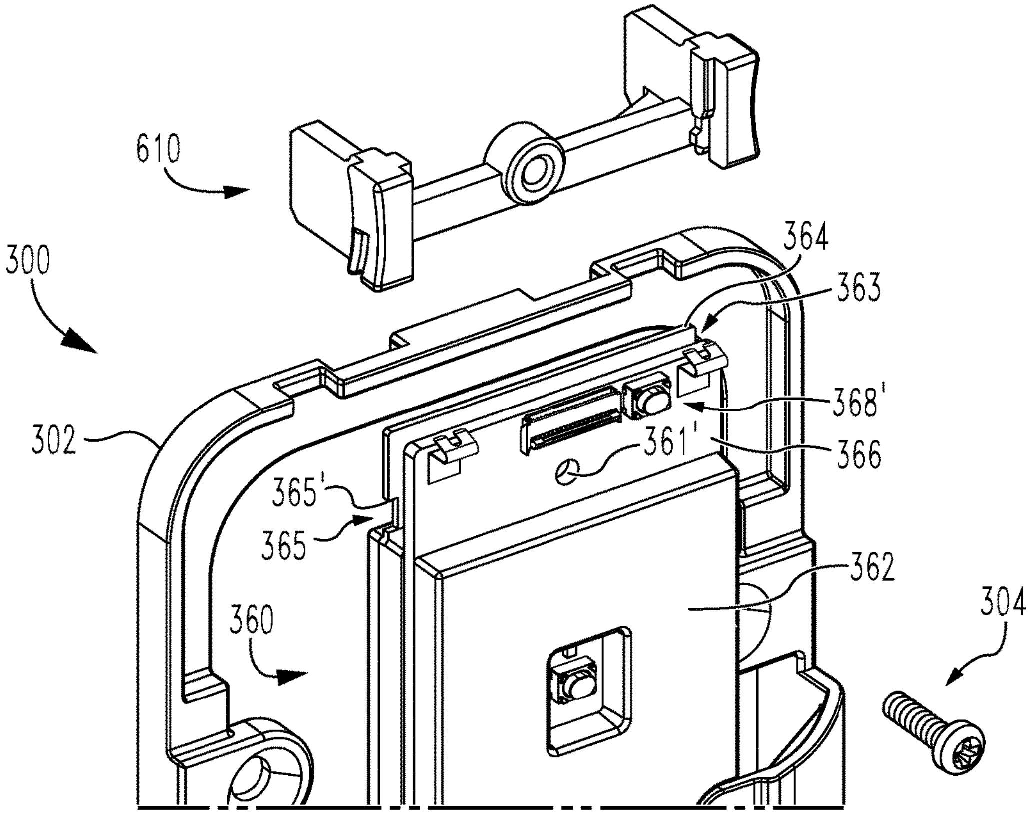
FIG. 42 is a perspective view of a portion of the inside trim assembly during installation of a support mechanism according to certain embodiments.
Figure 43:
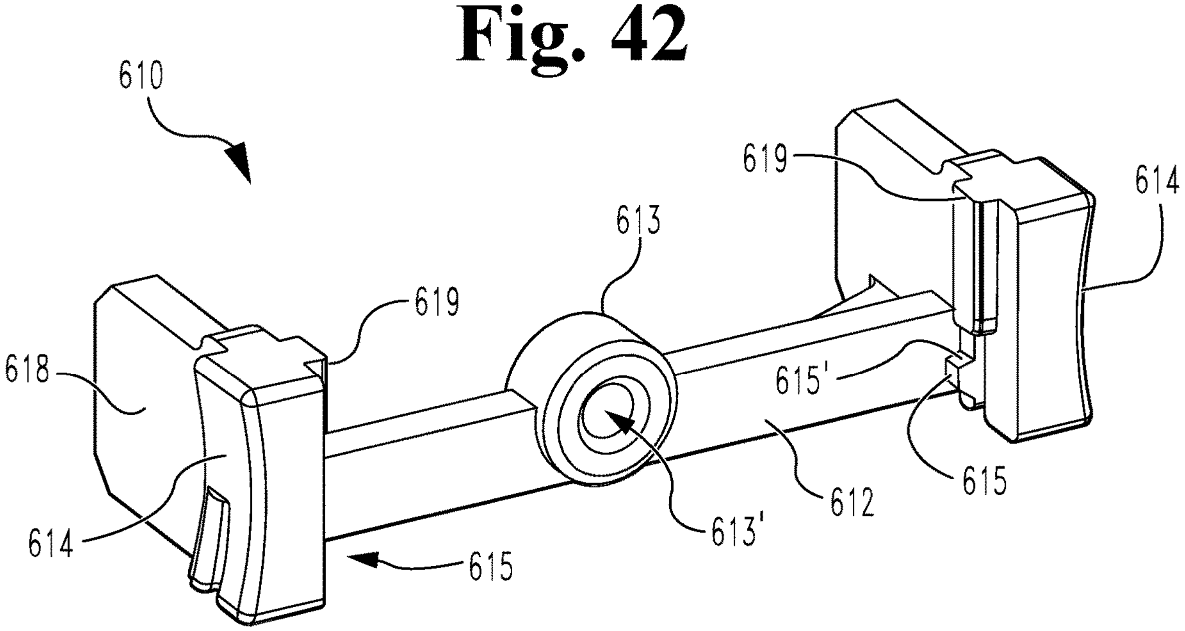
FIG. 43 is a perspective view of the support mechanism illustrated in FIG. 42.
Figure 44:
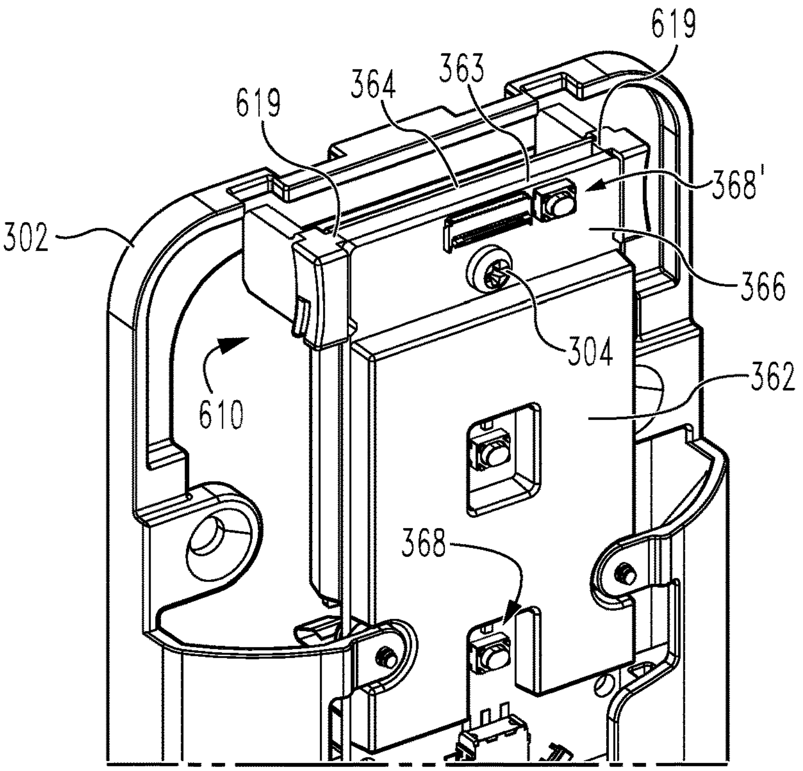
FIG. 44 is a perspective view of a portion of the inside trim assembly with the support mechanism of FIG. 42 installed.
Figure 45:
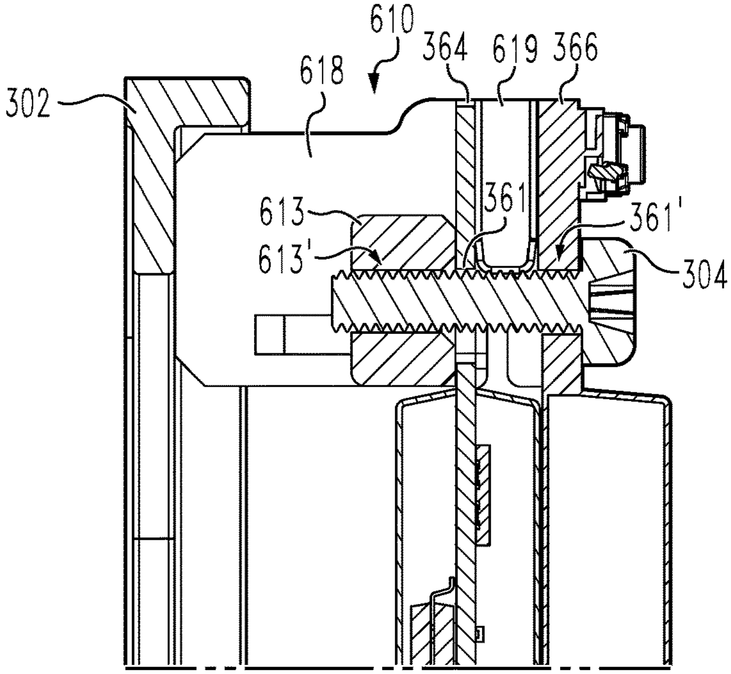
FIG. 45 is a cross-sectional view of a portion of the inside trim assembly with the support mechanism of FIG. 42 installed.
Figure 46:
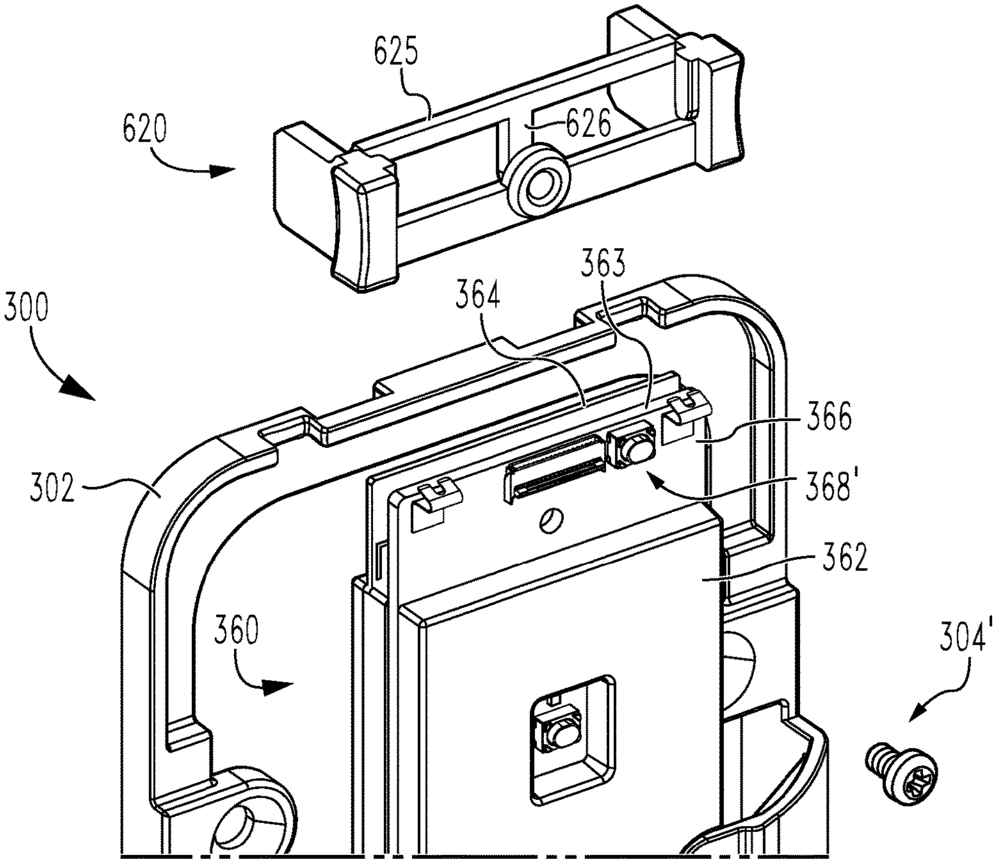
FIG. 46 is a perspective view of a portion of the inside trim assembly during installation of a support mechanism according to certain embodiments.
Figure 47:
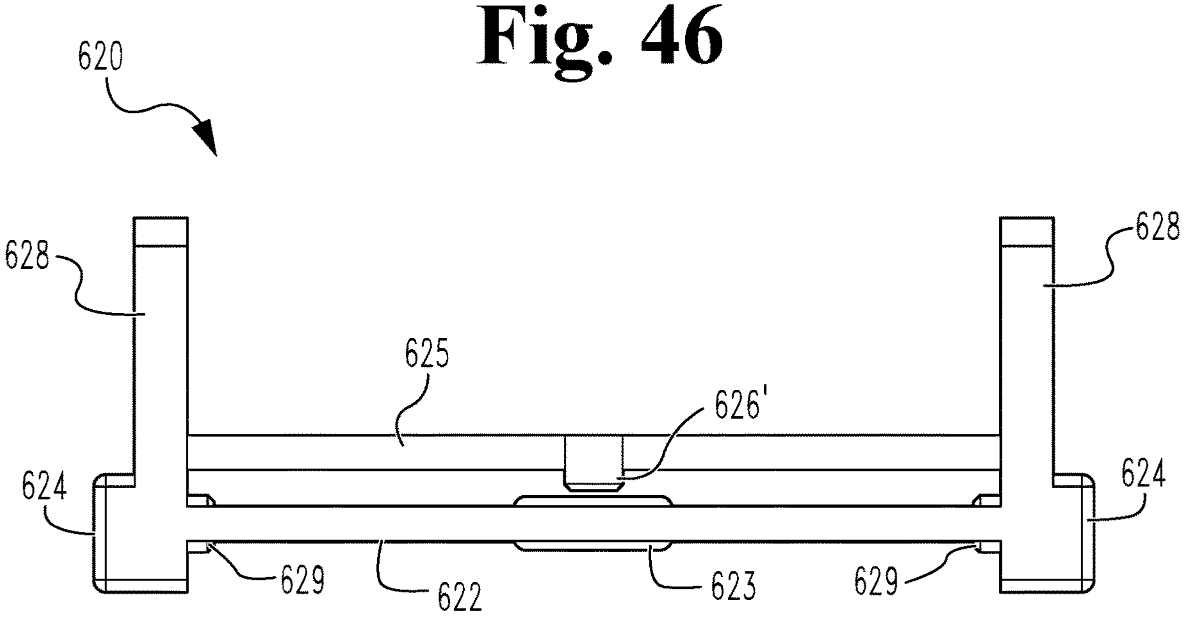
FIG. 47 is a plan view of the support mechanism illustrated in FIG. 46.
Figure 48:
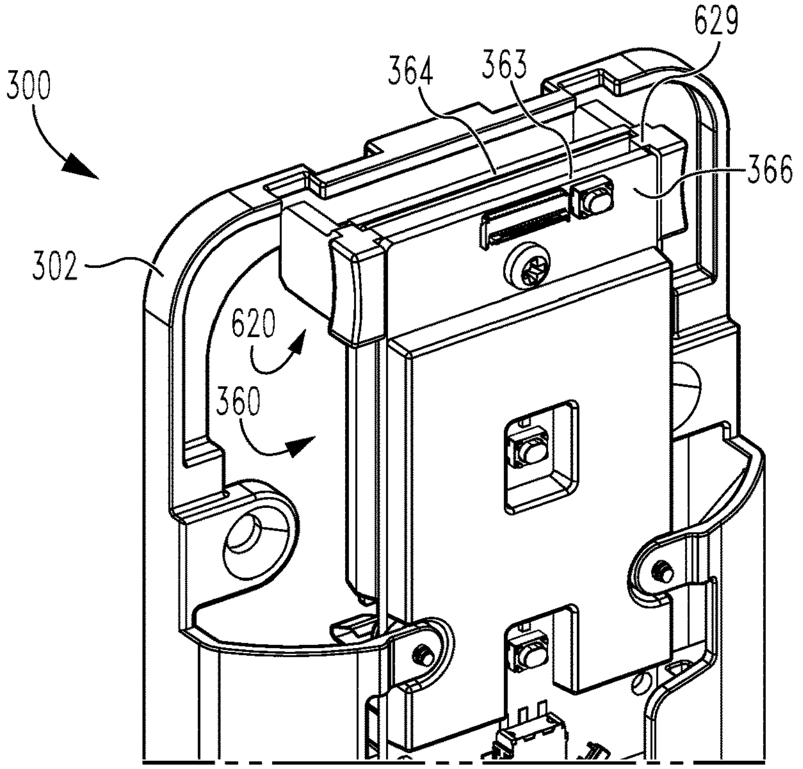
FIG. 48 is a perspective view of a portion of the inside trim assembly with the support mechanism of FIG. 46 installed.
Figure 49:
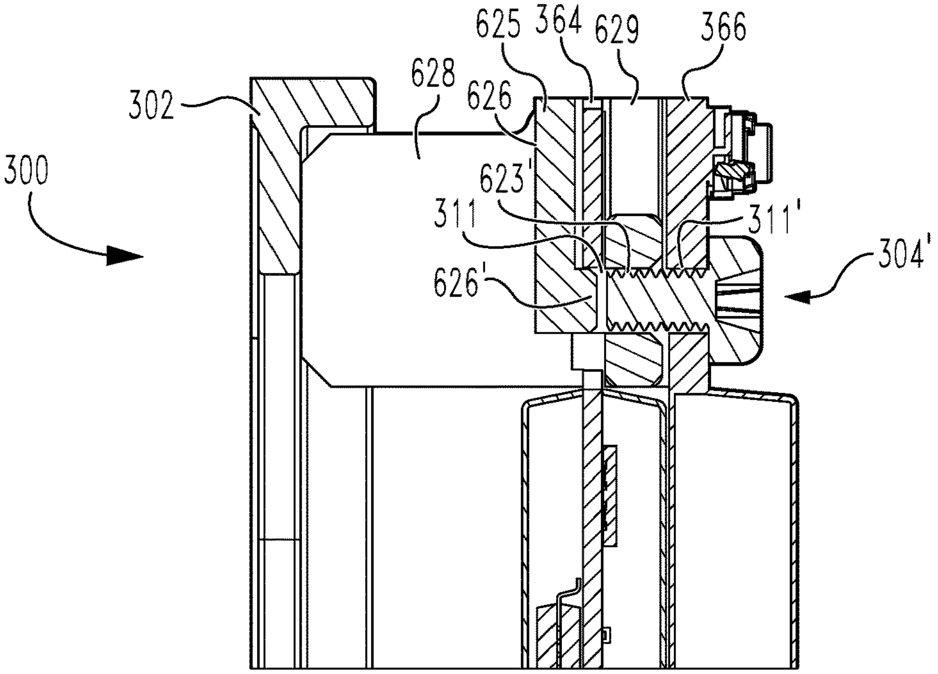
FIG. 49 is a cross-sectional view of a portion of the inside trim assembly with the support mechanism of FIG. 46 installed.
Figure 58:
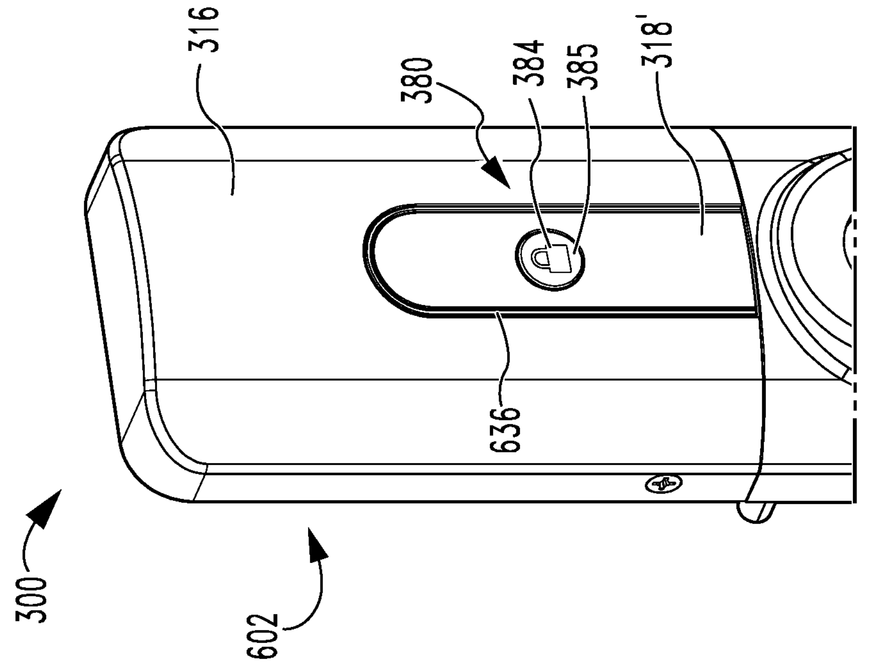
FIG. 58 is a perspective view of a portion of the inside trim assembly in the pushbutton configuration.

With additional reference to FIG. 41, the inside trim assembly 300 generally includes an inside escutcheon 310, an inside spring cage 320 mounted in the escutcheon 310, an inside handle 330 mounted to the spring cage 320, an inside drive spindle 340 engaged with the handle 330 and extending through the spring cage 320, and an inside PCBA 360 mounted in the escutcheon 310. In the illustrated form, the inside trim assembly 300 further includes an onboard power source 350 such as one or more batteries, a request-to-exit (REX) mechanism 370, and a lock state selector 380. While the illustrated lock state selector 380 is provided in the form of a thumbturn 382, it is also contemplated that other embodiments may utilize other forms of lock state selector, such as a pushbutton 384 (FIG. 58). As described herein, the inside PCBA 360 may include at least a portion of the control assembly 140, and in the illustrated form includes a controller 142 of the control assembly 140. Additionally, the inside handle 330 is mounted for rotation about an inside trim assembly longitudinal axis 301, which in the illustrated form is coincident with the longitudinal axis 101 of the lockset 100 and the longitudinal axis 201 of the outside trim assembly 200.

The inside escutcheon 310 is configured for mounting to the inner or egress side 93 of the door 90, and generally includes a main body 312, a power source cover 315 operable to cover the onboard power source 350, and a PCBA cover 316 operable to cover the PCBA 360. In the illustrated form, the inside escutcheon 310 further includes an additional cover 317 including an opening 319 through which a stem 383 of the thumbturn 382 extends. The main body 312 defines a spindle opening 311 through which a support spindle 323 of the spring cage 320 projects. The spindle opening 311 may be defined near a pocket similar to the above-described pocket 212, which may facilitate mounting of the inside spring cage 320 in a manner analogous to that described above.

The inside spring cage 320 is substantially similar to the outside spring cage 220, and generally includes a base 321, a support spindle 323 mounted to the base 321 for rotation about the longitudinal axis 301, a bias member rotatably biasing the support spindle 323 toward a home position, and a cover 329 that at least partially covers the bias member. The support spindle 323 supports the inside drive spindle 340, which is received in the support spindle 323 such that the bias member biases the drive spindle 340 (and thus the inside handle 330) toward a home position. In the illustrated form, the bias member is provided in the form of a clock spring. It is also contemplated that the bias member may be provided in another form, such as one including a torsion spring, a compression spring, an extension spring, a leaf spring, and/or one or more magnets.

The inside handle 330 is substantially similar to the outside handle 230, and generally comprises a shank 334 and a grip portion 332 extending from the shank 334. The shank 334 is sized and shaped to receive the support spindle 323, and may be secured to the support spindle 323 by an appropriate fastener, such as a set screw. With the inside trim assembly 300 assembled, the inside handle 330 is rotationally coupled with and supported by the support spindle 323 such that the spring cage 320 biases the inside handle 330 toward an inside handle home position. In the illustrated form, the inside handle 330 is provided in the form of a lever. It is also contemplated that the inside handle 330 may be provided in another form, such as that of a knob.

The inside drive spindle 340 is slidably received in the support spindle 323, and may be biased into engagement with the inside hub 117' of the mortise assembly 110, for example by a spring 349. The inside drive spindle 340 is engaged with the hub 117' such that rotation of the inside drive spindle 340 from a home position to a rotated position actuates the mortise assembly 110 and retracts the latchbolt 112. Such actuation may further retract the deadbolt 114, for example in embodiments that include the deadbolt 114 and the simultaneous retractor 116.

In embodiments that include the onboard power source 350, the power source 350 may, for example, comprise one or more batteries 352. It is also contemplated that the onboard power source 350 may be omitted, and that the lockset 100 may be powered by another power source, such as line power. As noted above, the power source 350 is covered by the power source cover 315. As described herein, in certain embodiments, the inside trim assembly 300 may include a battery tamper sensor 390 configured to detect when the power source cover 315 is removed and the power source 350 is accessible.

With additional reference to FIGS. 42-45, illustrated therein is a portion of the inside trim assembly 300 along with a support mechanism 610 according to certain embodiments. The PCBA 360 generally includes a mounting bracket 362, a first printed circuit board (PCB) 364 mounted to the mounting bracket 362, and a second PCB 366 mounted to the mounting bracket 362. The first PCB 364 and the second PCB 366 are generally parallel to one another, and are spaced apart from one another such that a gap 363 is formed therebetween. At least the first PCB 364 is configured to be removed from the bracket 362, for example for servicing and/or replacement. Formed on opposite sides of the first PCB 364 are a pair of notches 365, each of which is defined at least in part by a shoulder 365'.

The support mechanism 610 generally includes a body portion 612 including a boss 613, a pair of grips 614 positioned on opposite sides of the body portion 612, and a pair of arms 618 extending rearward from the grips 614. Each grip 614 includes a ridge 619 sized and shaped to be positioned in the gap 363 between the first PCB 364 and the second PCB 366. Each grip 614 also includes a projection 615 that is aligned with the first PCB 364 when the ridge 619 is positioned in the gap 363. Each projection 615 is configured to be received in a corresponding notch 365, and includes a shoulder 615' configured to interface with the shoulder 365'.

During assembly, the support mechanism 610 may be engaged with the PCBA 360 such that each ridge 619 is received in the gap 363, and each projection 615 is received in the corresponding notch 365. The PCBA 360 may then be secured to the support mechanism 610 using a fastener 304, such as a nylon screw. For example, the shank of the fastener 304 may pass through openings 361, 361' in the PCBs 364, 366 and into an opening 613' formed in the boss 613. In certain embodiments, the boss opening 613' may be internally threaded to facilitate the coupling of the PCBA 360 with the support mechanism 610.

In certain circumstances, it may become desirable that the first PCB 364 be removed from the PCBA 360, such as for servicing or replacement. However, it may be difficult to grip the first PCB 364 for removal from the bracket 362, particularly when the first PCB 364 is mounted behind the second PCB 366, as in the illustrated embodiment. As described herein, such removal of the first PCB 364 may be facilitated by the support mechanism 610.

Should it become desirable to remove the first PCB 364 from the bracket 362, the fastener 304 may first be removed. Thereafter, the user may grip the opposite sides of the grips 614, for example using a finger and thumb. The user may then exert a pulling force in the appropriate direction (e.g., upward) in an effort to remove the first PCB 364 from the bracket 362. When this occurs, the abutting shoulders 365', 615' transmit the force from the support mechanism 610 to the first PCB 364, thereby pulling the first PCB 364 out of engagement with the bracket 362 and/or the second PCB 366.

As should be evident from the foregoing, the support mechanism 610 may aid in the removal of the first PCB 364 for replacement and/or servicing. In certain embodiments, the support mechanism 610 may additionally or alternatively provide support for the second PCB 366. For example, in certain embodiments, the second PCB 366 may include a button 368' operable to be manually depressed by a user. By way of illustration, the button 368' may be a lock/unlock button. Such a lock/unlock button, when depressed by the user, may electronically transition the lockset 100 between its locked state and its unlocked state, for example by causing the electromechanical drive assembly 450 to transition the lock module 400 between its locking state and its unlocking state as described herein.

In the absence of the support mechanism 610, depression of the button 368' may cause the cantilevered second PCB 366 to deform, and the stresses and strains associated with such deformation may cause damage to the working components of the second PCB 366. In the illustrated form, however, the arms 618 are engaged with a base plate 302 such that loads associated with depression of the button 368' are transmitted to the base plate 302, thereby reducing or elimination deformation of the second PCB 366. Thus, the support mechanism 610 may aid in increasing the effective life of the PCBA 360.

With additional reference to FIGS. 40-43, illustrated therein is a portion of the inside trim assembly 300 including a support mechanism 620 according to certain embodiments. The support mechanism 620 is substantially similar to the above-described support mechanism 620, and similar reference characters are used to designate similar elements and features. For example, the illustrated support mechanism 620 includes a body portion 622, a boss 623, a pair of grips 624, a pair of arms 628, and a pair of ridges 629, which respectively correspond to the body portion 622, boss 613, pair of grips 614, pair of arms 618, and pair of ridges 619 of the above-described support mechanism. In the interest of conciseness, the following description of the support mechanism 620 focuses primarily on elements and features that are different from those described above with reference to the support mechanism 610.

In the illustrated support mechanism 620, a bar 625 extends between and connects the arms 628, and is positioned generally behind the body portion 622. The bar 625 includes a flexible arm 626 that extends to a location behind the opening 623', and a snap boss 626' projects from the arm 626 toward the boss opening 623'. With the apparatus assembled, the snap boss 626' projects into the opening 361 in the first PCB 364. A shorter fastener 304' is utilized, and in the illustrated form projects into the opening 361' of the second PCB 366 and the boss opening 623', but does not extend appreciably into the first PCB opening 361.

During normal operation, the support mechanism 620 aids in preventing flexing of the second PCB 366 in a manner analogous to that described above. The support mechanism 620 also aids in disassembly of the apparatus in a manner analogous to that described above, with engagement between the snap boss 626' and the opening 361 coupling the first PCB 364 with the support mechanism 620 to aid in removal of the serviceable PCB 364 from the main PCB 366.

Figure 51:
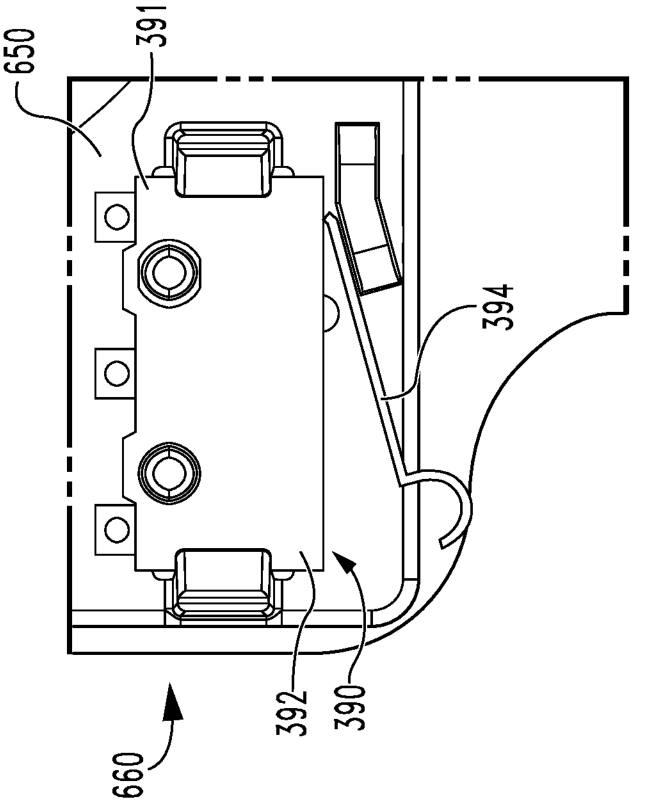
FIG. 51 is a plan view of a battery tamper sensor according to certain embodiments with the battery cover removed from the inside trim assembly.
Figure 50:
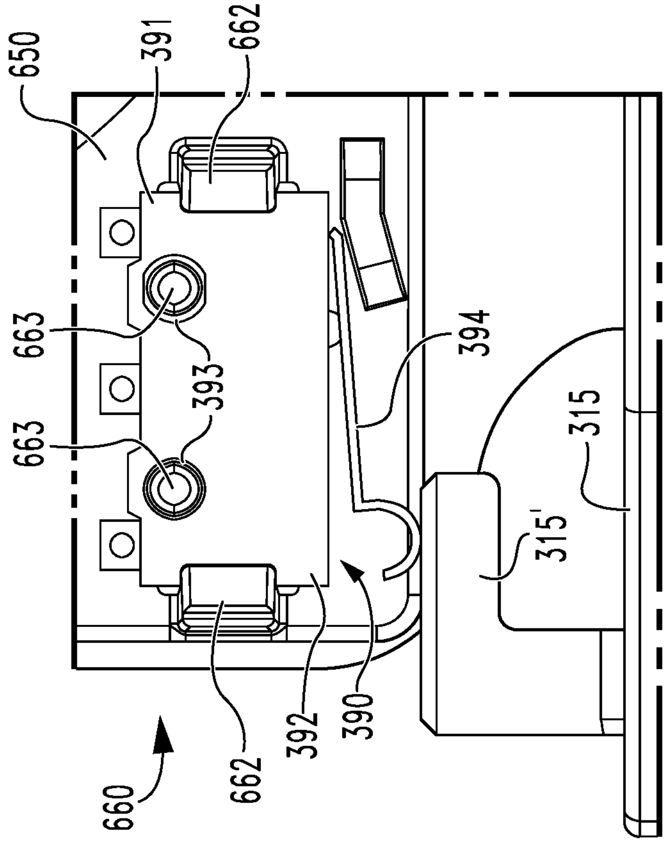
FIG. 50 is a plan view of a battery tamper sensor according to certain embodiments with a battery cover installed to the inside trim assembly.

With additional reference to FIGS. 50 and 51, the illustrated inside trim assembly 300 further includes a battery tamper sensor 390 configured to detect removal of the power source cover 315. The battery tamper sensor 390 is mounted to a mounting bracket 650, which is mounted in the inside escutcheon 310 and which provides mounting locations for various components of the inside trim assembly 300 (e.g., the PCBA 360 and/or the REX mechanism 370). While other forms are contemplated, the illustrated battery tamper sensor 390 is provided in the form of a snap action switch 391 comprising a body 392 and an actuation arm 394. Those skilled in the art will readily recognize that snap action switches such as the switch 391 have a default state (i.e., one of an open state or a closed state) when the arm 394 is in a home position, and a non-default state (i.e., the other of the open state or the closed state) when the arm 394 is in a depressed position.

In the illustrated form, a projection 315' of the power source cover 315 is configured to depress the arm 394 when the cover 315 is in its installed or covering position (FIG.

50), and to allow the arm 394 to return to its home position when the cover 315 is in its removed or uncovering position (FIG. 51). As a result, the installed/removed position of the cover (and thus the covered/exposed state of the power source 350) can be determined based upon the default/non-default state of the switch 391. While the illustrated battery tamper sensor 390 is provided in the form of a mechanical snap action switch 391, it should be appreciated that the battery tamper sensor 390 may take another form. As one example, the sensor 390 may be a magnetically-actuated sensor, such as a reed switch or a Hall effect sensor, and a magnet may be mounted to the cover 315.

As noted above, the battery tamper sensor 390 is mounted to the mounting bracket 650. The mounting bracket 650 may include a battery tamper mounting location 660 to facilitate such mounting. In the illustrated form, the mounting location 660 generally includes a pair of deformable clip arms 662 that engage the sensor body 392, and a pair of posts 663 that extend into openings 393 in the body 392. During assembly, the sensor 390 may be placed in the proper orientation and pushed into engagement with the mounting location 660 such that the posts 663 enter the openings 393 and the clip arms 662 snap onto the sensor body 392.

Figure 53:
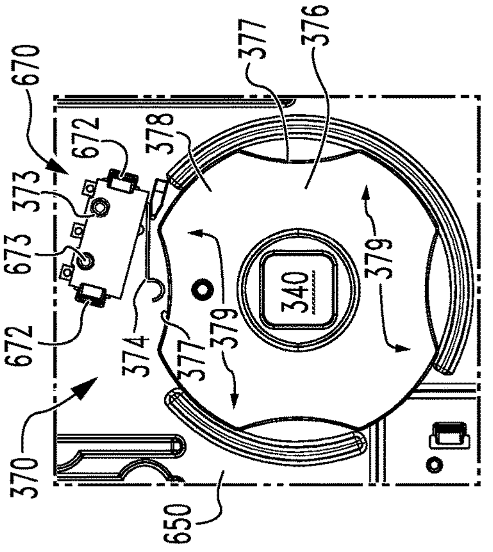
FIG. 53 is a plan view of the REX assembly with a REX plate in a home position.
Figure 54:
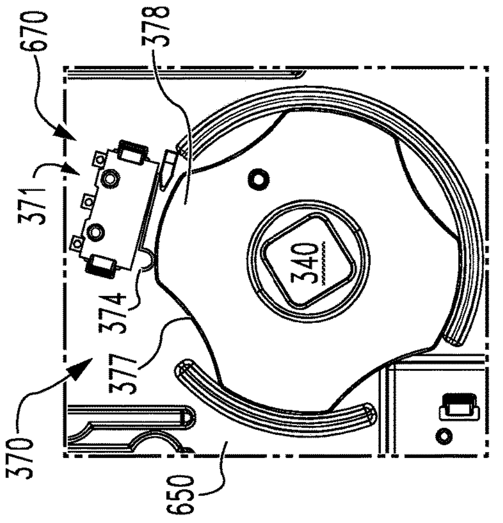
FIG. 54 is a plan view of the REX assembly with the REX plate in a rotated position.
Figure 52:
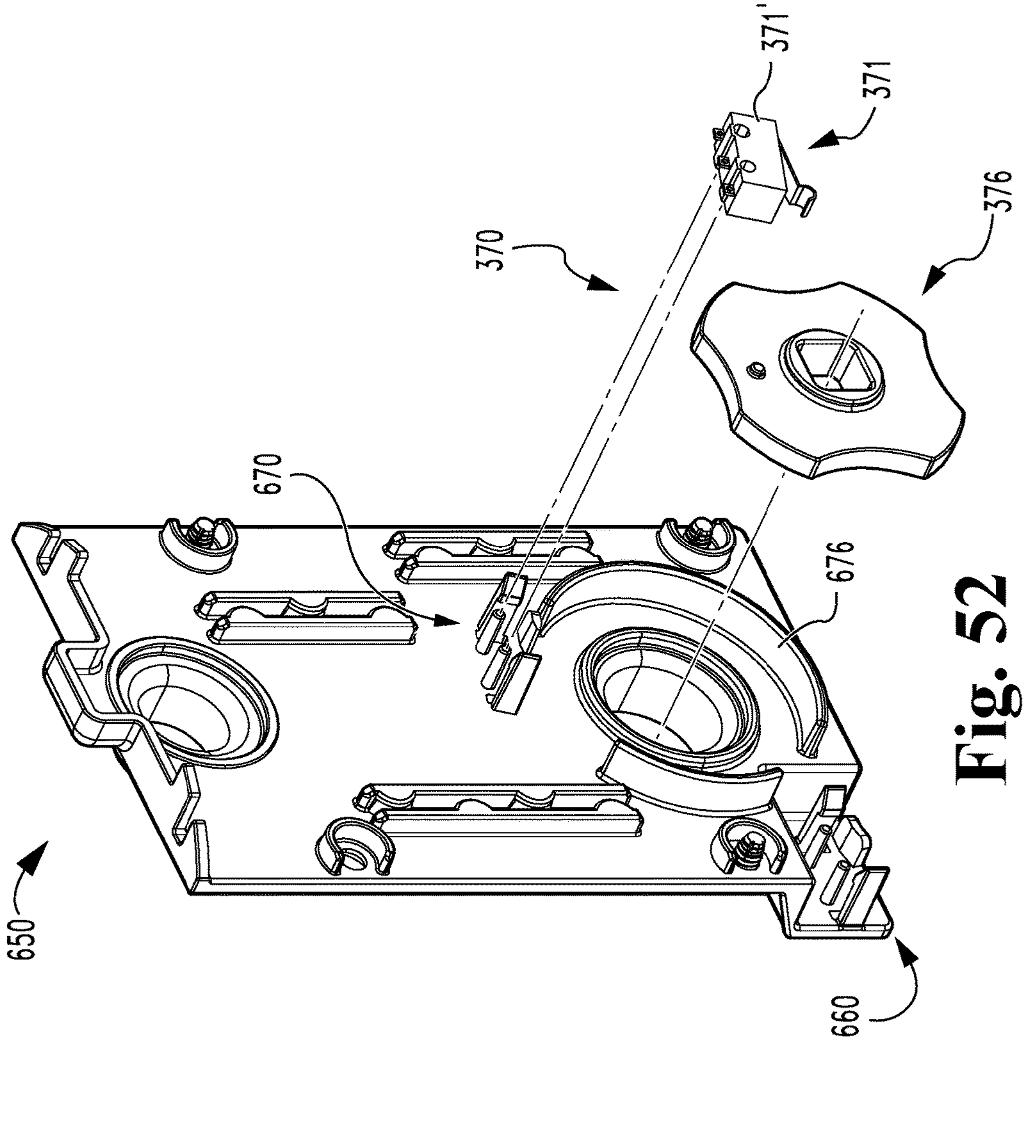
FIG. 52 is an exploded assembly view of a request-to-exit (REX) assembly according to certain embodiments.

With additional reference to FIGS. 52-54, the REX mechanism 370 is mounted to the mounting bracket 650 within the escutcheon 310, and generally includes a REX sensor 371 and a REX plate 376 operable to actuate the REX sensor 371. While other forms are contemplated, the illustrated REX sensor 371 is provided in the form of a snap action switch 371' comprising a body 372 and an actuation arm 374. Those skilled in the art will readily recognize that snap action switches such as the switch 371' have a default state (i.e., one of an open state or a closed state) when the arm 374 is in a home position, and a non-default state (i.e., the other of the open state or the closed state) when the arm 374 is in a depressed position.

The REX plate 376 is mounted to the inside drive spindle 340 such that the plate 376 rotates with the inside handle 330 and the spindle 340. The illustrated REX plate 376 includes at least one recess 377 configured to permit the arm 374 to adopt its extend position and/or at least one lobe 378 configured to depress the arm 374. In the illustrated form, the recess 377 is aligned with the arm 374 when the handle 330 is in its home position (FIG. 53), and the lobe 378 depresses arm 374 when the handle 330 is in its rotated position (FIG. 54). Thus, the home/rotated position of the inside handle 330 can be determined based upon the information generated by the REX sensor 371.

While the REX sensor 371 is provided in the form of a mechanical snap action switch, it should be appreciated that the REX sensor 371 may take another form. As one example, the sensor 371 may be a magnetically-actuated sensor, such as a reed switch or a Hall effect sensor. Moreover, while the illustrated REX sensor 371 adopts its default state when the handle 330 is in the home position and adopts its non-default state when the handle 330 is in its rotated position, it is also contemplated that this configuration may be reversed such that the REX sensor 371 adopts its default state when the handle 330 is in the rotated position and adopts its non-default state when the handle 330 is in its home position.

In the illustrated form, the REX plate 376 has a plurality of sensor-actuating regions 379, each of which includes a corresponding recess 377 and a corresponding lobe 378. More particularly, the REX plate 376 includes four recesses 377 and four lobes 378, which are arranged in four sensor-actuating regions 379. These four sensor-actuating regions 379 correspond to the four possible orientations in which the REX plate 376 can be mounted to the square drive spindle 340 such that regardless of the mounting orientation, one of the sensor-actuating regions 379 will be operable to engage the switch arm 374 to actuate the switch 371'. In other embodiments, such as those in which the spindle 340 has a different cross-sectional geometry (e.g., one with N sides), the REX plate 376 may include a different number of sensor-actuating regions 379 (e.g., N sensor-actuating regions 379).

In the illustrated form, each sensor-actuating region 379 comprises a recess 377 and a lobe 378. It is also contemplated that the sensor-actuating regions 379 may take another form. As one example, should the REX sensor 371 be provided in the form of a magnetically-operable sensor (e.g., a Hall effect sensor or a reed switch), each sensor-actuating region 379 may include a magnet operable to actuate the sensor 371.

As noted above, the illustrated mounting bracket 650 also includes a REX mounting location 670. The REX mounting location 670 includes certain elements and features similar to those of the battery tamper mounting location 660. For example, the REX mounting location 670 generally includes a pair of deformable clip arms 672 that engage the body 372 of the REX sensor 371 and a pair of posts 673 that project into openings 373 of the sensor body 372. The REX mounting location 670 may further include one or more arcuate ridges 676 that at least partially circumferentially surround the REX plate 376 to discourage other components of the inside trim assembly 300 from contacting the REX plate 376.

In the illustrated form, the REX mechanism 370 is installed to the inside trim assembly 300, and the signal generated by the sensor 371 is interpreted as a request to exit signal. It is also contemplated that analogous features may be utilized in the outside assembly 200, and that the signal generated by such a sensor may be interpreted as a request to enter signal.

As noted above, certain embodiments of the inside trim assembly 300 may include a lock state selector 380. For example, the PCBA 360 may include a first lock state selection sensor 367 such as a triangle switch, and the lock state selector 380 may include a thumbturn 382 operable to actuate the lock state selection sensor 367 via a cam 306. By way of example, rotation of the thumbturn 382 in a locking direction may cause the cam 306 to trip the triangle switch of the first lock state selection sensor 367 in a first direction to thereby cause the lock state selection sensor 367 to transmit to the control assembly 140 a locking signal. In response to the locking signal, the control assembly 140 may transmit to the lock module 400 a locking command that causes the electromechanical drive assembly 450 to place the lock module 400 in the locked state. Rotation of the thumbturn 382 in an unlocking direction opposite the locking direction may cause the cam 306 to trip the triangle switch of the first lock state selection sensor 367 in a second direction to thereby cause the lock state selection sensor 367 to transmit to the control assembly 140 an unlocking signal. In response to the unlocking signal, the control assembly 140 may transmit to the lock module 400 an unlocking command that causes the electromechanical drive assembly 450 to place the lock module 400 in the unlocked state.

In the illustrated form, the PCBA 360 further includes a second lock state selection sensor 368 in the form of a pushbutton that transmits a lock/unlock signal when actuated. The controller 142 may then cause the lock module 400 to transition between its locked and unlocked states in response to the lock/unlock signal. For example, if the controller 142 receives the lock/unlock signal while information from the lock status sensor 470 indicates that the lock module 400 is in its locked state, the controller 142 may transmit the unlock command to thereby unlock the lock module 400. If the controller 142 receives the lock/unlock signal while information from the lock status sensor 470 indicates that the lock module 400 is in its unlocked state, the controller 142 may transmit the lock command to thereby lock the lock module 400.

In certain embodiments, the inside trim assembly 300 may include both a thumbturn 382 operable to actuate the first lock state selection sensor 367 and a pushbutton 384 (FIG. 58) operable to actuate the second lock state selection sensor 368. In the illustrated form, however, the inside trim assembly 300 is configurable between a plurality of selectable configurations, two or more of which may include different lock state selectors.

Figure 56:
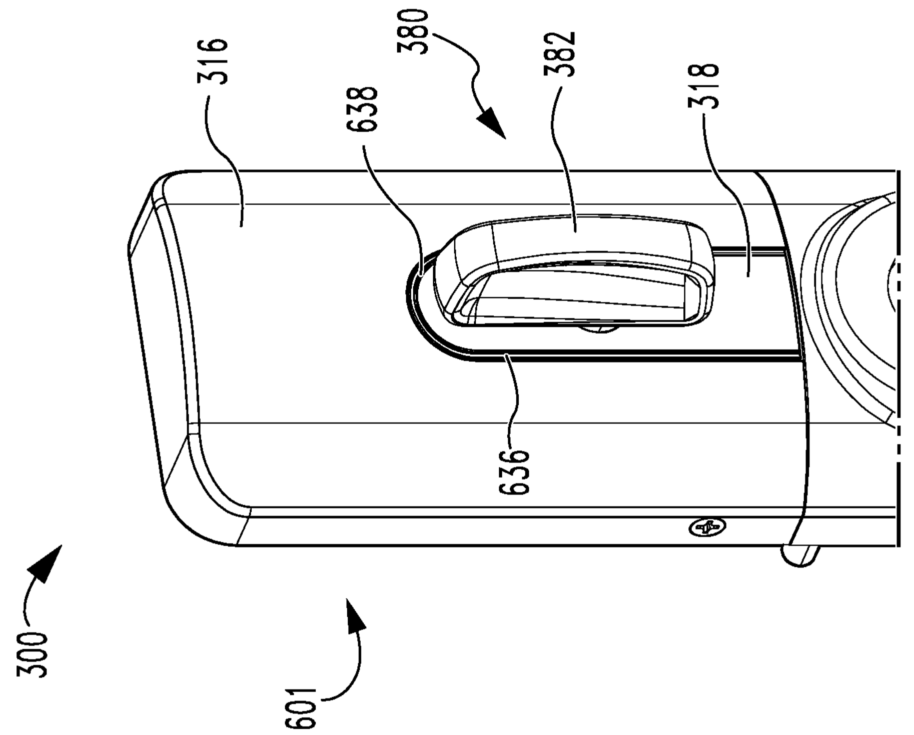
FIG. 56 is a perspective view of a portion of the inside trim assembly in the thumbturn configuration.
Figure 55:
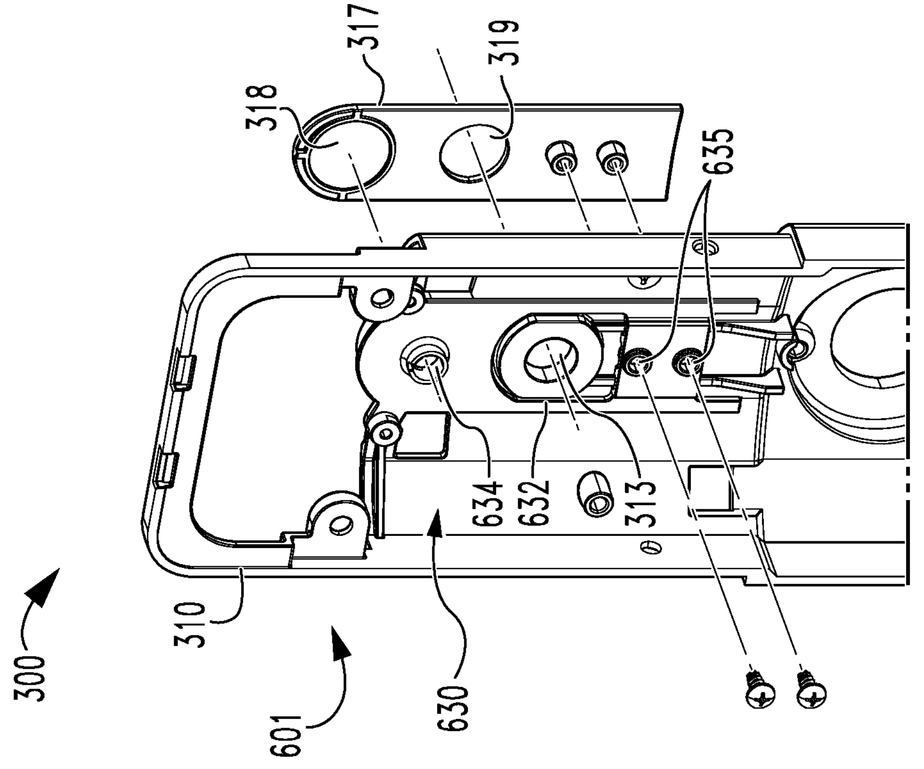
FIG. 55 is an exploded assembly view of a portion of the inside trim assembly in a thumbturn configuration.

With additional reference to FIGS. 55 and 56, the inside trim assembly 300 further includes a light guide 630 that is mounted to the escutcheon 310 and directs light from one or more LEDs of the inside PCBA 360 to a display region 638 on the face of the inside trim assembly 300. The light guide 630 includes a first opening 632 that receives a boss of the escutcheon 310, and the stem 383 of the thumbturn 382 extends through the opening 632 and the boss. The light guide 630 also includes a second opening 634, the function of which is described in detail below. The illustrated light guide 630 also includes one or more fastener openings 635 through which fasteners such as screws may extend for engagement with bosses of the cover 317.

As noted above, the illustrated inside trim assembly 300 is configurable between a plurality of selectable configurations, a first of which configurations is illustrated in FIGS. 55 and 56. In the first configuration 601, the lock state selector 380 is provided in the form of a thumbturn 382. The first configuration 601 may accordingly be referred to as the thumbturn configuration 601. In the thumbturn configuration, the lock state selector 380 is provided in the form of a thumbturn 382, the stem 383 of which extends along a secondary longitudinal axis 101' (FIG. 1) through the openings 313, 319 and into engagement with the cam 306, which is operable to trip the first lock state selection sensor 367 as described above. The stem 383 of the thumbturn 382 may extend into engagement with the cam of the deadbolt actuation assembly 115 such that rotation of the thumbturn 382 in opposite directions extends and retracts the deadbolt 114. Additionally, the second opening 634 is covered by a solid region 318 of the cover 317, and the cover 317 also covers a portion of the light guide 630 such that only a portion of the light guide 630 (e.g., the perimeter 636) is exposed to define the display region 638.

Figure 57:
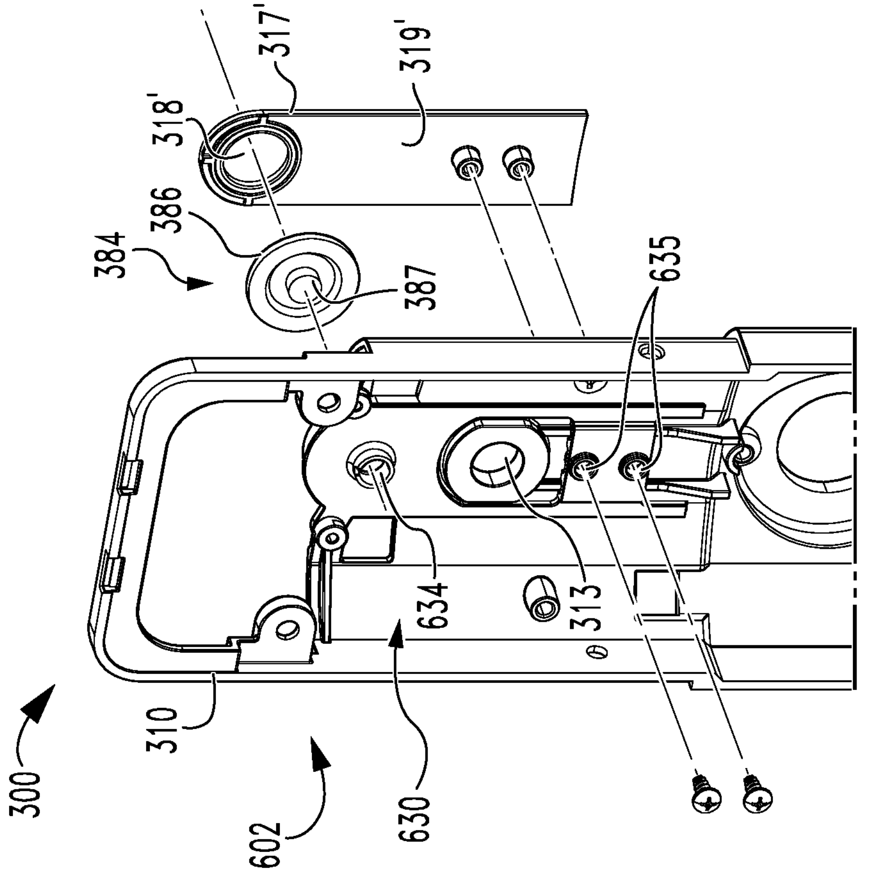
FIG. 57 is an exploded assembly view of a portion of the inside trim assembly in a pushbutton configuration.

With additional reference to FIGS. 57 and 58, illustrated therein is the inside trim assembly 300 in a second configuration 602, in which the lock state selector 380 is provided in the form of a pushbutton 384. The second configuration 602 may alternatively be referred to herein as the pushbutton configuration 602. In the pushbutton configuration 602, the cover 317 utilized in the thumbturn configuration 601 is replaced by a second or pushbutton format cover 317'. Like the first cover 317, the second cover 317' covers a portion of the light guide 630 such that only a portion of the light guide 630 (e.g., the perimeter 636) is exposed to define the display region 638. However, the illustrated cover 317' includes an opening 318' that exposes the second light guide opening 634 and a solid region 319' that covers the opening 313.

Mounted within the opening 318' is the pushbutton 384, and a support gasket 386 is mounted behind the pushbutton 384. The gasket 386 includes a stem 387 that extends through the opening 634 for engagement with the second lock state selection sensor 368. The pushbutton 384 thereby facilitates manual manipulation of the second lock state selection sensor 368 for electronic locking and unlocking of the lockset 100 as described above. The pushbutton 384 may include indicia 385, and the control assembly 140 may cause an LED of the inside PCBA 360 to selectively illuminate the indicia 385 to provide an indication of the locked/unlocked status of the lockset 100.

Figure 60:
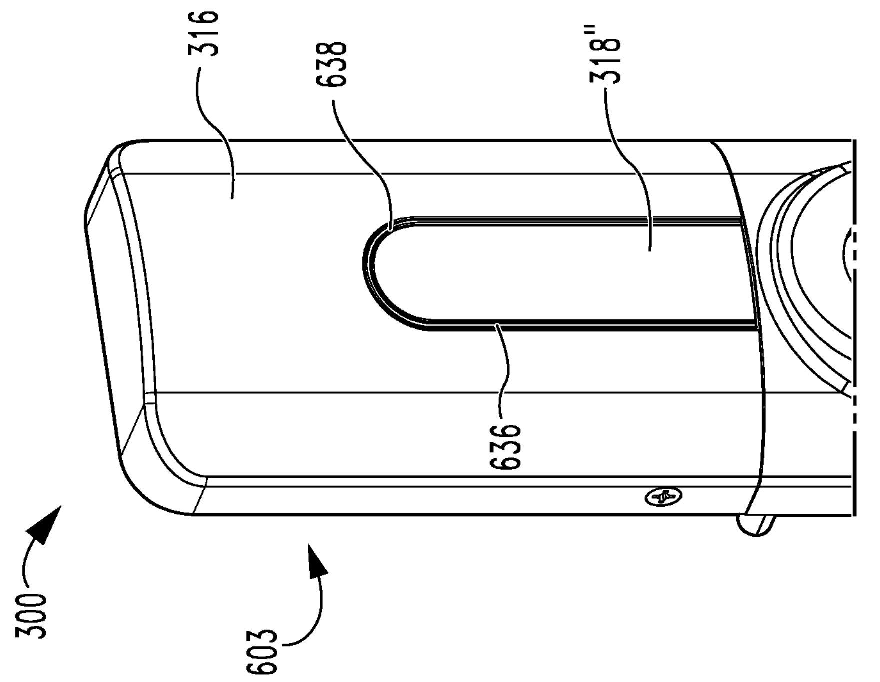
FIG. 60 is a perspective view of a portion of the inside trim assembly in the indicator configuration.
Figure 59:
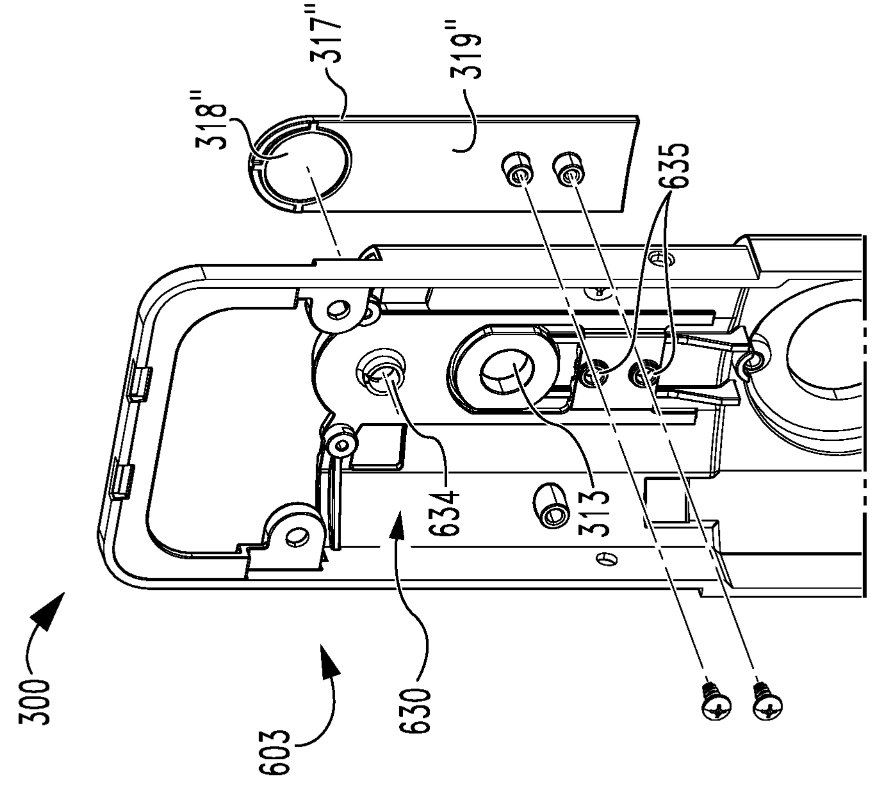
FIG. 59 is an exploded assembly view of a portion of the inside trim assembly in an indicator configuration.

With additional reference to FIGS. 59 and 60, illustrated therein is the inside trim assembly 300 in a third configuration 603, in which the lock state selector 380 is omitted. The third configuration 603 may alternatively be referred to herein as the indicator configuration 603. In the indicator configuration 603, a third or indicator configuration cover 317" is utilized. Like the first cover 317, the third cover 317" covers a portion of the light guide 630 such that only a portion of the light guide 630 (e.g., the perimeter 636) is exposed to define the display region 638. However, the illustrated cover 317" also includes a solid region 318" that covers the second light guide opening 634 and an additional solid region 319" that covers the opening 313.

As noted above, the illustrated third configuration 603 omits a manually-operable lock state selector 380. In such forms, the locked/unlocked state of the outside trim assembly 200 may be controlled electronically. For example, the user may toggle the lockset 100 between its locked state and its unlocked state by wirelessly interfacing with the control assembly 140 via an external device 80 (FIG. 64), such as a mobile device 82 or an access control system 84 (e.g., a smart home system).

In each of the three configurations illustrated in FIGS. 55-60, the light guide 630 is configured to guide light from one or more LEDs 369 (FIG. 64) or other light source of the inside PCBA 360 to the display region 638. The control assembly 140 may, for example, cause the display region 638 to be lighted in various colors to provide feedback during programming and/or wireless locking and/or unlocking. For example, the one or more LEDs 369 may comprise a red-green-blue (RGB) LED and/or an RGB LED array to facilitate the display of various colors. The control assembly 140 may additionally or alternatively cause the display region 638 to be lighted in different colors to indicate the locked/unlocked status of the outside trim assembly 200.

Figure 61:
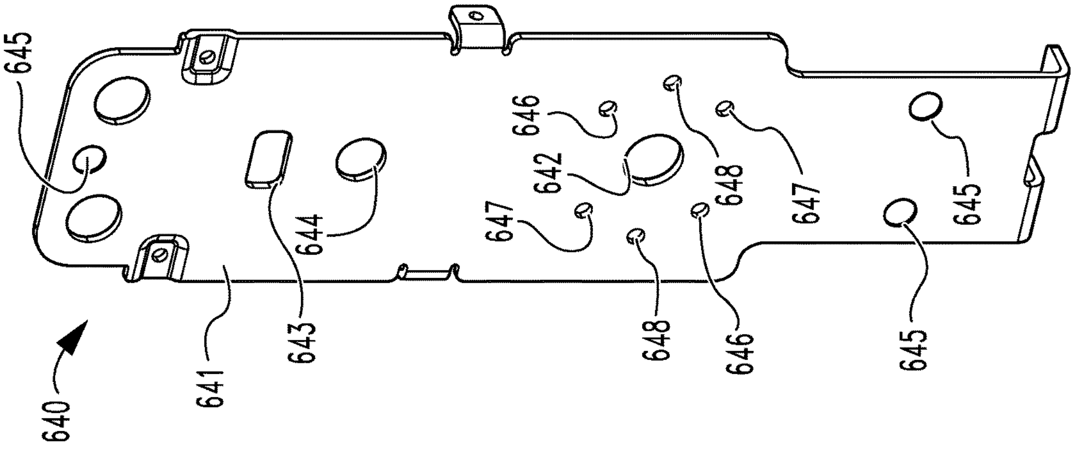
FIG. 61 is a perspective view of a backplate according to certain embodiments.

With additional reference to FIG. 61, illustrated therein is a backplate 641 of the inside trim assembly 300. The backplate 641 is installed to the rear side of the inside trim assembly 300, and may abut the interior surface 93 of the door 90 when the lockset 100 is installed to the door 90. The backplate 641 includes a spindle opening 642 through which the inside drive spindle 340 extends, a wiring opening 643 through which a wire harness 190 (FIG. 40) extends to connect one or more electronic components of the outside trim assembly 200 with one or more electronic components of the inside trim assembly 300, a stem opening 644 through which the stem 383 of the thumbturn 382 may extend for connection with the deadbolt actuation assembly 115, and one or more mounting openings 645 through which fasteners may extend into engagement with the outside ferrules 279 to secure the inside backplate 641 to the outside backplate assembly 270 with a door captured therebetween.

The backplate 641 also includes a plurality of ferrule openings configured to facilitate mounting of the inside trim assembly 300 to a door. As described herein, the plurality of ferrule openings includes a first set of mortise-format ferrule openings 646, a second set of mortise-format ferrule openings 647, and a set of tubular-format ferrule openings 648. In the illustrated form, each set of ferrule openings 646, 647, 648 includes a pair of openings that are diametrically opposite one another with regard to the spindle opening 642. It is also contemplated that a one or more sets of openings may include more or fewer openings, and that such openings may be arranged in a different pattern.

Figure 62:
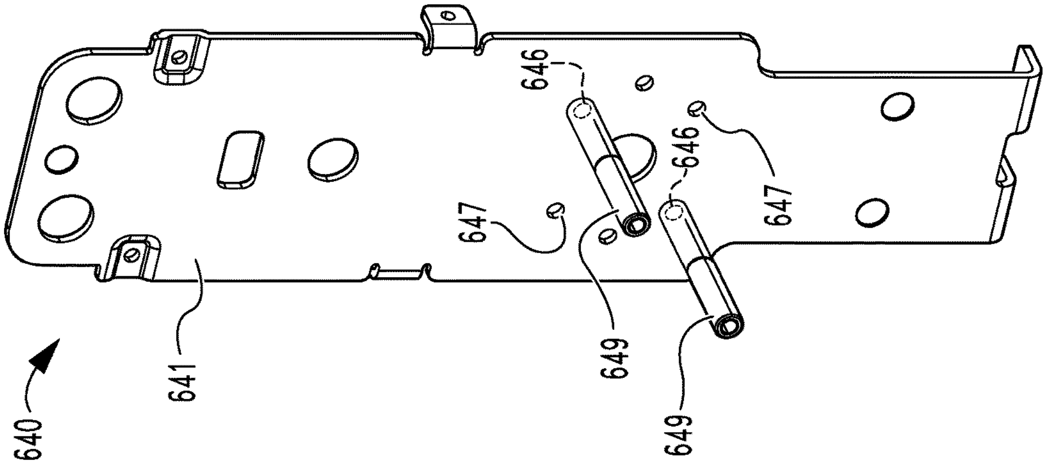
FIG. 62 is a perspective view of a backplate assembly in a mortise-format configuration.

With additional reference to FIG. 62, illustrated therein is a backplate assembly 640 including the backplate 641 and a pair of ferrules 649. More particularly, FIG. 62 illustrates the backplate assembly 640 in a first configuration, in which the ferrules 649 are mounted to the backplate 641 via fasteners (e.g., screws) extending through the first mortise-format ferrule openings 646. In this configuration, the ferrules 649 may extend through openings in the mortise assembly 110, and fasteners may be inserted into the ferrules 649 from the outer side of the door to secure the backplate 641 to the door and prevent movement of the backplate assembly 640 relative to the mortise assembly 110.

In the illustrated form, the ferrules 649 are mounted to the first mortise-format ferrule openings 646 to facilitate installation of the mortise lockset 100 in a first handing configuration (e.g., one of a right-handed configuration or a left-handed configuration). It is also contemplated that the ferrules 649 may be mounted to the second mortise format ferrule openings 647 to facilitate installation of the mortise lockset 100 in a second handing configuration (e.g., the other of the right-handed configuration or the left-handed configuration).

Figure 63:
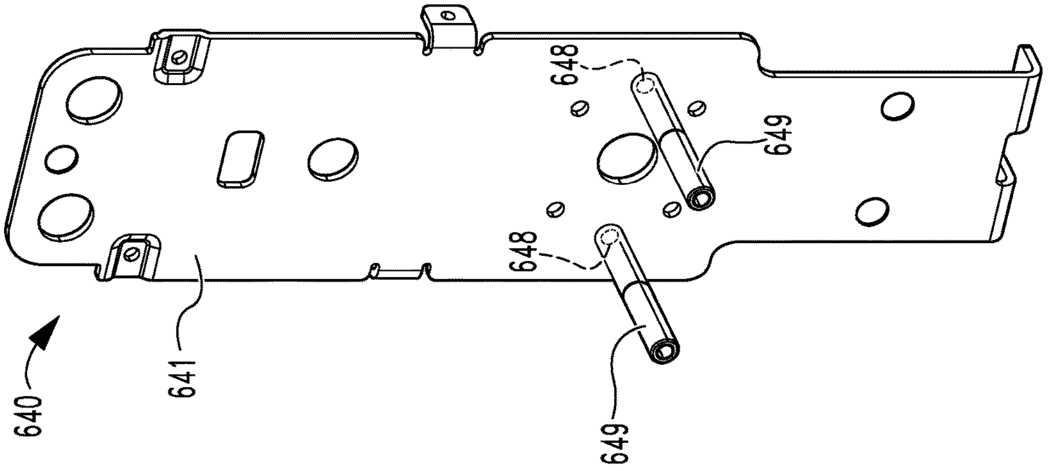
FIG. 63 is a perspective view of the backplate assembly in a tubular-format configuration.

With additional reference to FIG. 63, illustrated therein is the backplate assembly 640 in a second configuration, in which the ferrules 649 are mounted to the backplate 641 via fasteners (e.g., screws) extending through the tubular format ferrule openings 648. As noted above, the illustrated inside trim assembly 300 is configured for use both in the illustrated mortise format and a tubular format (see FIG. 65). With the backplate assembly 640 in the second configuration, the inside trim assembly 300 may be utilized in a tubular format lockset, such as the tubular lockset 700 illustrated in FIG. 65.

Figure 64:
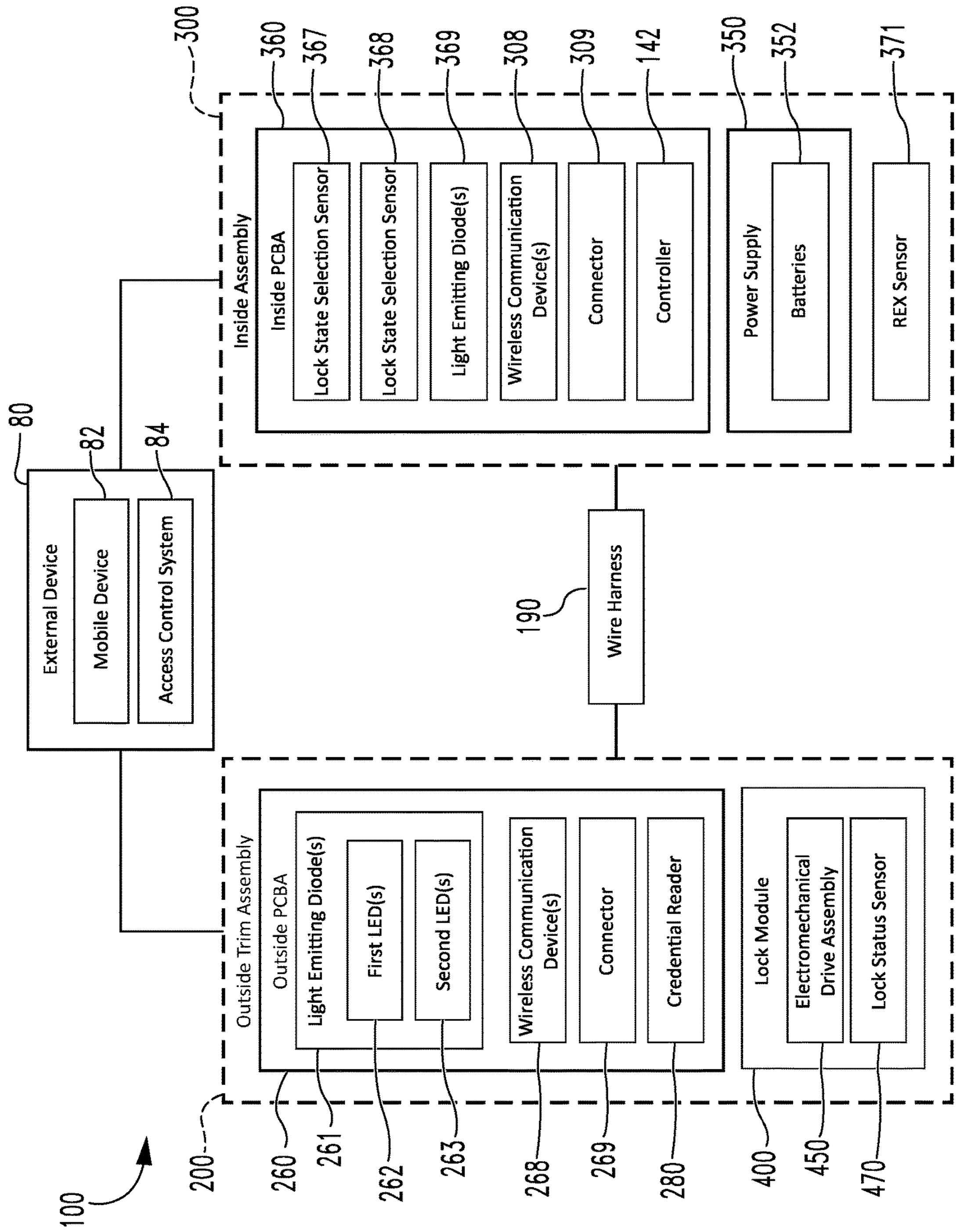
FIG. 64 is a schematic block diagram of the mortise format lockset.

With additional reference to FIG. 64, illustrated therein is a schematic block diagram of the lockset 100. In certain embodiments, the outside trim assembly 200 may include a wireless communication device 268 and/or the inside trim assembly 300 may include a wireless communication device 308. Such wireless communication device(s) 268, 308 may facilitate communication between the controller 142 and an external device 80, such as a mobile device 82 and/or an access control system 84 (e.g., a smart home system).

In the illustrated form, the inside PCBA 360 is in communication with the outside PCBA 260 via a wire harness 190, which extends through a hole in the door and transmits power from the power source 350 to the electronic components of the outside trim assembly 200, for example as described above with reference to FIG. 40. In the illustrated form, the wire harness 190 also facilitates wired communication between one or more electronic components of the outside trim assembly 200 and one or more electronic components of the inside trim assembly 300. It is also contemplated that the electronic components of the outside trim assembly 200 and the electronic components of the inside trim assembly 300 may communicate wirelessly, for example in embodiments in which both the outside trim assembly 200 and the inside trim assembly 300 includes a corresponding and respective wireless communication device 268, 308.

Figure 65:
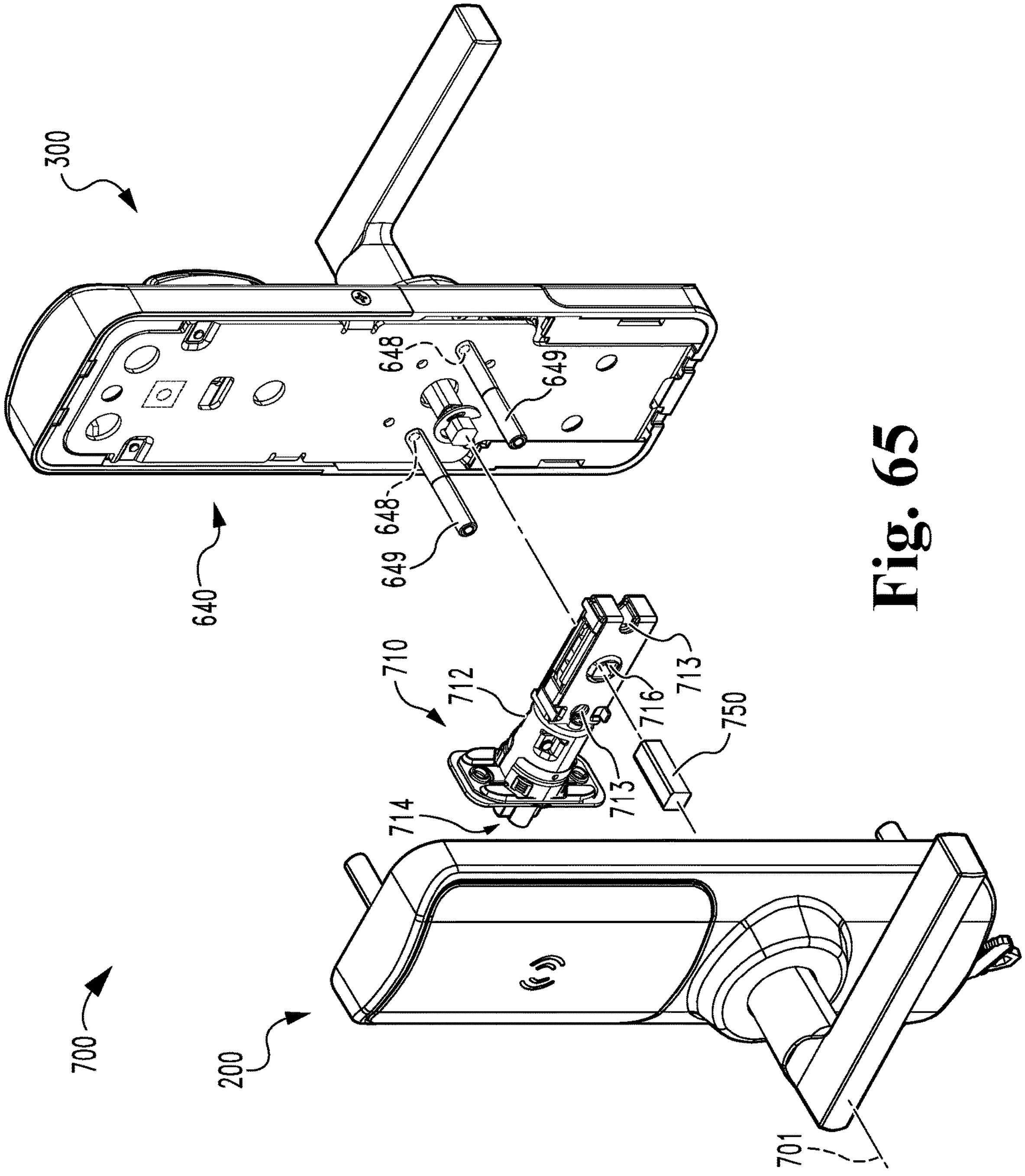
FIG. 65 is an exploded assembly view of a tubular lockset according to certain embodiments.

With additional reference to FIG. 65, illustrated therein is an access control assembly in the form of a tubular format lockset 700 according to certain embodiments. The lockset 700 is substantially similar to the lockset 100 illustrated in FIG. 1, and includes the outside trim assembly 200, the inside trim assembly 300, and a latch spindle 750 corresponding to the latch spindle 150. While the above-described lockset 100 is a mortise format lockset including a mortise assembly 110, the illustrated lockset 700 is a tubular format lockset including a tubular format latch mechanism 710. In the interest of conciseness, the following description of the tubular format lockset 700 focuses primarily on elements and features that are different from those described above with reference to the mortise format lockset 100.

The tubular latch mechanism 710 is configured for mounting in the one-inch diameter latch bore of a standard tubular-format door preparation, and generally includes a housing 712, a latchbolt 714 slidably mounted in the housing 712, and at least one retractor 716 operably connected with the latchbolt 714. Each retractor 716 is rotatable about the rotational axis 701, and is engaged with the latchbolt 714 such that rotation of the retractor 716 from a home position to a rotated position drives the latchbolt 714 from an extended position to a retracted position. In the illustrated form, the at least one retractor 716 comprises an outside retractor that is engaged with the latch spindle 750, and an inside retractor that is engaged with the inside drive spindle 340. It is also contemplated that the latch mechanism 710 may include a single retractor 716, and that the latch spindle 750 may extend through the latch mechanism 710 for engagement with each of the outside trim assembly 200 and the inside trim assembly 300. Alternatively, the inside drive spindle 340 may extend through the latch mechanism 710 and engage the second hub 430 of the lock module 400, for example as illustrated in FIG. 81.

In the illustrated form, the backplate assembly 640 is provided in the tubular configuration illustrated in FIG. 65, in which the ferrules 649 are mounted to the backplate 641 via fasteners extending through the tubular-format ferrule openings 648. The ferrules 649 also extend through openings 713 in the housing 712 of the latch mechanism 710, and fasteners may be inserted into the ferrules 649 from the exterior side of the door to secure the inside trim assembly 300 to the door and the latch mechanism 710.

As noted above, at least some of the embodiments described herein are configured for conversion between multiple formats of access control device. For example, the outside trim assembly 200 and the inside trim assembly 300 may be utilized in both the mortise format lockset 100 illustrated in FIG. 1 and the tubular format lockset 700 illustrated in FIG. 65. An access control system according to certain embodiments may thus be convertible between a mortise format lockset 100 and a tubular format lockset 700. Such conversion may involve replacing the mortise assembly 110 with the tubular latch mechanism 710, and optionally replacing the latch spindle 150 with the latch spindle 750. As will be appreciated, such conversion may also involve moving the ferrules 649 from the first mortise-format ferrule openings 646 to the tubular-format ferrule openings 648.

It should also be appreciated that in the tubular format illustrated in FIG. 63, the inside trim assembly 300 can be provided in either the pushbutton configuration 602 illustrated in FIGS. 57 and 58 or the indicator configuration 603 illustrated in FIGS. 59 and 60. It is also contemplated that the inside trim assembly 300 may be provided in a modification of the thumbturn configuration 601, in which the stem

383 does not extend into the door. In other embodiments, such as those in which the tubular format lockset 700 further includes a deadbolt and the outside trim assembly 200 includes a mechanism by which such a deadbolt can be retracted, the inside trim assembly 300 may be provided in the thumbturn configuration 601 illustrated in FIGS. 55 and 56.

As should be evident from the foregoing, certain embodiments of the present application allow an access control device to be converted between a mortise format lockset 100 and a tubular format lockset 700 merely by moving the ferrules 649 and interchanging the mortise assembly 110 and the tubular latch mechanism 710, which in the illustrated embodiment are purely mechanical components. As such, while the schematic block diagram of FIG. 64 is described above with reference to the mortise format lockset 100, that figure and the description thereof may be equally applicable to the tubular format lockset 700 illustrated in FIG. 65.

Figure 66:
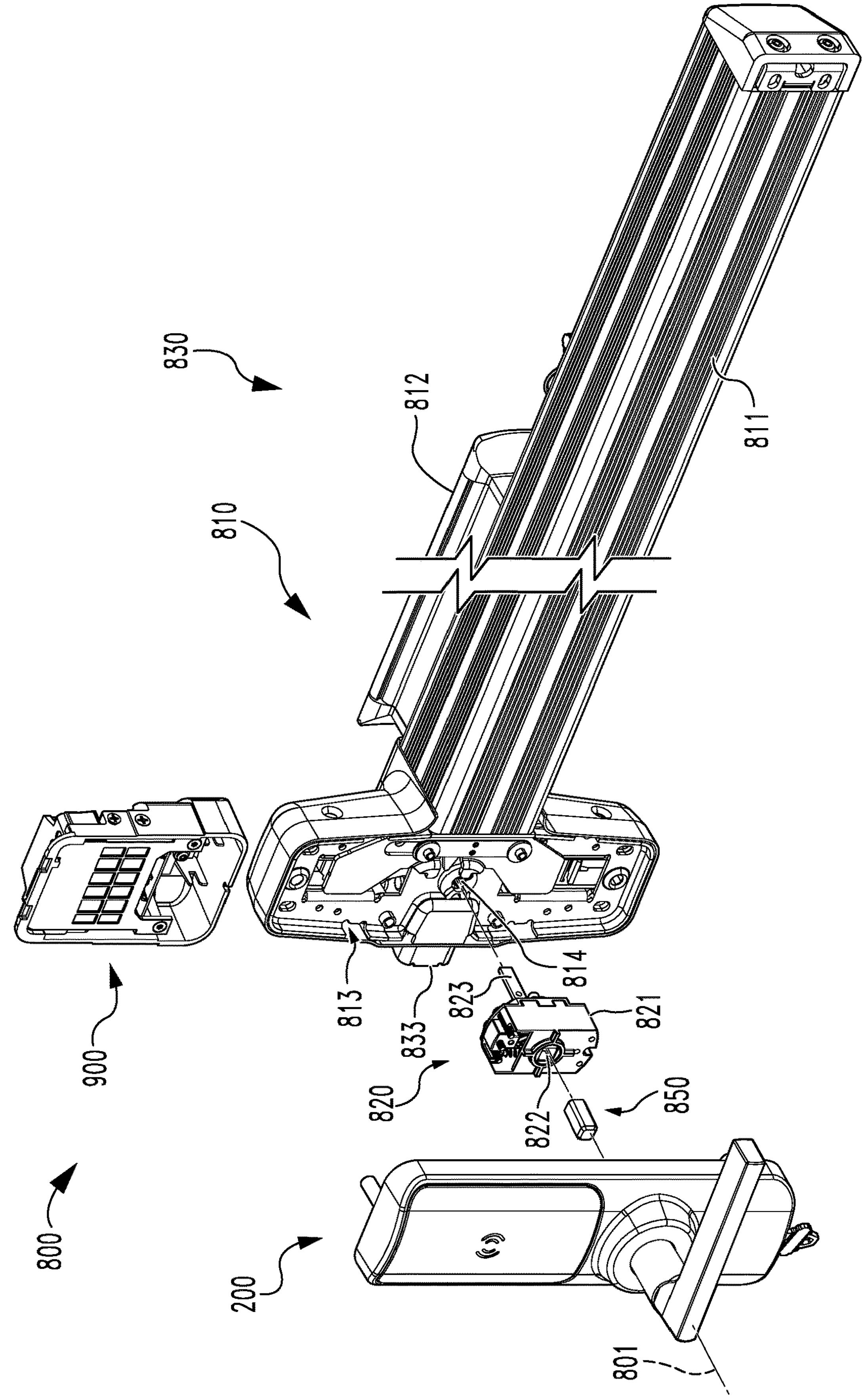
FIG. 66 is an exploded assembly view of an access control assembly according to certain embodiments, the access control assembly including a rim format exit device.

With additional reference to FIG. 66, illustrated therein is an exit format access control assembly 800 according to certain embodiments. The access control assembly 800 includes the outside trim assembly 200, a pushbar assembly 810 configured for mounting to the egress side of the door, a rotation converter 820 configured for mounting within the door, a latch spindle 850 connected between the second hub 430 of the lock module 400 and an input mechanism 822 of the rotation converter 820, and an inside assembly 900 according to certain embodiments. In certain embodiments, the pushbar assembly 810 and/or the rotation converter 820 may, for example, be of the type described in U.S. patent application Ser. No. 17/351,725, filed Jun. 18, 2021, the contents of which are hereby incorporated by reference in their entirety.

The pushbar assembly 810 generally includes a mounting assembly 811, a pushbar 812 movably mounted to the mounting assembly 811, a latch control assembly 813 operably connected with the pushbar 812, and an actuator 814 operably connected with the latch control assembly 813. The pushbar 812 is biased toward an extended position, and depression of the pushbar 812 (e.g., manual depression by a user and/or electronic depression by a motor of the pushbar assembly 810) actuates the latch control assembly 813. The actuator 814 is also connected with the latch control assembly 813 such that rotation of the actuator 814 in an actuating direction from a home position to an actuated position actuates the latch control assembly 813. Pushbar assemblies of this type are known in the art, and need not be described in further detail herein.

In the illustrated form, the pushbar assembly 810 is provided in the form of a rim-format exit device 830, which includes a latchbolt 833 that projects from one side of the pushbar assembly 810. The latchbolt 833 is operably connected with the latch control assembly 813 such that actuation of the latch control assembly 813 (e.g., by the pushbar 812 and/or the actuator 814) retracts the latchbolt 833. It is also contemplated that the access control assembly 800 may be provided in another format, such as one in which the pushbar assembly 810 does not necessarily include a latchbolt. As one example, the access control assembly 800 may be provided in the form of a vertical exit assembly in which one or more remote latch mechanisms are positioned above and/or below the pushbar assembly. In such forms, the latch control assembly 813 may be connected with the remote latch mechanism(s) via one or more connectors such that the connector(s) actuate the remote latch mechanisms(s) in response to actuation of the latch control assembly 813. Further details regarding example forms of vertical format exit devices are provided below with reference to FIGS. 76 and 77.

The rotation converter 820 is configured for mounting within the door, and generally includes a housing 821, an input mechanism 822 rotatably mounted to the housing 821 and engaged with the latch spindle 850, and an output mechanism 823 rotatably mounted to the housing 821 and engaged with the actuator 814. The output mechanism 823 is operably connected with the input mechanism 822 such that the output mechanism 823 rotates in the actuating direction in response to rotation of the input mechanism in either direction. In other words, the rotation converter 820 is configured to rotate the output mechanism 823 in the actuating direction in response to rotation of the input mechanism 822 in a first direction, and is further configured to rotate the output mechanism 823 in the actuating direction in response to rotation of the input mechanism 822 in a second direction opposite the first direction.

The latch spindle 850 extends along a longitudinal rotational axis 801, and is connected between the second hub 430 of the lock module 400 and the input mechanism 822 such that the outside handle 230 is operable to rotate the latch spindle 850 when the outside trim assembly 200 is unlocked. The handle 230 may rotate the latch spindle 850 in the first rotational direction when the outside trim assembly 200 is installed in a first handing orientation, and the handle 230 may rotate the latch spindle 850 in the second rotational direction when the outside trim assembly 200 is installed in a second handing orientation. Regardless of the handing orientation, the rotation converter 820 may cause the output mechanism 823 (and thus the actuator 814) to rotate in the actuating direction in response to rotation of the input mechanism 822, thereby permitting the outside handle 230 to actuate the latch control assembly 813 when the outside trim assembly 200 is in its unlocked state.

Figure 67:
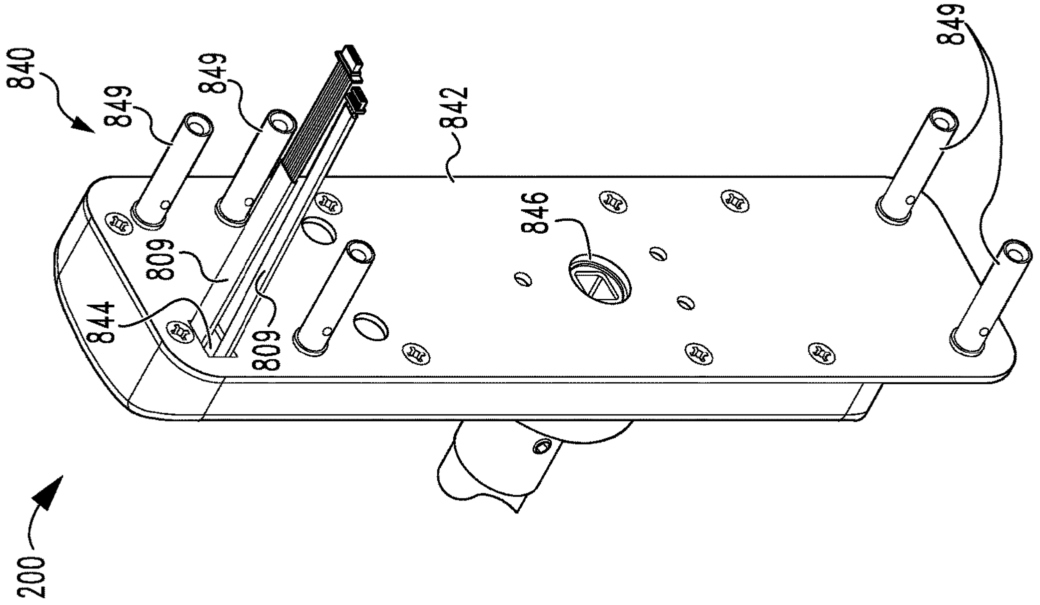
FIG. 67 is a perspective view of the outside trim assembly with an adapter assembly installed thereto.

With additional reference to FIG. 67, it may be desirable to provide the outside trim assembly 200 with an adapter assembly 840 that facilitates mounting of the outside trim assembly 200 to the door and/or the pushbar assembly 810. In the illustrated form, the adapter assembly 840 generally includes an adapter plate 842 including a plurality of ferrule openings, and one or more posts or ferrules 849 secured to the adapter plate 842 via fasteners extending through the ferrule openings. The adapter plate 842 also includes a wiring opening 844 through which one or more wire harnesses 809 extend. In the illustrated form, each wire harness 809 extends from the opening 272 in the main backplate 271 and through a pocket formed between the rear surface of the recessed portion 274 and the front surface of the adapter plate 842, and out of the wire opening 844. An additional opening 846 is aligned with the second hub 430 to permit passage of the latch spindle 850 therethrough.

As noted above, one feature associated with certain embodiments of the present application is the capability of the outside trim assembly 200 to be used in several configurations of access control devices. This universality of the outside trim assembly 200 may extend not only to different formats (e.g., mortise format, tubular format, and exit format), but also to different configurations within a particular format. In the illustrated form, the provision of an adapter assembly such as the adapter assembly 840 may facilitate the use of the outside trim assembly 200 with different configurations of the pushbar assembly 810. For example, one configuration of the adapter assembly 840 may include ferrules in a particular pattern suitable for use with a first configuration of the pushbar assembly 810, and another configuration of the adapter assembly 840 may include ferrules in a different pattern suitable for use with a second configuration of the pushbar assembly 810.

Figure 68:
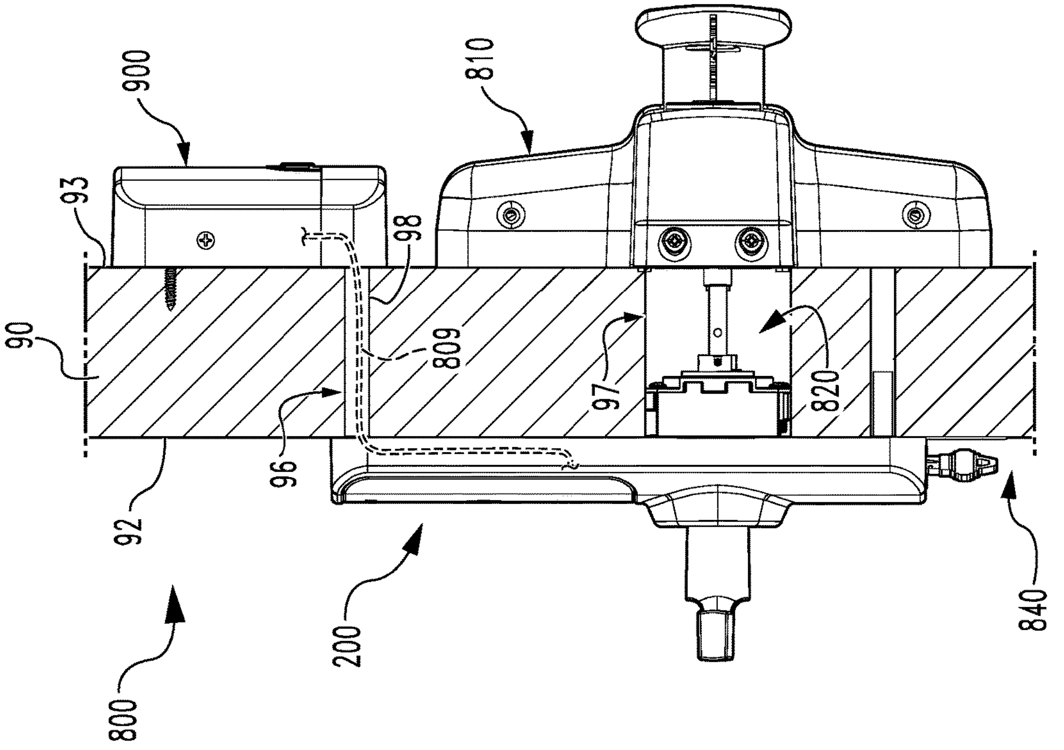
FIG. 68 is a cross-sectional illustration of the access control assembly of FIG. 66 installed to a door.

With additional reference to FIG. 68, illustrated therein is the access control assembly 800 mounted to a door 90. The outside trim assembly 200 is mounted to an outer or non-egress side 92 of the door 90, and the pushbar assembly 810 and the inside assembly 900 are mounted to an opposite egress side 93 of the door 90. The door 90 also includes a door preparation 96, which in the illustrated form includes a primary bore 97 and a secondary bore 98. In the illustrated form, the rotation converter 820 is seated in the primary bore 97, and the at least one wire harness 809 extends through the secondary bore 98.

Figure 69:
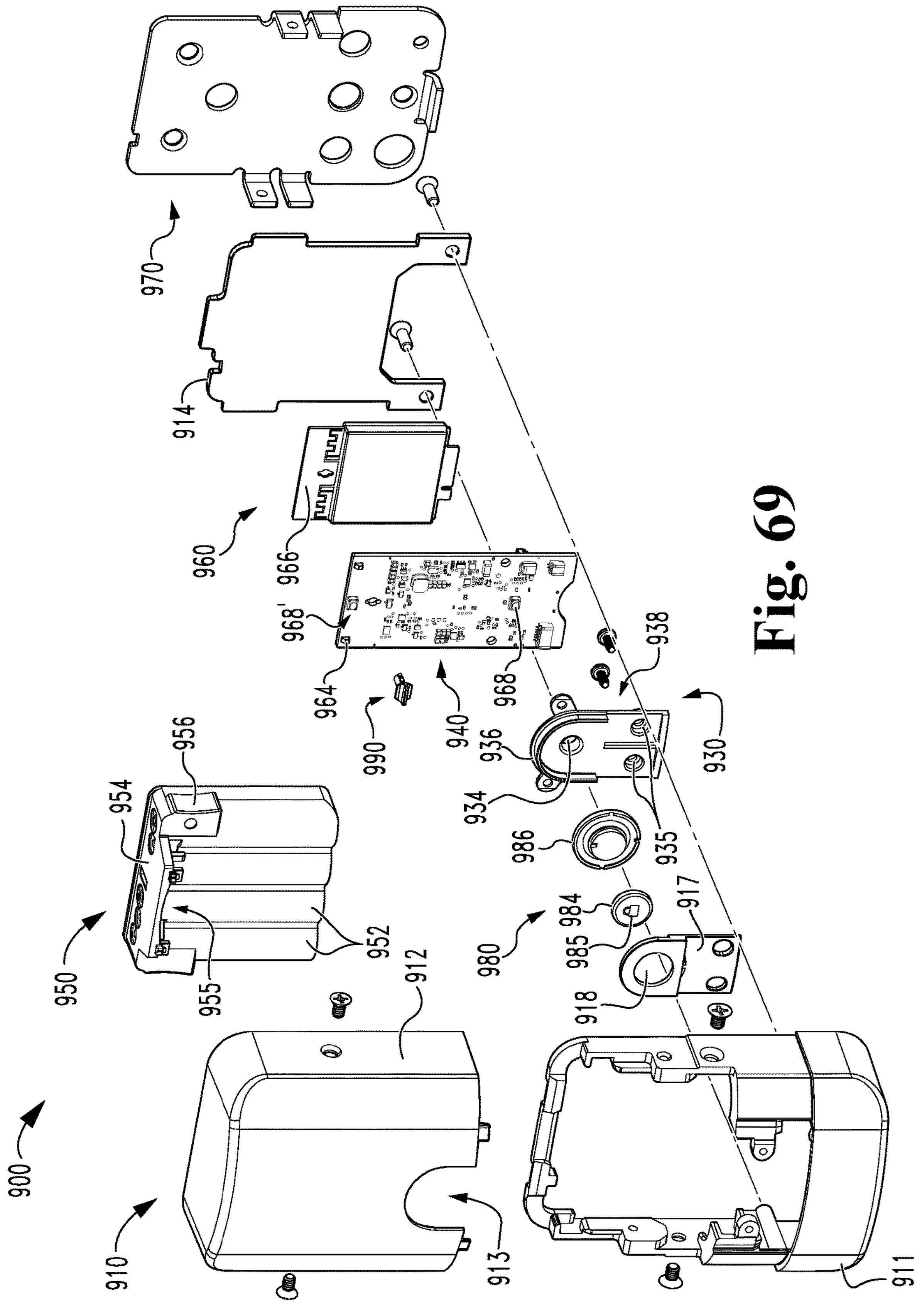
FIG. 69 is an exploded assembly view of an inside assembly according to certain embodiments.
Figure 70:
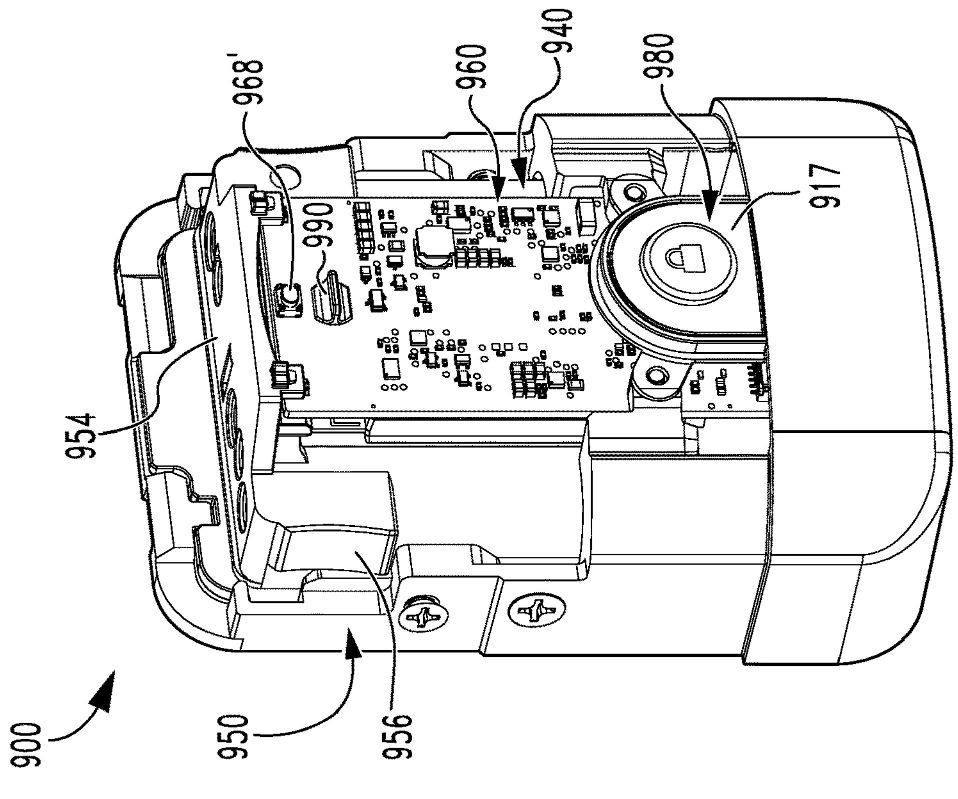
FIG. 70 is a perspective view of a portion of the inside assembly.

With additional reference to FIGS. 69 and 70, the inside assembly 900 is operable to perform one or more functions described above in association with the inside trim assembly 300, and generally includes a housing 910 configured for mounting to the door, a light guide 930 mounted to the housing 910, an onboard power source 950 mounted within the housing 910, and an inside PCBA 960, and may further include a lock state selector 980 and/or a retention key 990.

The housing 910 includes a case 911, a main cover 912 slidably mounted to the case 911, a battery guide 914 mounted within the case 911, a secondary cover 917 that covers a portion of the light guide 930, and a backplate 970 configured for mounting to the door. When installed to the case 911, the main cover 912 covers the internal components of the inside assembly 900. The main cover 912 includes an arcuate recess 913 that accommodates a ridge 936 of the light guide 930 to delimit a display region 938 of the light guide 930. The battery guide 914 covers the backplate 970 and the heads of the fasteners by which the backplate 970 is secured to the door, and thereby provides a smooth interface that facilitates insertion and removal of the onboard power source 950. The battery guide 914 may additionally or alternatively retain the power source 950 within the case 911 prior to mounting of the case 911 to the backplate 970. Further details regarding the backplate 970 are provided below with reference to FIG. 76.

The light guide 930 is somewhat similar to the above-described light guide 630, and is configured to direct light from one or more light sources (e.g., LEDs) on the PCBA 960 to the display region 938 defined by the ridge 936. The light guide 930 includes fastener openings 935 through which fasteners extend to secure the light guide 930 to the case 911. The light guide 930 also includes an aperture 934 through which a portion of the lock state selector 980 may extend to actuate a lock state selection sensor 968 of the PCBA 960.

Figure 71:
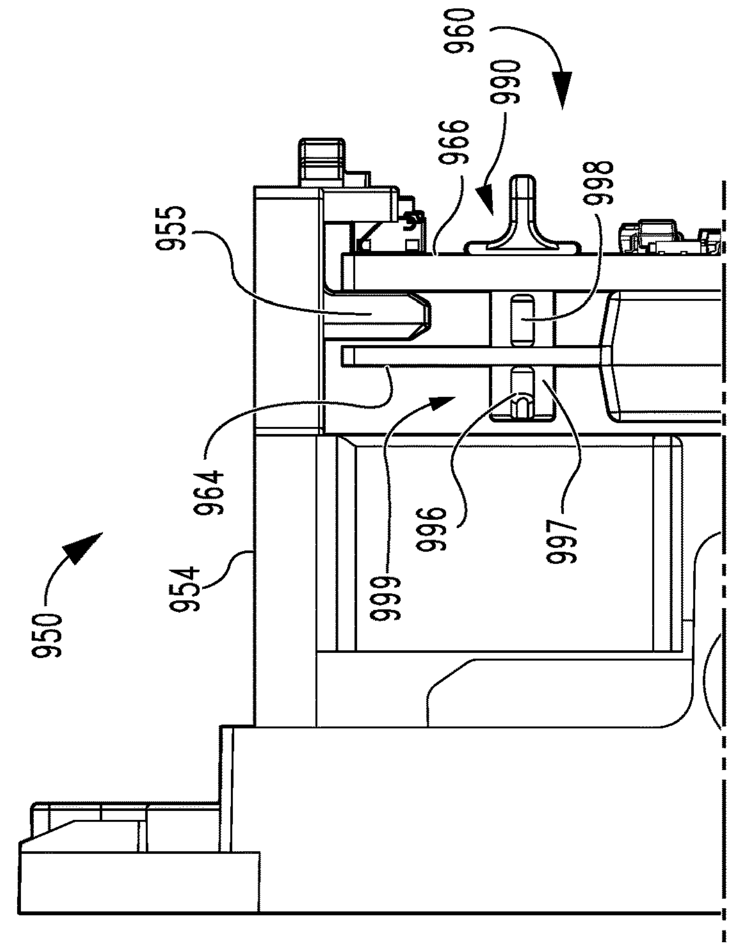
FIG. 71 is a side view of a portion of the inside assembly, and illustrates features associated with a power source and a printed circuit board assembly (PCBA).

With additional reference to FIG. 71, the power source 950 is removably mounted within the housing 910, and in the illustrated form includes one or more batteries 952 and a case 954 in which the batteries 952 are stored. It is also contemplated that the power source 950 may be provided in another form. For example, the power source 950 may include one or more supercapacitors. The case 954 also includes a connector that mates with a corresponding connector of the PCBA 960 to place the PCBA 960 in electrical connection with the batteries 952. The mating connectors may be disengaged to remove the power source 950 from the housing 910. In the illustrated form, the case 954 also includes a ridge 955 that is received between a first PCB 964 and a second PCB 966 of the PCBA 960 to thereby provide support for the forward second PCB 966, for example during depression of a pushbutton 968' mounted to second PCB 966. In certain embodiments, the case 954 may include grips 956 that facilitate insertion and removal of the power source 950.

Figure 72:
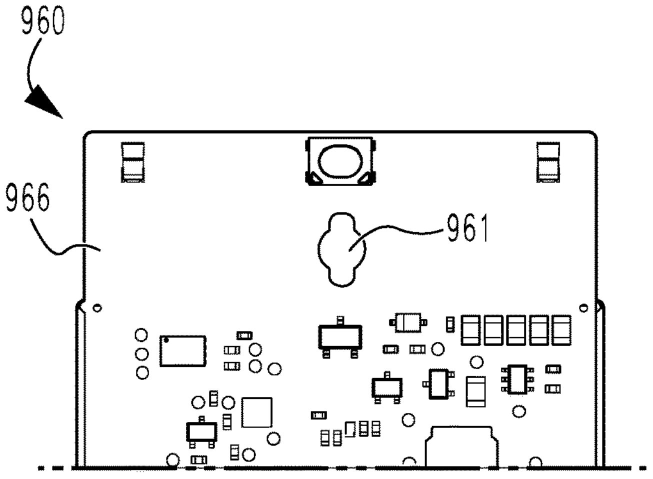
FIG. 72 is a plan view of a portion of the PCBA.

With additional reference to FIG. 72, the PCBA 960 includes at least a portion of a control assembly 940, which corresponds to the above-described control assembly 140. The control assembly 940 and/or the PCBA 960 may perform one or more functions described above with reference to the control assembly 140 and the PCBA 360. In the interest of conciseness, these functions need not be reiterated here. The PCBA 960 may include one or more light sources (e.g., one or more LEDs) that provide light via the light guide 930 and/or a lock state selection sensor 968. In the illustrated form, the lock state selection sensor 968 is provided in the form of an electronic pushbutton. It is also contemplated that the lock state selection sensor 968 may take another form. Each PCB 964, 966 may include a corresponding and respective keyway 961, which in the illustrated form is provided as a slot that intersects a circle.

In embodiments that include the lock state selector 980, the lock state selector 980 may, for example, include a pushbutton 984 and corresponding to the pushbutton 384 and a support gasket 986 corresponding to the support gasket 386. The pushbutton 984 may include one or more indicia 985, and one or more LEDs of the PCBA 960 may selectively illuminate the indicia 985 to thereby provide a visual indication regarding the locked/unlocked state of the outside trim assembly 200. The support gasket 986 may include a stem that extends through the aperture 934 such that depression of the pushbutton 984 actuates the lock state selection sensor 968. As will be appreciated, such actuation may cause the control assembly 940 to transmit a lock/unlock command in a manner analogous to that described above.

Figure 73:
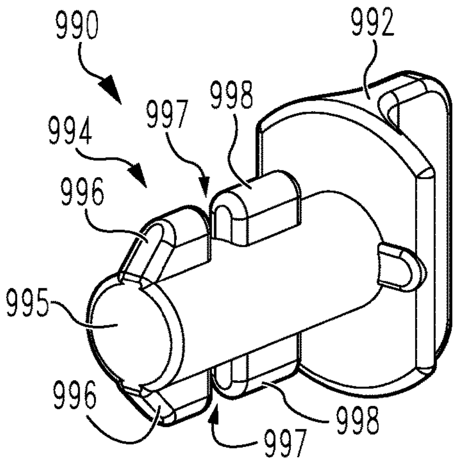
FIG. 73 is a perspective view of a retention key according to certain embodiments.

With additional reference to FIG. 73, the retention key 990 generally includes a head 992 and a shank 994 extending from the head 992. The shank 994 includes a generally cylindrical body portion 995, and two pairs of splines 996, 998 positioned on opposite sides of the body portion 995. Each pair of splines includes a forward spline 996 and a rearward spline 998, and a slot 997 sized and shaped to receive the first PCB 964 is formed between each forward spline 996 and the corresponding rearward spline 998. Installation of the retention key 990 involves aligning the forward splines 996 with the slot portion of the keyway 961 and inserting the shank 994 through the aligned keyways 961. The retention key 990 may then be rotated by a desired angle (e.g., about 90°) such that the edges of the keyway 961 on the first PCB 964 are received in the slots 997 and the rearward splines 998 are positioned between the PCBs 964, 966. With the retention key 990 so installed, the retention key 990 prevents removal of the serviceable first PCB 964, and may further provide support for the forward second PCB 966 during depression of the pushbutton 968'.

Figure 74:
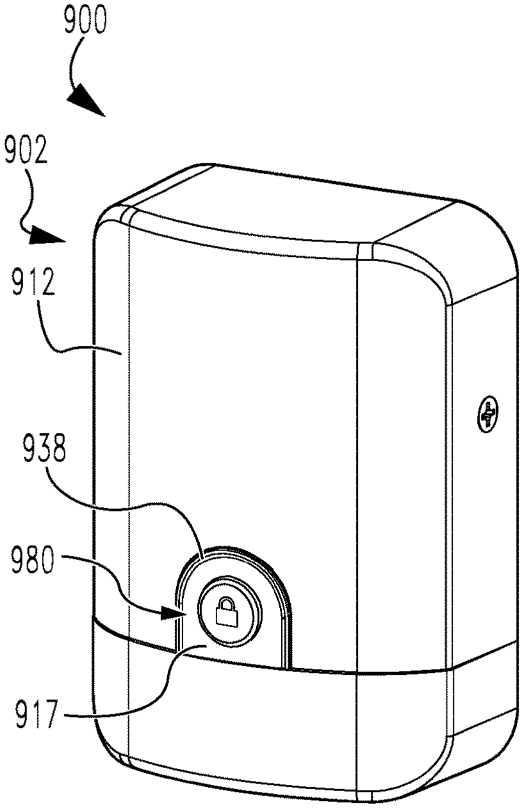
FIG. 74 is a perspective view of the inside assembly in a pushbutton configuration.
Figure 75:
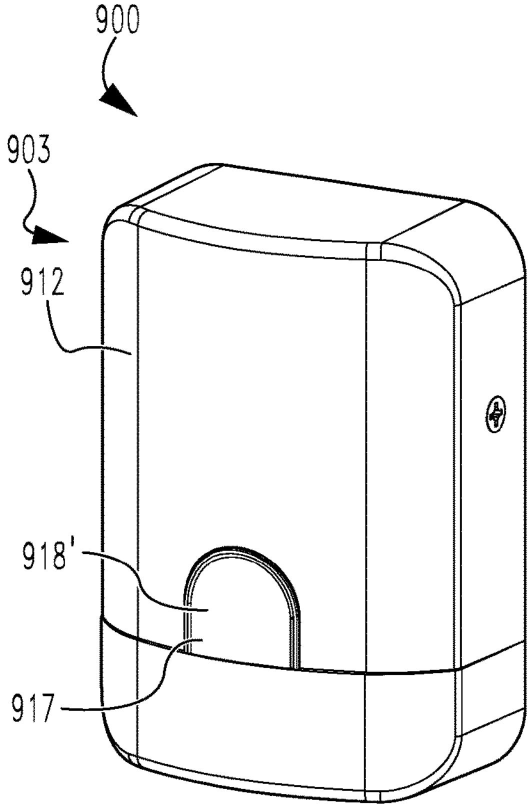
FIG. 75 is a perspective view of the inside assembly in an indicator configuration.

With additional reference to FIGS. 74 and 75, like the inside trim assembly 300, the inside assembly 900 is configurable between a plurality of configurations. More particularly, the inside assembly 900 has a pushbutton configuration 902 (FIG. 74) corresponding to the pushbutton configuration 602 illustrated in FIGS. 57 and 58, and an indicator configuration 903 (FIG. 75) corresponding to the indicator configuration 603 illustrated in FIGS. 59 and 60. As will be appreciated, the inside assembly 900 can be easily transitioned between the configurations merely by replacing a minimal number of components of one configuration with the corresponding components of the other configuration.

Converting the inside assembly 900 from the pushbutton configuration 902 to the indicator configuration 903 may involve removing the lock state selector 980 and the secondary cover 917, and replacing the pushbutton-configuration secondary cover 917 with an indicator-configuration secondary cover 917' that includes a solid region 918' in place of the opening 918 such that the solid region 918' covers the opening 934 of the light guide 930. Conversely, converting the inside assembly 900 from the indicator configuration 903 to the pushbutton configuration 902 may involve replacing the indicator-configuration secondary cover 917' with the pushbutton-configuration secondary cover 917, and installing the lock state selector 980.

Figure 77:
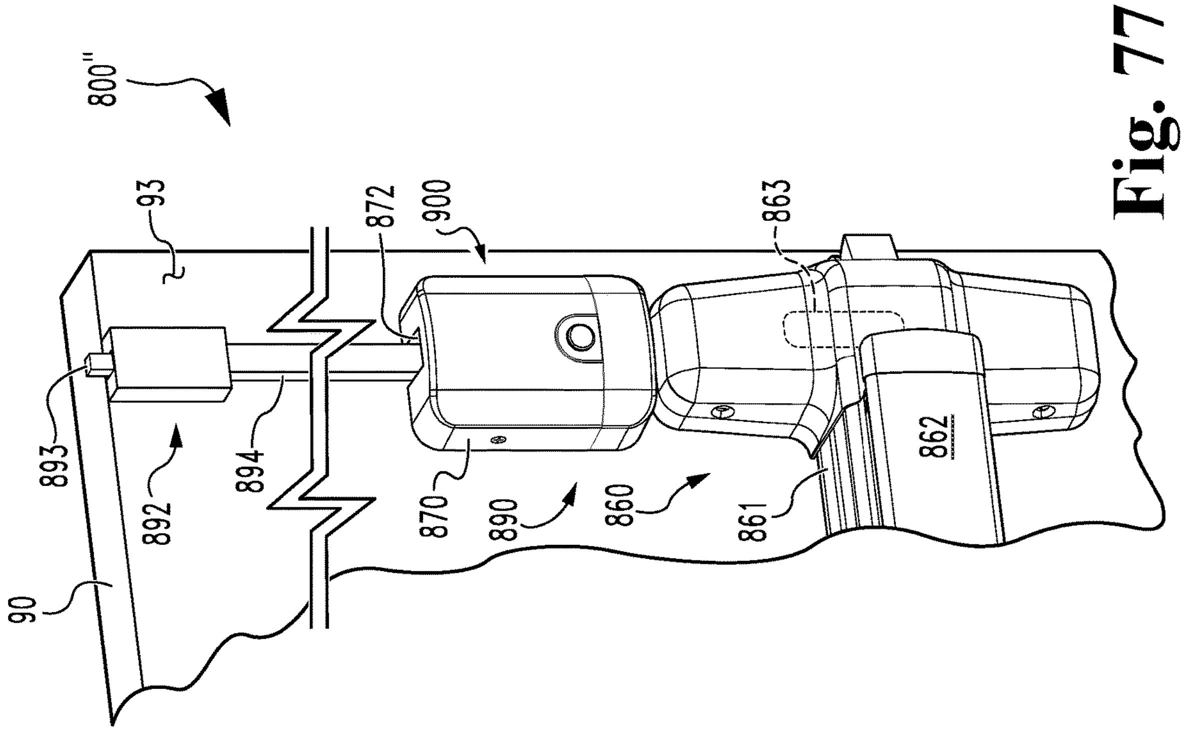
FIG. 77 is a perspective view of an access control assembly according to certain embodiments installed to a door, the access control assembly including a surface vertical exit device.
Figure 76:
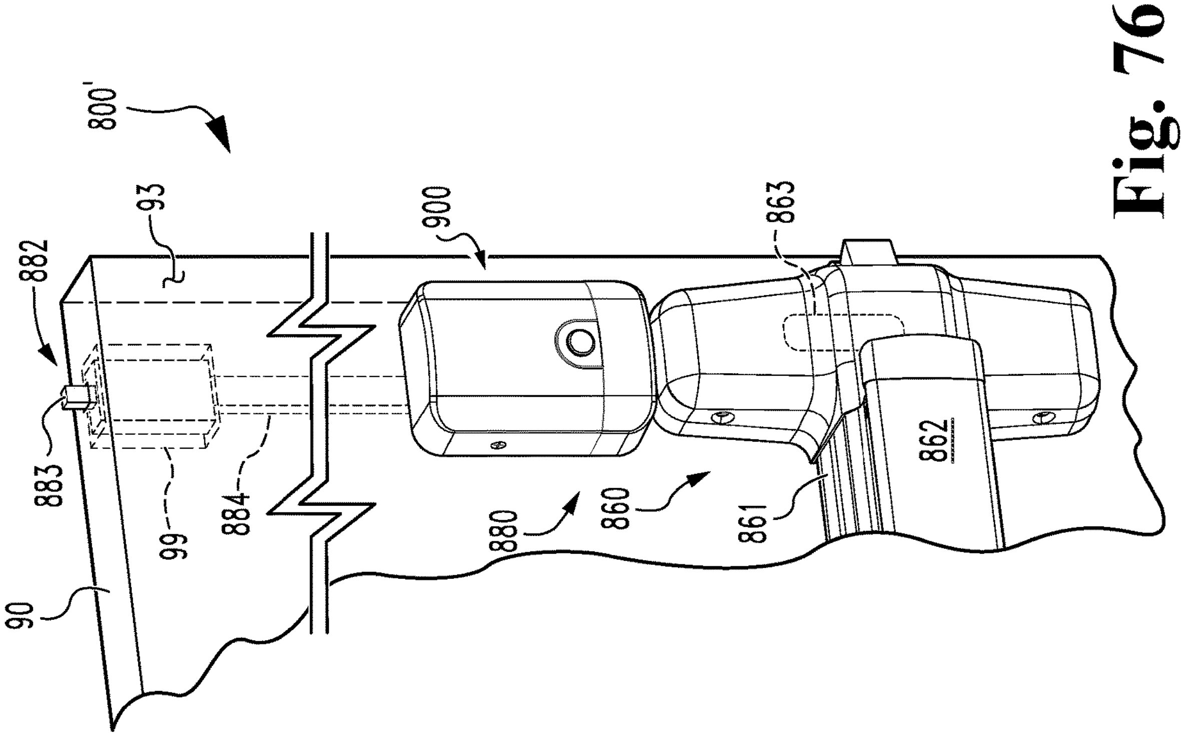
FIG. 76 is a perspective view of an access control assembly according to certain embodiments installed to a door, the access control assembly including a concealed vertical exit device.

As noted above, while the rim exit-format access control assembly 800 illustrated in FIG. 66 comprises a rim-format pushbar assembly 810, it is also contemplated that similar exit-format access control assemblies may be provided in the vertical exit format, in which one or more remote latches are positioned above and/or below the pushbar assembly 810. Further details regarding two example forms of such vertical exit-format access control assemblies are illustrated in FIGS. 76 and 77. More particularly, FIG. 76 illustrates a concealed vertical format access control assembly 800', and FIG. 77 illustrates a surface vertical format access control assembly 800".

With additional reference to FIG. 76, illustrated therein is a door 90 having mounted thereon a concealed vertical format access control assembly 800' according to certain embodiments. The access control assembly 800' is similar to the access control assembly 800 illustrated in FIG. 66, and includes the outside trim assembly 200, the rotation converter 820, the latch spindle 850, a pushbar assembly 860, and the inside assembly 900.

In the illustrated form, the access control assembly 800' also includes a concealed vertical exit device 880. The concealed vertical exit device 880 includes the pushbar assembly 860, which is substantially similar to the pushbar assembly 810, and includes a mounting assembly 861, a pushbar 862, a latch control assembly 863, and an actuator, which respectively correspond to the above-described mounting assembly 811, pushbar 812, latch control assembly 813, and actuator 814. However, the illustrated pushbar assembly 860 does not necessarily include the latchbolt 833. Instead, the concealed vertical exit device 880 includes a concealed remote latch mechanism 882 that is connected to the latch control assembly 863 via a concealed connector 884. The remote latch mechanism 882 and the connector 884 are positioned within a channel 99 of the door preparation 96, and are thereby concealed from view.

Actuation of the latch control assembly 863 causes the connector 884 to actuate the remote latch mechanism 882 to thereby unlock and/or retract the latch 883 of the remote latch mechanism 882. While the illustrated remote latch mechanism 882 is provided in the form of an upper latch mechanism that is positioned above the pushbar assembly 860, it is also contemplated that the concealed vertical exit device 880 may include a lower latch mechanism positioned below the pushbar assembly 860 in addition or as an alternative to the illustrated upper remote latch mechanism 882.

In the concealed vertical format access control assembly 800', the connector 884 is positioned within the door 90 as noted above. As such, the inside assembly 900 may be mounted directly to the egress side 93 of the door 90.

With additional reference to FIG. 77, illustrated therein is a surface vertical format access control assembly 800" according to certain embodiments mounted to the door 90. The access control assembly 800" is similar to the access control assembly 800' illustrated in FIG. 74, and includes the outside trim assembly 200, the rotation converter 820, the latch spindle 850, the pushbar assembly 860, and the inside assembly 900.

In the illustrated form, the access control assembly 800' also includes a surface vertical exit device 890. The surface vertical exit device 890 includes the pushbar assembly 860, and further includes a surface-mounted remote latch mechanism 892 that is connected to the latch control assembly 863 via a surface-mounted connector 894. As with the concealed vertical exit device 880, actuation of the latch control assembly 863 causes the connector 894 to actuate the remote latch mechanism 892 to thereby unlock and/or retract the latch 893 of the remote latch mechanism 892. While the illustrated remote latch mechanism 892 is provided in the form of an upper latch mechanism that is positioned above the pushbar assembly 860, it is also contemplated that the surface vertical exit device 890 may include a lower latch mechanism positioned below the pushbar assembly 860 in addition or as an alternative to the illustrated upper remote latch mechanism 892.

In the surface vertical access control assembly 800", the connector 894 extends upward from the header case of the mounting assembly 861 and along the egress side 93 of the door 90. Thus, the mounting area for the inside assembly 900 is impinged upon by the connector 894. In order to accommodate the mounting of the inside assembly 900 in the appropriate location, the inside assembly 900 may be mounted to the door 90 via a spacer 870, which includes a channel 872 through which the connector 894 extends. The spacer 870 thereby permits mounting of the inside assembly 900 to the appropriate location on the door 90 while accommodating the surface-mounted vertical connector 894.

Figure 78:
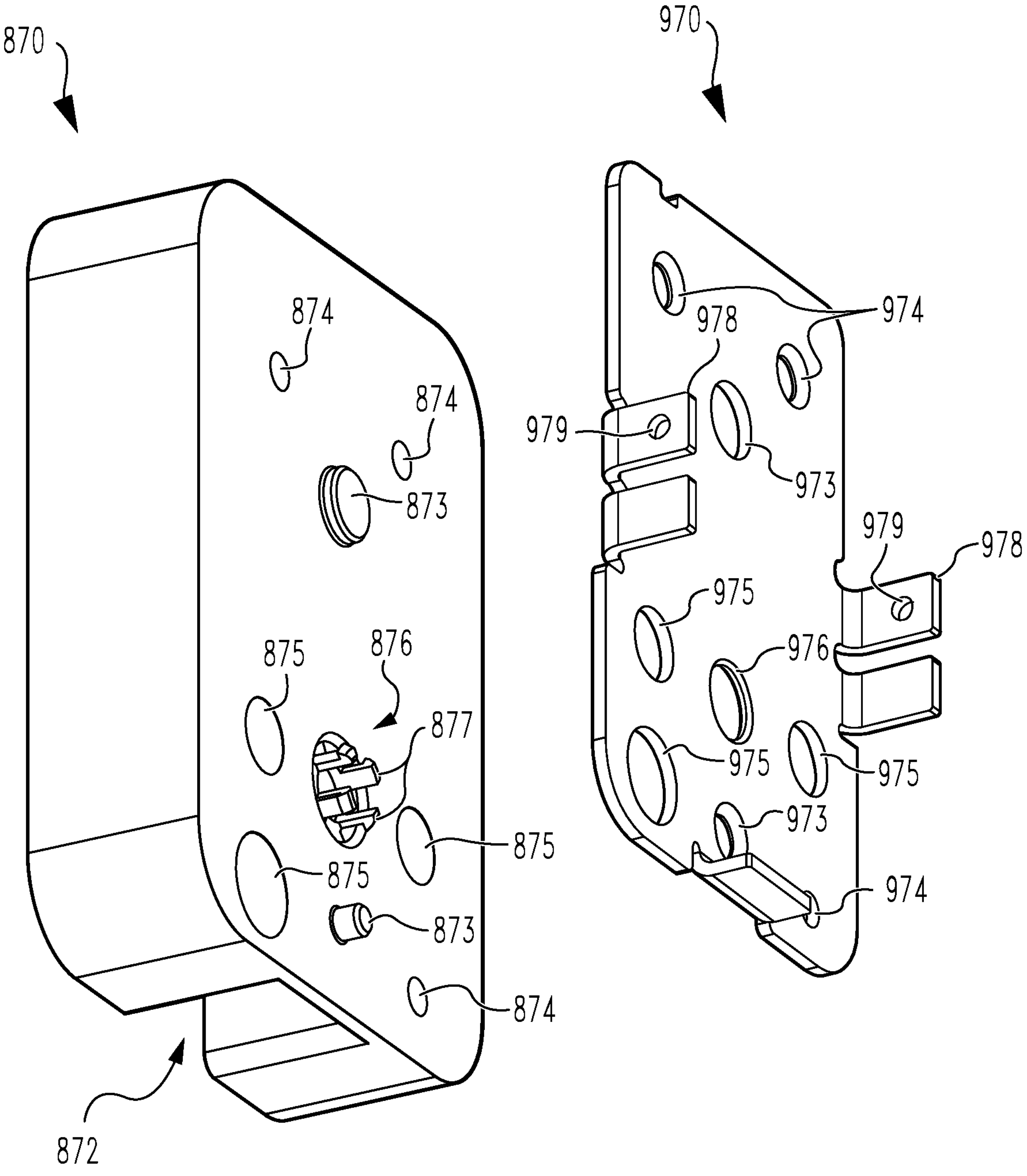
FIG. 78 is an exploded perspective view of a spacer according to certain embodiments along with a backplate of the inside assembly.

With additional reference to FIG. 78, the spacer 870 includes a channel 872 through which the connector 894 is operable to extend. The channel 872 is formed in the rear or door-facing side of the spacer 870, and the front or outward facing side of the spacer 870 includes one or more alignment bosses 873 that facilitate alignment of the backplate 970 for mounting of the backplate 970 to the spacer 870. The spacer 870 also includes one or more fastener openings 874 and one or more wire openings 875. The spacer 870 further includes an attachment mechanism 876 including one or more deflectable clip arms 877 that facilitate mounting of the backplate 970 to the spacer 870 as described herein.

The illustrated backplate 970 includes one or more alignment openings 973, each of which is configured to receive a corresponding one of the alignment bosses 873 to facilitate alignment of the backplate 970 relative to the spacer 870. The illustrated backplate 970 also includes one or more fastener openings 974 configured for alignment with the spacer fastener openings 874 such that one or more fasteners may be inserted into the aligned openings 874, 974 for securing the spacer 870 and the backplate 970 to the door 90. The illustrated backplate 970 also includes one or more wire openings 975 that align with the spacer wire openings 875 such that a wiring harness may be passed through the openings 875, 975 for connection with the PCBA 960. The illustrated backplate 970 further includes an attachment opening 976 configured to receive the deflectable clip arms 877 to releasably secure the backplate 970 to the spacer 870 so that the fasteners may be inserted without requiring the user to manually maintain alignment of the spacer 870 and backplate 970 during installation. The illustrated backplate 970 further includes a pair of tabs 978, each of which includes a corresponding fastener opening 979 through which a fastener may be passed to secure the housing 910 to the backplate 970.

Figure 79:
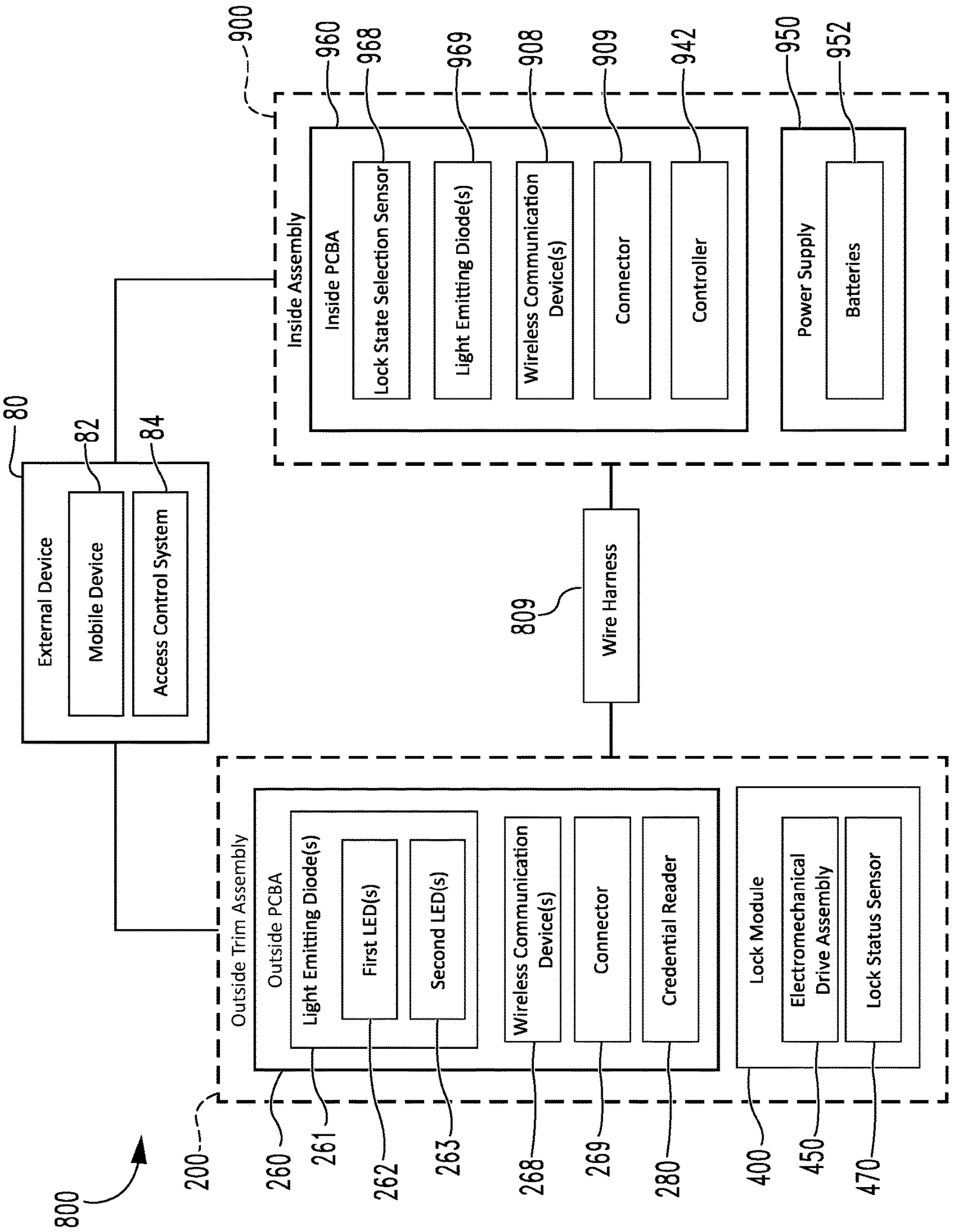
FIG. 79 is a schematic block diagram of the access control assembly illustrated in FIG. 66.

With additional reference to FIG. 79, illustrated therein is a schematic block diagram of the access control device 800. While the schematic block diagram of FIG. 79 is illustrated and described with reference to the rim exit format access control assembly 800, it should be understood that the schematic block diagram may be equally applicable to the concealed vertical format access control assembly 800' and the surface vertical format access control assembly 800".

Figure 80:
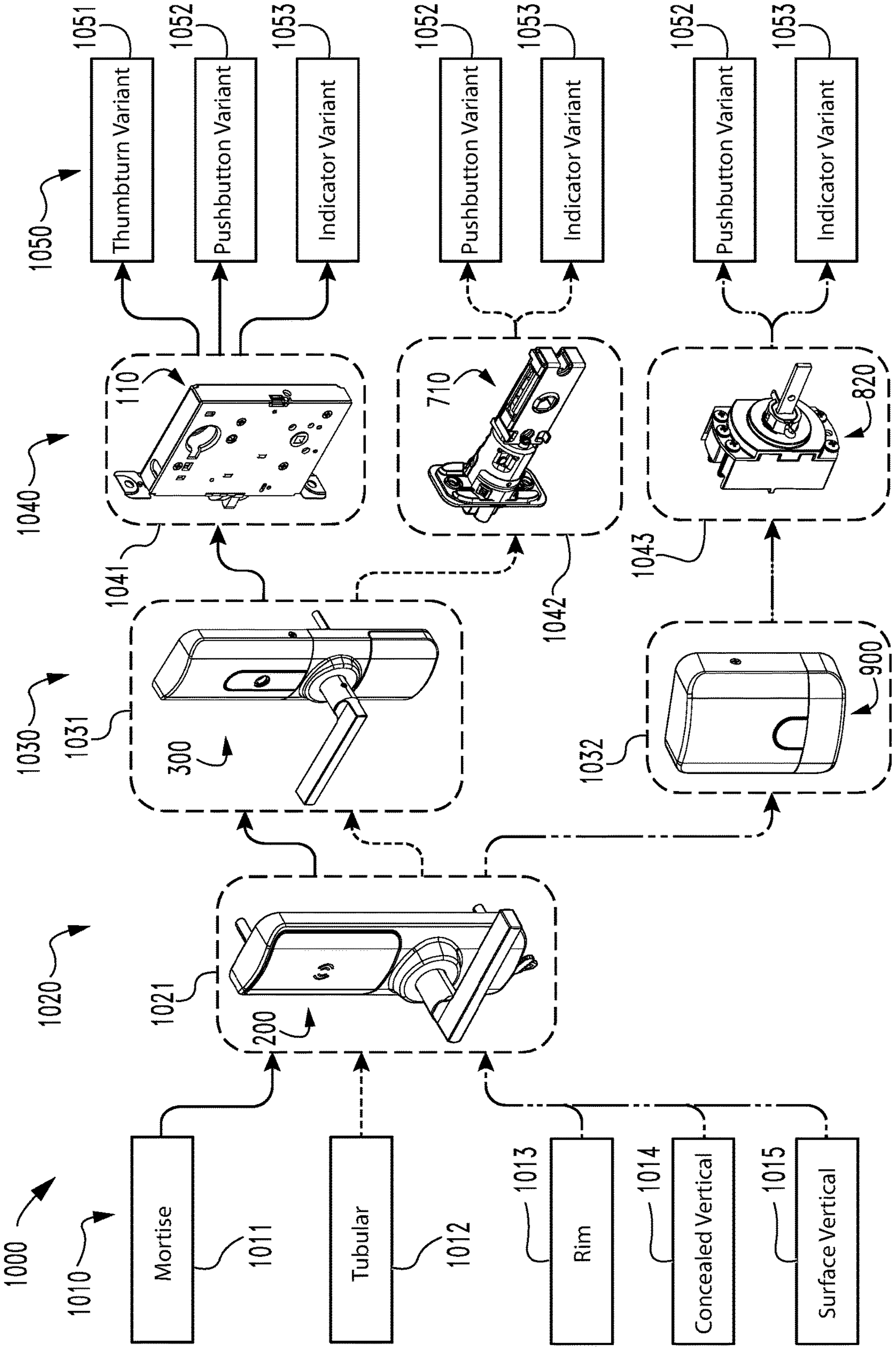
FIG. 80 is a schematic diagram of a product line system according to certain embodiments.

With additional reference to FIG. 80, illustrated therein is an example product line system 1000 according to certain embodiments. The system 1000 may be utilized to produce a product line having many configurations and options using a relatively small number of basic constituent parts. The system 1000 is operable to produce access control assemblies in a plurality of format options 1010, and generally includes at least one outside assembly option 1020, a plurality of inside assembly options 1030, a plurality of in-door assembly options 1040, and a plurality of variant options 1050.

In the illustrated form, the format options 1010 include two lockset formats 1011, 1012 and three exit device formats 1013, 1014, 1015. More particularly, the system 1000 may be used to produce access control assemblies such as locksets of the mortise format 1011 (e.g., the lockset 100 illustrated in FIG. 1), locksets of the tubular format 1012 (e.g., the lockset 700 illustrated in FIG. 65), access control assemblies of the rim exit device format 1013 (e.g., the access control assembly 800 illustrated in FIG. 66), access control assemblies of the concealed vertical exit device format 1014 (e.g., the access control assembly 800' illustrated in FIG. 76), and access control assemblies of the surface vertical exit device format 1015 (e.g., the access control assembly 800" illustrated in FIG. 77). While five format options 1010 are illustrated, it is to be appreciated that more or fewer format options may be available within the system 1000.

Each of the outside assembly options 1020 is configured for mounting to the non-egress side 92 of a door 90, and is utilized in connection with at least one of the format options 1010. In the illustrated embodiment, the system 1000 includes a single outside assembly option 1020 that is common to the plurality of format options 1010. Herein, the term "common" is used not in the sense of "ordinary" or "conventional," but in the sense of "universal" or "shared." The plurality of format options thus share an outside assembly option 1021 in the form of the outside trim assembly 200, which is common to the plurality of format options 1010.

At least a portion of each of the inside assembly options 1030 is configured for mounting to the egress side 93 of a door 90, and is utilized in connection with at least one of the format options 1010. In the illustrated form, the inside assembly options 1030 include a first inside assembly 1031 and a second inside assembly 1032. The first inside assembly 1032 includes the inside trim assembly 300, and is utilized in connection with the mortise format 1011 and the tubular format 1012. The second inside assembly 1032 includes the inside assembly 900, and is utilized in connection with each of the exit device formats 1013, 1014, 1015. While not specifically illustrated in FIG. 80, it should be appreciated that the second inside assembly 1032 may include a plurality of sub-options. As one example, a first sub-option may include the inside assembly 900 and the rim-format exit device 830, and be utilized in connection with the rim exit device format 1013. A second sub-option may include the inside assembly 900 and the concealed vertical exit device 880, and be utilized in connection with the concealed vertical format 1014. A third sub-option may include the inside assembly 900 the surface vertical exit device 890, and the spacer 870, and may be utilized in connection with the surface vertical format 1015.

Each of the in-door assembly options 1040 is configured for mounting within a door preparation 96 of the door 90, and is utilized in connection with at least one of the format options 1010. A first in-door assembly 1041 includes the mortise assembly 110, and may be utilized in connection with the mortise format 1011. A second in-door assembly 1042 includes the tubular latch mechanism 710, and may be utilized in connection with the tubular format 1012. A third in-door assembly 1043 includes the rotation converter 820, and may be utilized in connection with each of the exit device formats 1013, 1014, 1015.

In the illustrated form, each of the in-door assembly options 1040 is configured for mounting in a different form of door preparation. More particularly, the mortise-format in-door assembly 1041 is configured for mounting in the mortise pocket of a standard mortise-format door preparation, the tubular-format in-door assembly 1042 is configured for mounting in the latch bore of a standard tubular-format door preparation, and the rotation converter 820 is configured for mounting in the main bore of a standard exit-format door preparation. It is also contemplated that two or more of the in-door assembly options 1040 may be configured for mounting in the same type of door preparation.

The variant options 1050 provide options regarding the presence/absence of a lock state selector and/or the configuration of the lock state selector. In the illustrated form, the variant options 1050 include a thumbturn variant 1051 that may be selected for at least the mortise format 1011, a pushbutton variant 1052 that may be selected for any of the format options 1010, and an indicator variant 1053 that may be selected for any of the format options 1010. Thus, example, if the selected format is the mortise format 1011, the inside trim assembly 300 may be provided in each and any of the thumbturn configuration 601 illustrated in FIGS. 55 and 56, the pushbutton configuration 602 illustrated in FIGS. 57 and 58, and the indicator configuration 603 illustrated in FIGS. 59 and 60. If the selected format is the tubular format 1012, the inside trim assembly 300 may be provided in each and either of the pushbutton configuration 602 illustrated in FIGS. 57 and 58, and the indicator configuration 603 illustrated in FIGS. 59 and 60. If the selected format is one of the exit device formats 1013, 1014, 1015, the inside assembly 900 may be provided in each and either of the pushbutton configuration 902 illustrated in FIG. 74, and the indicator configuration 903 illustrated in FIG. 75.

In the locksets 100, 700 thus far described, each lockset 100, 700 includes a corresponding and respective latch spindle 150, 750 that is separate and distinct from the inside drive spindle 340. As noted above, however, such split-spindle designs are not necessarily utilized in all embodiments, and some embodiments may utilize a single spindle that is engaged with both the inside handle 330 and the second hub 430. An example of such an embodiment is illustrated in FIG. 81.

With additional reference to FIG. 81, illustrated therein is a tubular lockset 1100 according to certain embodiments. The tubular lockset 1100 is substantially similar to the tubular lockset 700 illustrated in FIG. 65, and includes the outside trim assembly 200 and the tubular latch mechanism 710. The illustrated lockset 1100 also includes an inside trim assembly 300', which is substantially similar to the above-described inside trim assembly 300. In the illustrated embodiment, however, the separate and distinct spindles 340, 750 are replaced with an extended spindle 1110, which performs the function of both the inside drive spindle 340 and the latch spindle 750. More particularly, a first or outside end 1112 of the extended spindle 1110 is engaged with the second hub 430, and a second or inside end 1114 of the extended spindle 1110 is engaged with the support spindle 323, and an elongated body 1116 of the extended spindle 1110 extends through the latch mechanism 710 and engages the retractor 716.

The illustrated lockset 1100 also includes a fire washer 1120, which is securely mounted to the spindle 1110 and abuts the rear face of the main backplate 271, thereby covering the spindle opening 272 in the backplate 271. A spring 1130 may be mounted in the inside handle 330 and engaged with the spindle 1110 to thereby bias the washer 1120 into engagement with the backplate 271. Additionally or alternatively, a spring 1130' may be mounted between the latch mechanism 710 and the fire washer 1120 to thereby bias the washer 1120 into engagement with the backplate 271.

One requirement for certain fire ratings is that there be no openings that would facilitate the passage of fire. The fire washer 1120 may aid the lockset 1100 in passing the tests associated with such ratings. While the fire washer 1120 and springs 1130, 1130' are specifically illustrated as being installed to the extended spindle 1110 of the lockset 1100, it should be appreciated that similar features may also be utilized in connection with the above-described locksets 100, 700. In the mortise lockset 100, for example, the fire washer 1120 may be secured to the latch spindle 150, and a spring may be positioned between the outside hub 117 and the fire washer 1120, and may bias the washer 1120 into engagement with the backplate 271. In the tubular lockset 700, the fire washer 1120 may be secured to the latch spindle 750 and biased into engagement with the backplate 271 by a spring positioned between the washer 1120 and the latch mechanism 710.

Furthermore, while the extended spindle 1110 has been illustrated in association with a tubular format lockset 1100 similar to the tubular format lockset 700, it should be appreciated that the extended spindle 1110 may likewise be utilized in connection with a mortise format lockset similar to the mortise format lockset 100. Thus, the extended spindle 1110 may likewise be utilized in a configurable lockset and/or a product line system for generating access control assemblies of various formats.

Figure 82:
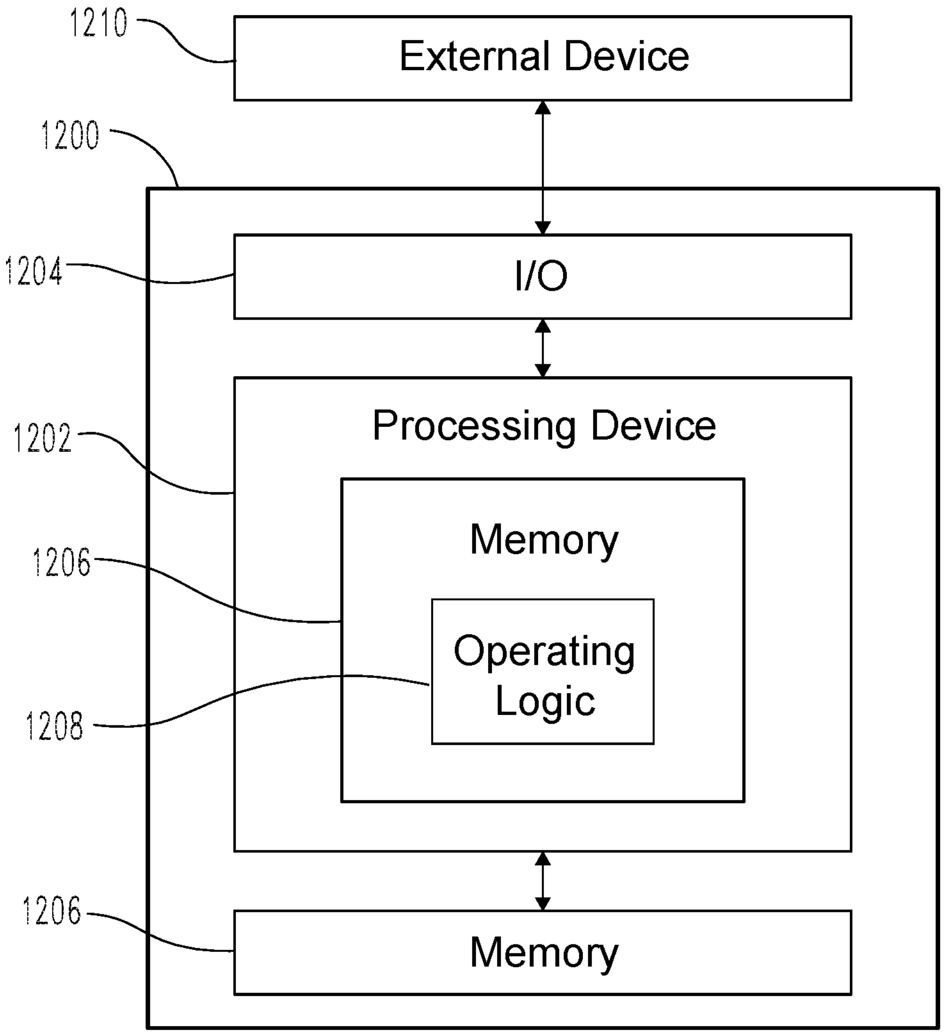
FIG. 82 is a schematic block diagram of a computing device that may be utilized in connection with certain embodiments.

Referring now to FIG. 82, a simplified block diagram of at least one embodiment of a computing device 1200 is shown. The illustrative computing device 1200 depicts at least one embodiment of a controller that may be utilized in connection with the controller 142 illustrated in FIG. 64 and/or the controller 942 illustrated in FIG. 79.

Depending on the particular embodiment, the computing device 1200 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 1200 includes a processing device 1202 that executes algorithms and/or processes data in accordance with operating logic 1208, an input/output device 1204 that enables communication between the computing device 1200 and one or more external devices 1210, and memory 1206 which stores, for example, data received from the external device 1210 via the input/output device 1204.

The input/output device 1204 allows the computing device 1200 to communicate with the external device 1210. For example, the input/output device 1204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), WiMAX, etc.) to effect such communication depending on the particular computing device 1200. The input/output device 1204 may include hardware, software, and/or firmware suitable for performing the techniques described herein.

The external device 1210 may be any type of device that allows data to be inputted or outputted from the computing device 1200. For example, in various embodiments, the external device 1210 may be embodied as the mobile device 82, the access control system 84, the outside PCBA 260 or a component thereof (e.g., the LED(s) 261 and/or the wireless communication device(s) 268), the credential reader 280, the power supply 350, the inside PCBA 360 or a component thereof (e.g., the first lock state selection sensor 367 and/or the second lock state selection sensor 368), the REX sensor 371, the electromechanical drive assembly 450, the lock status sensor 470, the wireless communication device(s) 908, the power supply 950, and/or the inside PCBA 960 or a component thereof (e.g., the LED(s) 969 and/or the lock state selection sensor 968). Further, in some embodiments, the external device 1210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 1210 may be integrated into the computing device 1200.

The processing device 1202 may be embodied as any type of processor(s) capable of performing the functions described herein. In particular, the processing device 1202 may be embodied as one or more single or multi-core processors, microcontrollers, or other processor or processing/controlling circuits. For example, in some embodiments, the processing device 1202 may include or be embodied as an arithmetic logic unit (ALU), central processing unit (CPU), digital signal processor (DSP), and/or another suitable processor(s). The processing device 1202 may be a programmable type, a dedicated hardwired state machine, or a combination thereof. Processing devices 1202 with multiple processing units may utilize distributed, pipelined, and/or parallel processing in various embodiments. Further, the processing device 1202 may be dedicated to performance of just the operations described herein, or may be utilized in one or more additional applications. In the illustrative embodiment, the processing device 1202 is of a programmable variety that executes algorithms and/or processes data in accordance with operating logic 1208 as defined by programming instructions (such as software or firmware) stored in memory 1206. Additionally or alternatively, the operating logic 1208 for processing device 1202 may be at least partially defined by hardwired logic or other hardware. Further, the processing device 1202 may include one or more components of any type suitable to process the signals received from input/output device 1204 or from other components or devices and to provide desired output signals. Such components may include digital circuitry, analog circuitry, or a combination thereof.

The memory 1206 may be of one or more types of non-transitory computer-readable media, such as a solid-state memory, electromagnetic memory, optical memory, or a combination thereof. Furthermore, the memory 1206 may be volatile and/or nonvolatile and, in some embodiments, some or all of the memory 1206 may be of a portable variety, such as a disk, tape, memory stick, cartridge, and/or other suitable portable memory. In operation, the memory 1206 may store various data and software used during operation of the computing device 1200 such as operating systems, applications, programs, libraries, and drivers. It should be appreciated that the memory 1206 may store data that is manipulated by the operating logic 1208 of processing device 1202, such as, for example, data representative of signals received from and/or sent to the input/output device 1204 in addition to or in lieu of storing programming instructions defining operating logic 1208. As illustrated, the memory 1206 may be included with the processing device 1202 and/or coupled to the processing device 1202 depending on the particular embodiment. For example, in some embodiments, the processing device 1202, the memory 1206, and/or other components of the computing device 1200 may form a portion of a system-on-a-chip (SoC) and be incorporated on a single integrated circuit chip.

In some embodiments, various components of the computing device 1200 (e.g., the processing device 1202 and the memory 1206) may be communicatively coupled via an input/output subsystem, which may be embodied as circuitry and/or components to facilitate input/output operations with the processing device 1202, the memory 1206, and other components of the computing device 1200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 1200 may include other or additional components, such as those commonly found in a typical computing device (e.g., various input/output devices and/or other components), in other embodiments. It should be further appreciated that one or more of the components of the computing device 1200 described herein may be distributed across multiple computing devices. In other words, the techniques described herein may be employed by a computing system that includes one or more computing devices. Additionally, although only a single processing device 1202, I/O device 1204, and memory 1206 are illustratively shown in FIG. 82, it should be appreciated that a particular computing device 1200 may include multiple processing devices 1202, I/O devices 1204, and/or memories 1206 in other embodiments. Further, in some embodiments, more than one external device 1210 may be in communication with the computing device 1200.

Certain embodiments of the present application relate to a trim assembly, comprising: an escutcheon comprising an escutcheon floor and at least partially defining a fastener opening; a spring cage comprising: a base defining a spring cage floor adjacent the escutcheon floor; a spindle rotatably supported by the base and extending through the opening; and a bias member rotationally biasing the spindle toward a home position; and a fastener comprising: a head, wherein the head is engaged with the spring cage floor; and a shank extending from the head in a longitudinal direction, wherein the shank extends into the fastener opening; and wherein the spring cage floor projects longitudinally beyond the escutcheon floor such that a portion of the base is securely clamped between the head and the escutcheon.

In certain embodiments, a gap is defined between the head and the escutcheon floor.

In certain embodiments, at least one component of the trim deforms in response to application of an external load such that at least a portion of the gap closes and the head contacts the escutcheon floor.

In certain embodiments, a longitudinal dimension of the gap is one millimeter or less.

In certain embodiments, the escutcheon further comprises a pocket sized and shaped to receive the spring cage, and a boss positioned in the pocket; wherein the base further comprises a recess sized and shaped to receive the boss; and wherein the portion of the base that is securely clamped between the head and the escutcheon is defined between the floor and the recess.

In certain embodiments, the spring cage floor and the escutcheon floor are longitudinally offset from one another by an offset dimension of at least one millimeter.

In certain embodiments, the offset dimension is three millimeters or less.

In certain embodiments, the escutcheon further comprises a pocket in which the base is seated; and wherein at least a portion of the shank is positioned between an inner periphery of the pocket and an outer periphery of the base.

Certain embodiments of the present application relate to a method, comprising: inserting a spring cage into an escutcheon such that a spring cage floor of the spring cage projects beyond an escutcheon floor of the escutcheon; and advancing a shank of a fastener into a fastener opening defined by the escutcheon such that a head of the fastener contacts the spring cage floor before contacting the escutcheon floor, thereby clamping a portion of the spring cage between the head and the escutcheon; and wherein the spring cage floor and the escutcheon floor are substantially coplanar.

In certain embodiments, the method further comprises stopping advancement of the fastener before the head contacts the escutcheon floor such that a gap is formed between the head and the escutcheon floor.

In certain embodiments, a dimension of the gap is one millimeter or less.

In certain embodiments, the method further comprises continuing to advance the fastener until the head contacts the escutcheon floor.

In certain embodiments, inserting the spring cage into the escutcheon comprises engaging a first portion of an alignment mechanism with a second portion of the alignment mechanism such that the alignment mechanism urges the spring cage toward a desired position relative to the escutcheon.

In certain embodiments, the spring cage floor and the escutcheon floor are offset from one another by an offset dimension; and wherein the offset dimension is three millimeters or less.

In certain embodiments, the offset dimension is at least one millimeter.

Certain embodiments of the present application relate to a trim assembly, comprising: an escutcheon comprising a pocket and an opening; a spring cage configured for mounting in the pocket, the spring cage comprising: a base; a spindle rotatably supported by the base and configured to extend through the opening when the spring cage is mounted in the pocket; and a bias member rotationally biasing the spindle toward a home position; and an alignment mechanism configured to urge the spring cage toward a desired position during insertion of the spring cage into the pocket, the alignment mechanism comprising at least one ramp.

In certain embodiments, the opening is centered about a first axis; wherein the spindle is rotatable relative to the base about a second axis; and wherein the desired position is a position in which the first axis and the second axis are aligned with one another.

In certain embodiments, the at least one ramp comprises a first escutcheon ramp and a first spring cage ramp; wherein the escutcheon comprises the first escutcheon ramp; wherein the spring cage comprises the first spring cage ramp; and wherein the first escutcheon ramp and the first spring cage ramp are configured to engage one another during insertion of the spring cage into the pocket.

In certain embodiments, the escutcheon further comprises a first boss, the first boss comprising a first chamfered tip portion defining the first escutcheon ramp; and wherein the base comprises a first chamfered recess, the first chamfered recess defining the first spring cage ramp.

In certain embodiments, the at least one ramp further comprises a second escutcheon ramp and a second spring cage ramp; wherein the escutcheon further comprises a second boss, the second boss comprising a second chamfered tip portion defining the second escutcheon ramp; and wherein the base further comprises a second chamfered recess, the second chamfered recess defining the second spring cage ramp.

Certain embodiments of the present application relate to a trim assembly having a locked state and an unlocked state, the trim assembly comprising: an escutcheon configured for mounting to a door, wherein a rear side of the escutcheon extends along and defines a rear plane; and a lock cylinder mounted to the escutcheon, the lock cylinder comprising a plug mounted for rotation between a home position and a rotated position, wherein the plug comprises a keyway extending along and defining a keyway plane; wherein rotation of the plug from the home position to the rotated position transitions the trim assembly to the unlocked state; and wherein, with the plug in the home position, the keyway plane defines a first oblique angle relative to the rear plane.

In certain embodiments, the first oblique angle is between 10° and 30°.

In certain embodiments, with the plug in the rotated position, the keyway plane defines a second oblique angle relative to the rear plane.

In certain embodiments, the second oblique angle is between 30° and 50°.

In certain embodiments, the lock cylinder further comprises: a shell rotationally coupled with the escutcheon; and a tumbler assembly operable to selectively prevent rotation of the plug relative to the shell.

In certain embodiments, the escutcheon comprises a cradle in which the lock cylinder is seated, the cradle comprising an arcuate wall and an oblique wall that is oblique relative to the rear plane; and wherein the shell comprises: a body portion supported by the arcuate wall; and a tower extending from the body portion and supported by the oblique wall.

In certain embodiments, the trim assembly further comprises a clamp secured to the escutcheon; and wherein a portion of the shell is captured between the clamp and the escutcheon to thereby restrict movement of the shell.

In certain embodiments, the clamp cooperates with the escutcheon to prevent rotation of the plug beyond the rotated position.

In certain embodiments, the clamp and the escutcheon prevent rotation of the plug beyond the rotated position by engaging a tailpiece coupled with the plug.

In certain embodiments, the trim assembly further comprises a spindle mounted for rotation relative to the escutcheon about a first rotational axis; wherein the plug is rotatable relative to the escutcheon about a second rotational axis; and wherein the first rotational axis and the second rotational axis are transverse to one another.

In certain embodiments, the first rotational axis and the second rotational axis are offset from one another.

Certain embodiments of the present application relate to a lockset comprising the trim assembly, the lockset further comprising a latch mechanism; wherein the latch mechanism is operably connected with the spindle; wherein the spindle is operable to actuate the latch mechanism when the trim assembly is in the unlocked state; and wherein the spindle is inoperable to actuate the latch mechanism when the trim assembly is in the locked state.

Certain embodiments of the present application relate to a trim assembly having a locked state and an unlocked state, the trim assembly comprising: an escutcheon configured for mounting to a door; a spindle mounted for rotation relative to the escutcheon about a first rotational axis; and a lock cylinder mounted to the escutcheon, the lock cylinder comprising a plug mounted for rotation relative to the escutcheon about a second rotational axis; and wherein rotation of the plug from a home position to a rotated position transitions the trim assembly to the unlocked state; and wherein the first rotational axis and the second rotational axis are offset from one another.

In certain embodiments, the first rotational axis and the second rotational axis are transverse to one another.

In certain embodiments, the first rotational axis and the second rotational axis are angularly offset from one another by an angle in the range of 80° to 100°.

In certain embodiments, the first rotational axis and the second rotational axis are offset from one another by a distance of at least one centimeter.

In certain embodiments, a rear side of the escutcheon extends along and defines a first plane; wherein a keyway of the plug extends along and defines a second plane; and wherein, with the plug in the home position, the first plane and the second plane are angularly offset from one another by an oblique angle.

In certain embodiments, the oblique angle is at least 5°.

In certain embodiments, the oblique angle is between 10° and 30°.

Certain embodiments of the present application relate to a lockset comprising the trim assembly, the lockset further comprising a latch mechanism; wherein the latch mechanism is operably connected with the spindle; wherein the spindle is operable to actuate the latch mechanism when the trim assembly is in the unlocked state; and wherein the spindle is inoperable to actuate the latch mechanism when the trim assembly is in the locked state.

Certain embodiments of the present application relate to a lock apparatus, comprising: a housing assembly, comprising: an escutcheon defining a mounting location; and a cover plate removably coupled to the escutcheon and at least partially enclosing the mounting location; a lock module mounted within the mounting location; and a shim positioned between the housing assembly and the lock module to discourage shifting of the lock module relative to the housing assembly.

In certain embodiments, the shim is adhered to one of the lock module or the housing assembly.

In certain embodiments, the shim comprises an adhesive side and an opposite side; and wherein the shim is adhered to the one of the lock module or the housing assembly via the adhesive side.

In certain embodiments, the shim is positioned between the lock module and the cover plate.

In certain embodiments, the shim comprises a soft material.

In certain embodiments, the shim comprises a foam material.

In certain embodiments, the mounting location comprises a first pair of walls; wherein the lock module comprises a first pair of sides; and wherein the first pair of sides are positioned within the first pair of walls such that the first pair of walls limit shifting of the lock module in directions transverse to the first pair of walls.

In certain embodiments, the mounting location further comprises a second pair of walls extending transverse to the first pair of walls; wherein the lock module further comprises a second pair of sides extending transverse to the first pair of sides; and wherein the second pair of sides are positioned within the second pair of walls such that the second pair of walls limit shifting of the lock module in directions transverse to the second pair of walls.

In certain embodiments, the lock apparatus further comprises: a drive spindle mounted for rotation relative to the escutcheon about a rotational axis; and a spring cage rotationally biasing the drive spindle toward a home position; wherein the drive spindle is engaged with an input component of the lock module; and wherein the lock module is configured to selectively permit rotation of an output component by the input component.

In certain embodiments, the mounting location comprises a floor engaged with a front side of the lock module; and wherein the floor is positioned such that a gap is defined between the front side of the lock module and a rear side of the spring cage.

Certain embodiments of the present application relate to a method of assembling a lock apparatus comprising a housing assembly, the housing assembly including an escutcheon and a cover plate, the method comprising: positioning a soft shim between a lock module and the housing assembly; positioning the lock module within a mounting location of the escutcheon; and securing the cover plate to the escutcheon to thereby retain the lock module within the mounting location; and wherein the soft shim discourages shifting of the lock module relative to the housing assembly.

In certain embodiments, positioning the soft shim between the lock module and the housing assembly comprises positioning the shim between the lock module and the cover plate.

In certain embodiments, the method further comprises adhering the shim to one of the lock module or the housing assembly.

In certain embodiments, the shim comprises a soft material.

In certain embodiments, the shim comprises a foam material.

In certain embodiments, positioning the lock module within the mounting location comprises positioning a first side of the lock module adjacent a first wall of the mounting location such that the first wall limits shifting of the lock module in a first direction transverse to the first wall.

In certain embodiments, positioning the lock module within the mounting location further comprises positioning a second side of the lock module adjacent a second wall of the mounting location such that the second wall limits shifting of the lock module in a second direction transverse to the second wall; and wherein the first wall and the second wall are transverse to one another.

In certain embodiments, positioning the lock module within the mounting location further comprises engaging a front side of the lock module with a floor of the mounting location; and wherein the floor is parallel to the cover plate.

In certain embodiments, the method further comprises: prior to positioning the lock module within the mounting location, seating a spring cage within a pocket of the escutcheon; and wherein a floor of the mounting location is offset from a rear side of the spring cage such that a gap is formed between the rear side of the spring cage and a front side of the lock module when the lock module is positioned in the mounting location.

In certain embodiments, the method further comprises: prior to positioning the lock module within the mounting location, seating a spring cage within a pocket of the escutcheon; and engaging a drive spindle with an input component of the lock module; wherein the lock module further comprises an output component; and wherein the lock module selectively permits the input component to rotate the output component.

Certain embodiments of the present application relate to a trim assembly, comprising: an escutcheon; a first light source configured to provide a first visual indication regarding a first condition of the trim assembly; a cover mounted to the escutcheon, the cover comprising a first display region that is misaligned with the first light source; and a light guide configured to direct light from the first light source to the first display region.

In certain embodiments, the trim assembly further comprises a second light source configured to provide a second visual indication regarding a second condition of the trim assembly; wherein the cover further comprises a second display region; and wherein the second light source is positioned such that light emitted by the second light source travels to the second display region without being reflected by a reflective surface of the light guide.

In certain embodiments, the trim assembly further comprises an isolation wall positioned between the second light source and the light guide.

In certain embodiments, the second display region comprises an icon related to the second condition.

In certain embodiments, the second condition pertains to a battery level of the trim assembly; and wherein the icon comprises a battery icon.

In certain embodiments, the light guide is staked to the cover.

In certain embodiments, the cover includes a staking post that projects through an opening formed in the light guide; and wherein the staking post is deformed to thereby stake the light guide to the cover.

In certain embodiments, the light guide comprises at least one reflective surface; and wherein at least one reflective surface is configured to reflect light emitted by the first light source toward the first display region.

In certain embodiments, the trim assembly further comprises a printed circuit board assembly comprising the first light source; and wherein the printed circuit board assembly is connected with a control assembly configured to illuminate the first light source in response to detecting the first condition of the trim assembly.

In certain embodiments, the printed circuit board assembly further comprises a wireless communication device configured to communicate wirelessly via at least one frequency; wherein the cover is passive to the at least one frequency.

Certain embodiments of the present application relate to a method of assembling a lockset trim, the method comprising: forming a front cover, wherein the forming comprises securing a light guide to a cover panel such that an output region of the light guide is aligned with a first display region of the cover panel, wherein the light guide at least one reflective surface configured to direct light from an input region of the light guide to the output region; aligning a first light source with the input region; and securing the front cover to an escutcheon.

In certain embodiments, securing the light guide to the cover panel comprises: positioning a staking post within an opening; and deforming the staking post.

In certain embodiments, the cover panel comprises the staking post; and wherein the light guide comprises the opening.

In certain embodiments, the method further comprises aligning a second light source with a second display region of the front cover.

In certain embodiments, aligning the second light source with the second display region comprises positioning an isolation wall between the second light source and the input region.

In certain embodiments, the second display region comprises an icon operable to be illuminated by the second light source.

In certain embodiments, the method further comprises illuminating the second light source in response to a low battery condition of the trim assembly; and wherein the icon comprises a battery icon.

In certain embodiments, the method further comprises illuminating the first light source to provide a visual indication related to a condition of the lockset trim; and wherein light emitted by the first light source is directed from the input region to the output region by the at least one reflective surface.

In certain embodiments, the method further comprises positioning a printed circuit board assembly (PCBA) within the escutcheon; wherein the PCBA comprises the first light source and a wireless communication device configured to communicate wirelessly via at least one frequency; and wherein the cover panel is passive to the at least one frequency.

In certain embodiments, the cover panel comprises a channel that accommodates the output region.

Certain embodiments of the present application relate to a lockset apparatus, comprising: an escutcheon configured for mounting to a door; an onboard power supply mounted in the escutcheon; a cover releasably coupled with the escutcheon, the cover having an closed position in which the cover is coupled with the escutcheon and covers the onboard power supply, the cover having an open position in which the cover is at least partially decoupled from the escutcheon and the power supply is exposed; and a battery tamper sensor mounted in the escutcheon and configured to transmit a signal in response to movement of the cover between the closed position and the open position.

In certain embodiments, the battery tamper sensor is configured to transmit the signal in response to movement of the cover from the closed position to the open position.

In certain embodiments, the battery tamper sensor comprises a switch including an arm having a projected position and a depressed position; wherein a portion of the cover retains the arm in the depressed position while the cover is in the closed position; and wherein the arm returns to the projected position in response to removal of the cover.

In certain embodiments, the lockset apparatus further comprises a mounting bracket to which the battery tamper sensor is mounted, the mounting bracket comprising a post that extends into an opening in a body of the battery tamper sensor.

In certain embodiments, the mounting bracket further comprises a first clip arm engaged with a first side of the body.

In certain embodiments, the mounting bracket further comprises a second clip arm engaged with a second side of the body.

In certain embodiments, the first side of the body and the second side of the body are opposite one another such that the body is captured between the first clip arm and the second clip arm.

In certain embodiments, the lockset apparatus further comprises a mounting bracket to which the battery tamper sensor is mounted, the mounting bracket comprising a pair of clip arms; and wherein a body of the battery tamper sensor is captured between the pair of clip arms.

In certain embodiments, the lockset apparatus further comprises a controller housed within the escutcheon and connected to the power supply and the battery tamper sensor.

In certain embodiments, the lockset apparatus further comprises a lock state selector connected with the controller; and wherein the controller is configured to transition the lockset apparatus between a locked state and an unlocked state in response to manipulation of the lock state selector.

Certain embodiments of the present application relate to a lockset apparatus, comprising: an escutcheon; a spindle mounted for rotation relative to the escutcheon; a plate rotationally coupled with the spindle, the plate including a plurality of sensor-actuating regions; and a sensor configured to transmit a signal in response to actuation by each and any of the sensor-actuating regions; wherein the plate is operable to be mounted to the spindle in each of a plurality of orientations; wherein each sensor-actuating region corresponds to a respective orientation of the plurality of orientations; and wherein the sensor is operable to be actuated by the sensor-actuating region corresponding to a current plate orientation of the plurality of orientations.

In certain embodiments, the current plate orientation is a first orientation of the plurality of orientations; and wherein a first sensor-actuating region of the plurality of sensor-actuating regions is configured to actuate the sensor.

In certain embodiments, the sensor comprises an arm having a projected position and a depressed position.

In certain embodiments, each sensor-actuating region comprises: a lobe configured to maintain the arm in the depressed position when the lobe is aligned with the arm; and a recess configured to permit the arm to adopt the projected position when the recess is aligned with the arm.

In certain embodiments, the lockset apparatus further comprises a mounting bracket to which the sensor is mounted, the mounting bracket comprising a post that extends into an opening in a body of the sensor.

In certain embodiments, the mounting bracket further comprises a first clip arm engaged with a first side of the body.

In certain embodiments, the lockset apparatus further comprises a mounting bracket to which the sensor is mounted, the mounting bracket comprising a pair of clip arms; and wherein a body of the sensor is captured between the pair of clip arms.

In certain embodiments, the spindle has a polygonal cross-sectional geometry comprising N sides; and wherein the plurality of sensor-actuating regions comprises N sensor-actuating regions.

In certain embodiments, the lockset apparatus further comprises a mounting bracket to which the sensor is mounted, and wherein the mounting bracket comprising an arcuate ridge that at least partially circumferentially surrounds the plate.

Certain embodiments of the present application relate to a method of assembling a lockset apparatus, the method comprising: rotationally coupling a plate with a spindle in a selected mounting orientation of a plurality of mounting orientations, the plurality of mounting orientations comprising a first mounting orientation and a second mounting orientation, wherein the plate comprises a plurality of sensor-actuating regions, the plurality of sensor-actuating regions comprising a first sensor-actuating region and a second sensor-actuating region; mounting the spindle for rotation relative to an escutcheon; and mounting a sensor in the escutcheon such that rotation of the spindle between a home position and a rotated position causes the plate to actuate the sensor; wherein, when the selected mounting orientation is the first mounting orientation, the first sensor-actuating region actuates the sensor during rotation of the spindle between the home position and the rotated position; and wherein, when the selected mounting orientation is the second mounting orientation, the second sensor-actuating region actuates the sensor during rotation of the spindle between the home position and the rotated position.

In certain embodiments, the sensor comprises an arm having a depressed position and a projected position.

In certain embodiments, each sensor-actuating region comprises: a lobe configured to maintain the arm in the depressed position when the lobe is aligned with the arm; and a recess configured to permit the arm to adopt the projected position when the recess is aligned with the arm.

In certain embodiments, mounting the sensor in the escutcheon comprises inserting a post into a body of the sensor.

In certain embodiments, mounting the sensor in the escutcheon comprises engaging a body of the sensor with a pair of deformable clip arms such that the body of the sensor is captured between the pair of deformable clip arms.

Certain embodiments of the present application relate to a lockset apparatus, comprising: an escutcheon; a sensor mounted in the escutcheon; a spindle mounted for rotation relative to the escutcheon; and a plate comprising a first sensor-actuating region and a second sensor-actuating region; wherein the plate is operable to be rotationally coupled to the spindle in a first orientation in which the first sensor-actuating region actuates the sensor during rotation of the spindle; and wherein the plate is operable to be rotationally coupled to the spindle in a second orientation in which the second sensor-actuating region actuates the sensor during rotation of the spindle.

In certain embodiments, each sensor-actuating region comprises a lobe and a recess.

In certain embodiments, the sensor comprises an arm operable to be depressed by the lobe.

In certain embodiments, each sensor-actuating region is configured to mechanically actuate the sensor.

In certain embodiments, the lockset apparatus further comprises a mounting bracket to which the sensor is mounted, the mounting bracket comprising a pair of clip arms; and wherein a body of the sensor is captured between the pair of clip arms.

In certain embodiments, the spindle has a polygonal cross-sectional geometry comprising N sides; and wherein the plurality of sensor-actuating regions comprises N sensor-actuating regions.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock apparatus, comprising:

a housing assembly, comprising:
- an escutcheon defining a mounting location and a pocket; and
- a cover plate removably coupled to the escutcheon and at least partially enclosing the mounting location;

a lock module mounted within the mounting location, the lock module comprising:
- a lock module housing comprising a front side and a rear side opposite the front side;
- an input component rotatably mounted in the lock module housing;
- an output component rotatably mounted in the lock module housing; and
- a coupler operable to selectively couple the input component and the output component;

a drive spindle rotationally coupled with the input component for joint rotation about a longitudinal axis;

a spring cage comprising:
- a base rotationally coupled with the escutcheon such that rotation of the base relative to the escutcheon is prevented; and
- a bias member engaged between the base and the drive spindle to thereby bias the drive spindle toward a home position;
- wherein the spring cage is seated in the pocket and is captured within the pocket by the lock module housing; and a shim positioned between the housing assembly and the lock module housing to discourage shifting of the lock module relative to the housing assembly;

wherein the mounting location is longitudinally offset from the pocket and comprises:

a floor that is longitudinally open to the pocket and engaged with the front side of the lock module housing;

a pair of lateral walls positioned on opposite sides of the longitudinal axis; and a pair of transverse walls positioned on opposite sides of the longitudinal axis; and wherein the shim is engaged between the cover plate and the rear side of the lock module housing such that the lock module is snugly captured between the floor and the cover plate.

2. The lock apparatus of claim 1, wherein the shim is adhered to one of the lock module or the cover plate.

3. The lock apparatus of claim 2, wherein the shim comprises an adhesive side and an opposite side; and wherein the shim is adhered to the one of the lock module or the cover plate via the adhesive side.

4. The lock apparatus of claim 1, wherein the shim comprises a soft material.

5. The lock apparatus of claim 1, wherein the shim comprises a foam material.

6. The lock apparatus of claim 1, wherein the lock module housing further comprises a first pair of sides; and wherein the first pair of sides are located between the pair of lateral walls such that the first pair of lateral walls limit shifting of the lock module in directions transverse to the first pair of lateral walls.

7. The lock apparatus of claim 6, wherein the lock module housing further comprises a second pair of sides extending transverse to the first pair of sides; and wherein the second pair of sides are located between the pair of transverse walls such that the pair of transverse walls limit shifting of the lock module in directions transverse to the pair of transverse walls.

8. The lock apparatus of claim 1, wherein a longitudinal gap is defined between a rear side of the spring cage and the front side of the lock module housing to thereby discourage binding of the spring cage with the lock module housing.

9. The lock apparatus of claim 1, wherein the coupler is movable between a coupling position and a decoupling position;

wherein, with the coupler in the coupling position, the coupler couples the input component and the output component for joint rotation to thereby unlock the lock apparatus; and wherein, with the coupler in the decoupling position, the input component is rotatable relative to the output component to thereby lock the lock apparatus.

10. The lock apparatus of claim 1, further comprising an actuator mounted within the lock module housing and operable to move the coupler between a coupling position to selectively couple the input member and the output member for joint rotation about the longitudinal axis, and a decoupling position to permit rotation of the input member relative to the output member.

11. The lock apparatus of claim 10, wherein the actuator comprises an electric motor.

12. The lock apparatus of claim 1, wherein cover plate is offset from the floor in a first longitudinal direction; and wherein the floor is offset from a rear side of the spring cage in the first longitudinal direction.

13. A lock apparatus, comprising:

a housing assembly, comprising:

an escutcheon defining a longitudinal axis, the escutcheon comprising a mounting location and a pocket, wherein the pocket is longitudinally open to the mounting location; and a cover plate removably coupled to the escutcheon and at least partially enclosing the mounting location;

wherein the mounting location is longitudinally offset from the pocket and comprises:

a floor that is longitudinally open to the pocket;

a pair of lateral walls positioned on opposite sides of the longitudinal axis; and a pair of transverse walls positioned on opposite sides of the longitudinal axis;

a lock module mounted within the mounting location, the lock module comprising:

a lock module housing that conforms to the mounting location such that rotation of the lock module housing relative to the escutcheon is prevented;

an input component mounted in the lock module housing for rotation about the longitudinal axis;

an output component mounted in the lock module housing for rotation about the longitudinal axis; and a coupler operable to selectively couple the input component and the output component;

a shim snugly engaged between the cover plate and a rear side of the lock module housing to discourage shifting of the lock module relative to the housing assembly;

a drive spindle mounted for rotation relative to the escutcheon about the longitudinal axis, wherein the drive spindle is rotationally coupled with the input component; and a spring cage rotationally biasing the drive spindle toward a home position, wherein the spring cage is seated in the pocket and is covered by the lock module.

14. The lock apparatus of claim 13, wherein the floor is engaged with a front side of the lock module housing that is opposite the rear side of the lock module housing;

wherein the spring cage comprises a base that is positioned within the pocket and non-rotatably coupled to the escutcheon; and wherein the floor is positioned such that a longitudinal gap is defined between the front side of the lock module housing and a rear side of the spring cage to thereby discourage binding of the spring cage with the lock module.

15. A method of assembling a lock apparatus comprising a housing assembly, the housing assembly including an escutcheon and a cover plate, the method comprising:

seating a spring cage in a pocket of the escutcheon such that a base of the spring cage is non-rotatably secured to the escutcheon, the spring cage biasing a drive spindle toward a home position;

positioning a shim between a lock module and the cover plate, the lock module comprising a housing, an input component rotatably mounted in the housing, an output component rotatably mounted in the housing, and a coupler operable to selectively rotationally couple the input component and the output component for joint rotation about a longitudinal axis;

engaging the drive spindle with the input component such that the spring cage biases the input component toward the home position;

positioning the lock module within a mounting location of the escutcheon such that the lock module covers the spring cage and the longitudinal axis passes through the lock module, wherein the mounting location comprises a plurality of longitudinally-extending walls that define a perimeter about the longitudinal axis; and securing the cover plate to the escutcheon to thereby retain the lock module within the mounting location;

wherein the shim is snugly engaged between the cover plate and a rear side of the lock module and thereby discourages shifting of the lock module relative to the housing assembly.

16. The method of claim 15, further comprising adhering the shim to one of the lock module or the cover plate.

17. The method of claim 15, wherein the shim comprises a soft material.

18. The method of claim 15, wherein the shim comprises a foam material.

19. The method of claim 15, wherein a floor of the mounting location is offset from a rear side of the spring cage such that a gap is formed between the rear side of the spring cage and a front side of the lock module when the lock module is positioned in the mounting location, thereby discouraging binding of the spring cage with the lock module.

20. The method of claim 15, wherein the lock module has a parallelepiped geometry;

wherein the mounting location further comprises a front floor;

wherein the plurality of walls includes four walls defining a rectangular shape corresponding to the parallelepiped geometry of the lock module; and wherein the longitudinal axis passes through the rectangular shape.

* * * * *